United States Patent [19]

Hamano et al.

[11] Patent Number: 5,134,524
[45] Date of Patent: Jul. 28, 1992

[54] REAR FOCUS TYPE ZOOM LENS

[75] Inventors: Hiroyuki Hamano; Kenichi Kimura; Saburo Sugawara, all of Kanagawa, Japan

[73] Assignee: Canon Kabushiki Kaisha, Tokyo, Japan

[21] Appl. No.: 534,241

[22] Filed: Jun. 7, 1990

[30] Foreign Application Priority Data

| Jun. 9, 1989 | [JP] | Japan | 1-147593 |
|---|---|---|---|
| Jun. 9, 1989 | [JP] | Japan | 1-147594 |
| Jun. 9, 1989 | [JP] | Japan | 1-147595 |
| Jun. 9, 1989 | [JP] | Japan | 1-147596 |
| Jun. 9, 1989 | [JP] | Japan | 1-147597 |
| Jun. 9, 1989 | [JP] | Japan | 1-147598 |
| Jun. 9, 1989 | [JP] | Japan | 1-147599 |

[51] Int. Cl.$^5$ .................................................. G02B 15/00
[52] U.S. Cl. ...................................... 359/687; 359/683
[58] Field of Search .................... 350/423, 427, 430; 359/693–695, 705, 771, 774, 687

[56] References Cited

U.S. PATENT DOCUMENTS

| 3,501,224 | 3/1970 | Takahashi | 350/184 |
|---|---|---|---|
| 4,256,381 | 3/1981 | Kreitzer | 350/423 |
| 4,634,236 | 1/1987 | Masumoto | 350/427 |
| 4,695,133 | 9/1987 | Kitagishi et al. | 350/427 |
| 4,720,180 | 1/1988 | Asano et al. | 350/427 |
| 4,802,747 | 2/1989 | Horiuchi | 350/427 |
| 4,818,083 | 4/1989 | Mihara | 350/427 |
| 4,832,471 | 5/1989 | Hasmano | 350/427 |
| 4,859,042 | 8/1989 | Tanaka | 350/423 |
| 4,865,434 | 9/1989 | Matsushita et al. | 359/705 |
| 4,909,615 | 3/1990 | Ueda | 359/683 |
| 4,917,482 | 4/1990 | Ito | 359/693 |
| 4,934,796 | 6/1990 | Sugiura | 350/427 |

FOREIGN PATENT DOCUMENTS

| 58-136012 | 8/1983 | Japan . |
|---|---|---|
| 62-24213 | 2/1987 | Japan . |
| 63-44614 | 2/1988 | Japan . |

OTHER PUBLICATIONS

Patent Abstracts of Japan, vol. 12, No. 313, with Respect to Japanese Patent Document No. 63-81313 (Apr. 12, 1988) Aug. 25, 1988.

*Primary Examiner*—Bruce Y. Arnold
*Assistant Examiner*—James Phan
*Attorney, Agent, or Firm*—Fitzpatrick, Cella, Harper & Scinto

[57] ABSTRACT

A zoom lens of the rear focus type is disclosed, comprising, from front to rear, a first lens group of positive power, a second lens group of negative power, a third lens group of positive power and a fourth lens group of positive power, wherein zooming from the wideangle end to the telephoto end is performed by axially moving the first, second and fourth lens groups in differential relation to one another, and focusing is performed by axially moving the fourth lens group alone.

11 Claims, 38 Drawing Sheets

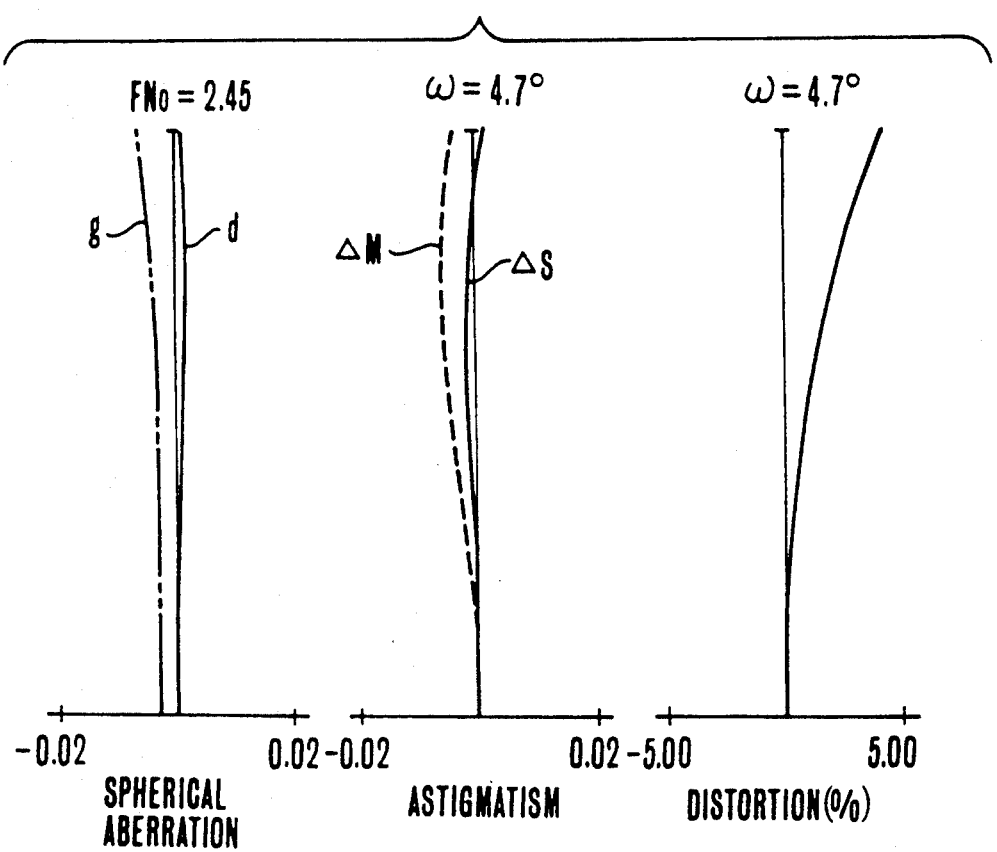

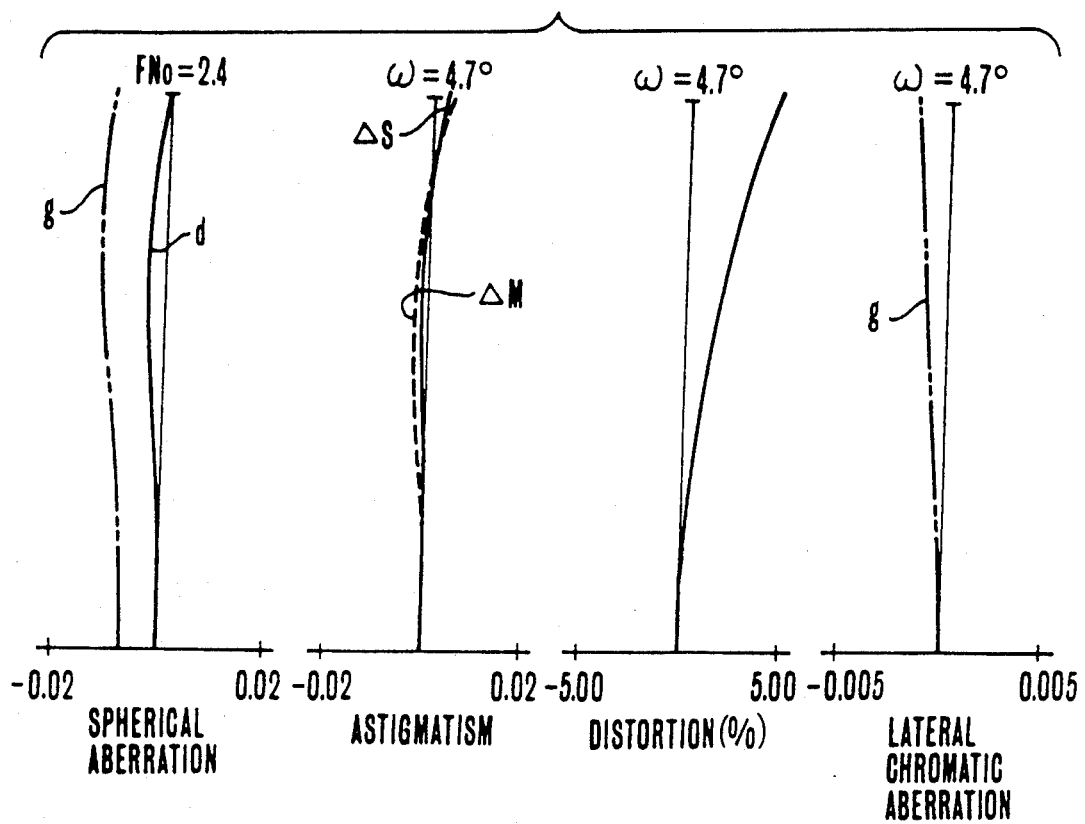

5,134,524

REAR FOCUS TYPE ZOOM LENS

BACKGROUND OF THE INVENTION

1. Field of the Invention

This invention relates to zoom lenses of the rear focus type and, more particularly, to zoom lenses of the rear focus type having a high range of 6 and a large aperture ratio of about 1.8 in F-number for use in photographic cameras, video cameras and broadcast cameras.

2. Description of the Related Art

The conventional idea of reducing the size of a zoom lens while still preserving the relatively high zoom ratio is known in, for example, U.S. Pat. Nos. 3,501,224, 4,256,381 and 4,720,180, where the zoom lens is constructed, comprising, from front to rear, a first lens group of positive power, a second lens group of negative power, a third lens group of positive power and a fourth lens group of positive power, whereby the first and second lens groups and further, the fourth lens group are made movable. With this, although the size is minimized, the relatively high zoom ratio is obtained.

In particular, the above-cited U.S. Pat. No. 4,256,381 discloses a specific example of using a diaphragm arranged in the space between the second and third lens groups to be stationary relative to the third lens group. This zoom lens gets the first lens group reduced in diameter. And, focusing is performed by moving either the entire lens system or the first lens group.

Meanwhile, the choice of one of the other lens groups than the first lens group in focusing, or the use of the so-called rear focus method in the zoom lens, makes it possible that the effective diameter of the first lens group becomes smaller than when focusing of the zoom lens is performed by moving the first lens group. It also makes easier close-up photography, particularly photomacrography. Further, because the focusing lens group is relatively small in size and light in weight, a weaker power suffices for driving that lens group, thereby giving an additional advantage that swifter focusing is possible.

Such a rear focus type zoom lens is exemplified in Japanese Laid-Open Patent Application No. Sho 63-44614, as comprising four lens groups, of which the first, counting from front, is of positive power, the second is of negative power and varies the image magnification, the third is of negative power and compensates for the shift of an image plane resulting from variation of the image magnification, and the fourth is of positive power. In this so-called 4-group zoom lens, the focusing provision is made at the third lens group. This zoom lens has, however, a tendency of increasing the total length of the entire lens system because a space for movement of the third lens group must be created.

In Japanese Laid-Open Patent Application No. Sho 58-136012, of three or more lens groups constituting a zoom section, a part of the lens groups is moved to effect focusing.

U.S. Pat. Nos. 4,818,083 and 4,859,042 (Japanese Laid-Open Patent Application No. Sho 62-24213) also disclose a rear focus type zoom lens comprising, from front to rear, a fixed first lens group of positive power, a second lens group of negative power, a third lens group of positive power and a fourth lens group of positive power, wherein zooming is performed by moving the second and fourth lens groups, while focusing is performed by imparting independent movement to the fourth lens group.

The zoom lenses employing the rear focus method generally get, as has been described before, merits of promoting minimization of the size of the entire lens system, enabling focusing to be sped up, and making it easier to perform close-up photography.

However, variation of aberrations with focusing, on the other hand, increases so largely that it becomes very difficult to reduce the bulk and size of the entirety of the lens system in such a manner that the high optical performance is stabilized against focusing from an infinitely distant object to a closest object, or throughout the entire range of object distances.

Particularly for the large-relative-aperture high-range zoom lens, a problem arises wherein it becomes very difficult to obtain high optical performance throughout the entire range of variation of the image magnification and throughout the entire range of object distances.

SUMMARY OF THE INVENTION

With such problems in mind, an object of the invention is to provide a zoom lens of compact form, particularly with the total length shortened on the wideangle side, while, despite the employment of the rear focus method, achieving excellent optical performance.

A zoom lens of the invention comprises, from front to rear, a first lens group having a positive refractive power, a second lens group having a negative refractive power, a third lens group having a positive refractive power, and a fourth lens group having a positive refractive power, being characterized in that zooming from the wide-angle end to the telephoto end is performed in such a manner that the air separation between the first lens group and the second lens group is widened, the air separation between the second lens group and the third lens group is narrowed, and the fourth lens group is axially moved, and focusing is performed by moving the fourth lens group.

BRIEF DESCRIPTION OF THE DRAWINGS

FIGS. 5(A), 5(B) and 5(C) are graphs of the various aberrations of the numerical example 3.

FIGS. 17(A), 17(B) and 17(C) are graphs of the various aberrations of the numerical example 12.

In the aberration graphs, the ones whose figure numbers are attached to a suffix (A) show the aberrations in the wide-angle end, the ones which are attached to a suffix (B) show the aberrations in the middle position, and the ones which are attached to a suffix (C) show the aberrations in the telephoto end.

In the longitudinal section views and aberration graphs, I, II, III and IV represent respectively the first, second, third and fourth lens groups, d stands for the spectral d-line, g for the spectral g-line, $\Delta M$ for the meridional image surface, AS for the sagittal image surface, and SP for the aperture stop.

DETAILED DESCRIPTION OF THE PREFERRED EMBODIMENTS

Figure 1:
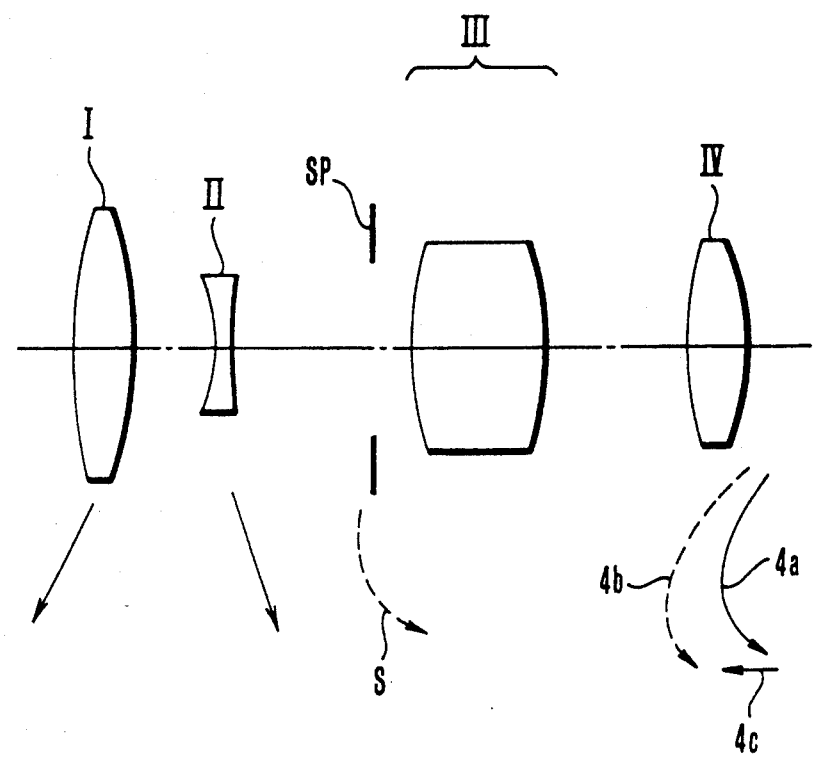
FIG. 1 is a diagram illustrating the paraxial refractive power arrangement of the invention.
Figure 2:
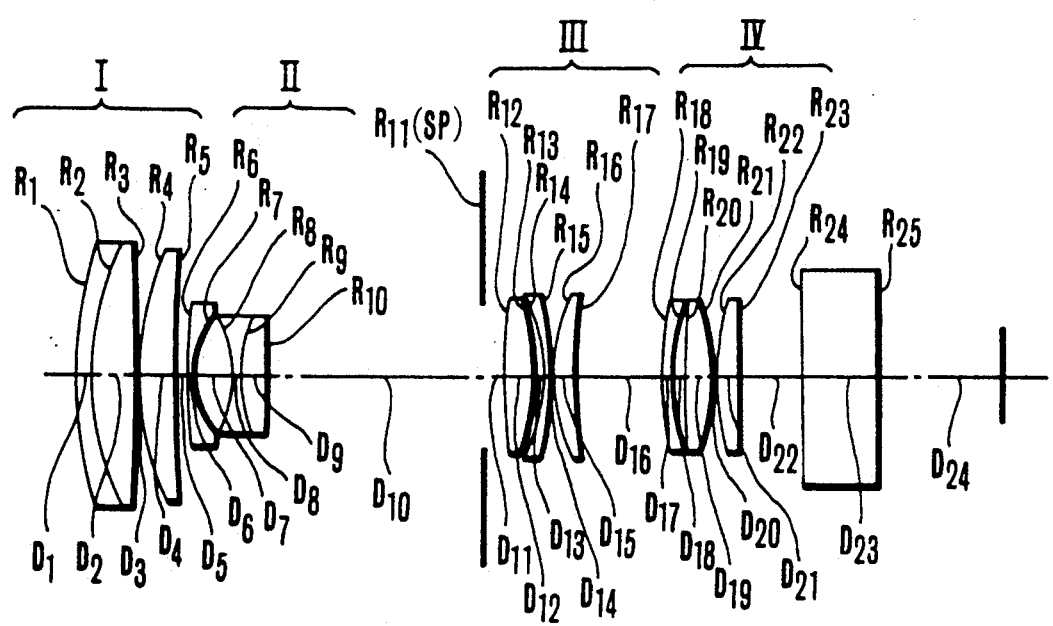
FIG. 2 is a longitudinal section view of numerical examples 1 to 6 of the invention.
Figure 3A:
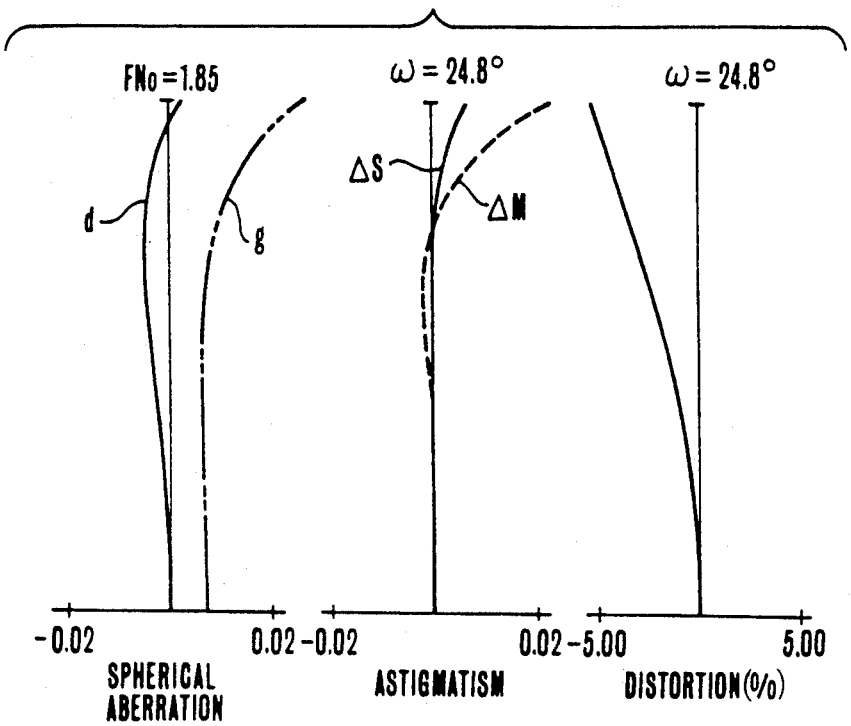
FIGS. 3(A), 3(B) and 3(C) are graphs of the various aberrations of the numerical example 1.
Figure 3B:
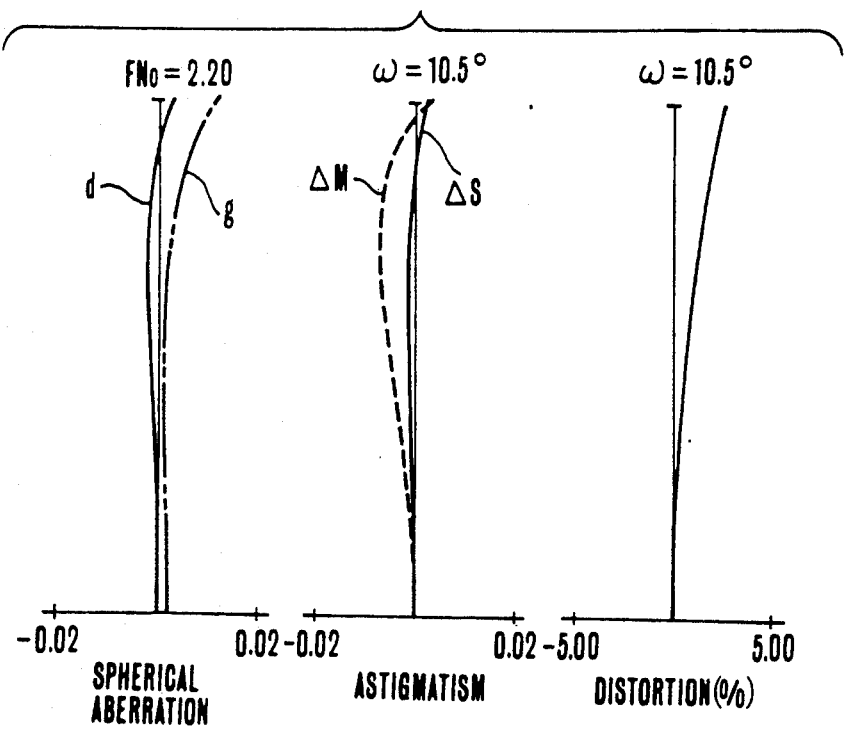
Figure 3C:
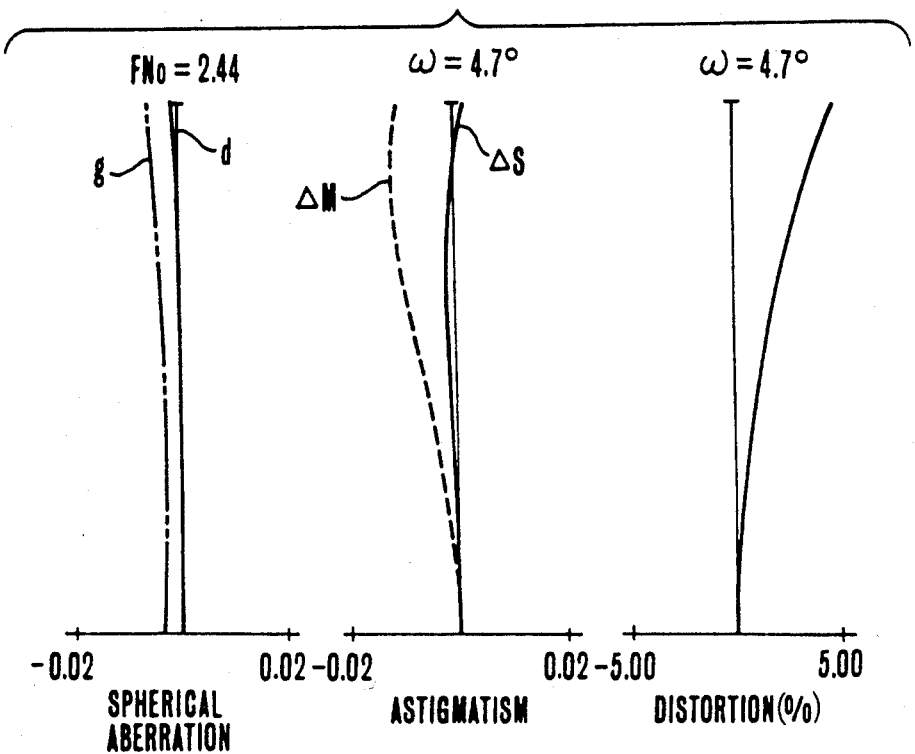
Figure 4A:
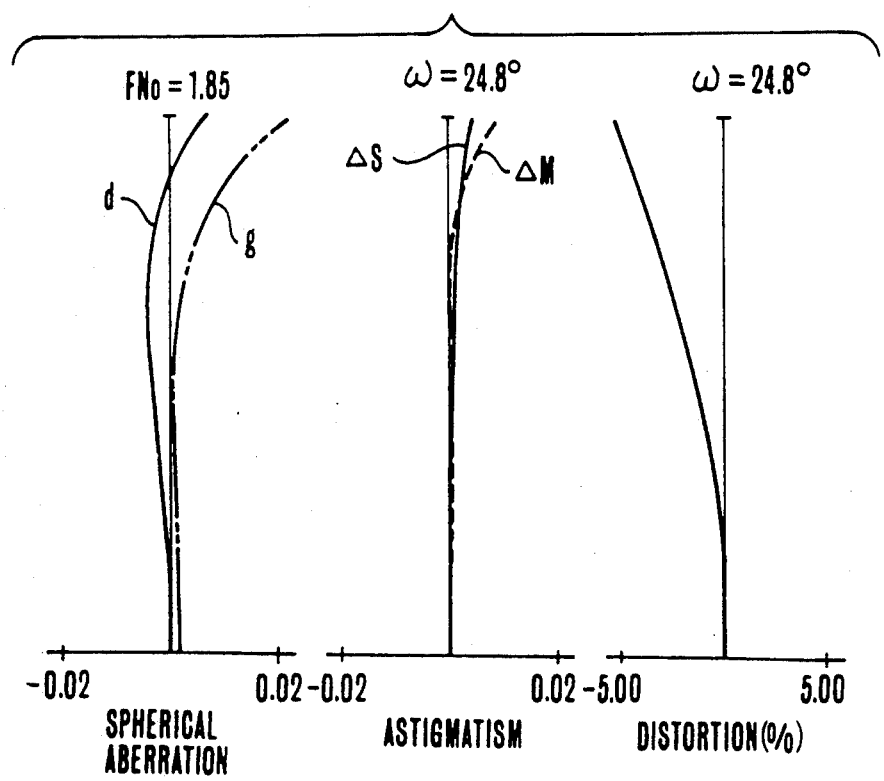
FIGS. 4(A), 4(B) and 4(C) are graphs of the various aberrations of the numerical example 2.
Figure 4B:
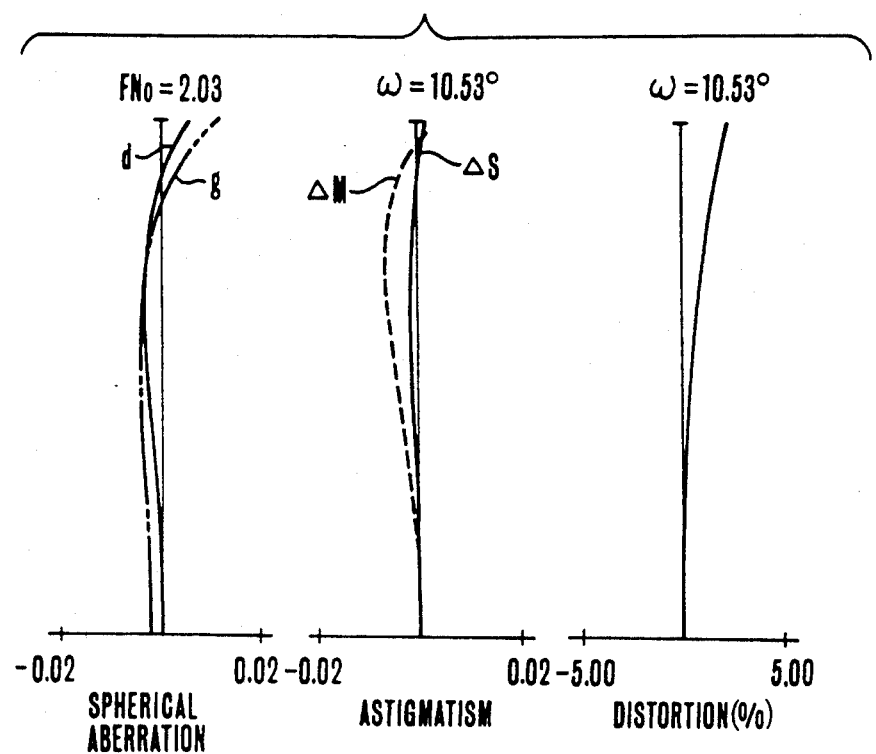
Figure 4C:
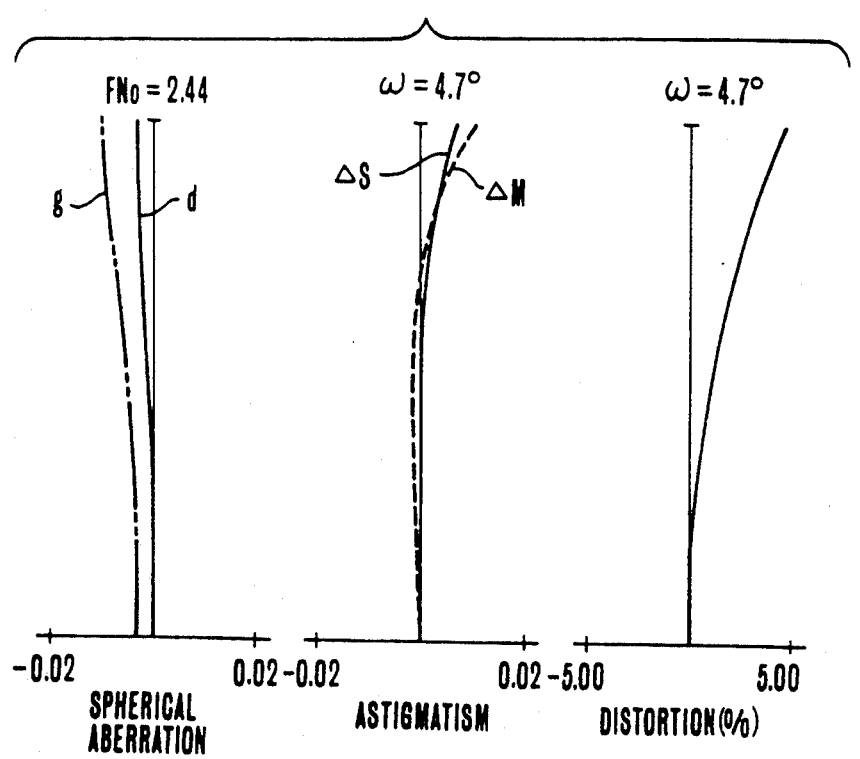
Figure 5A:
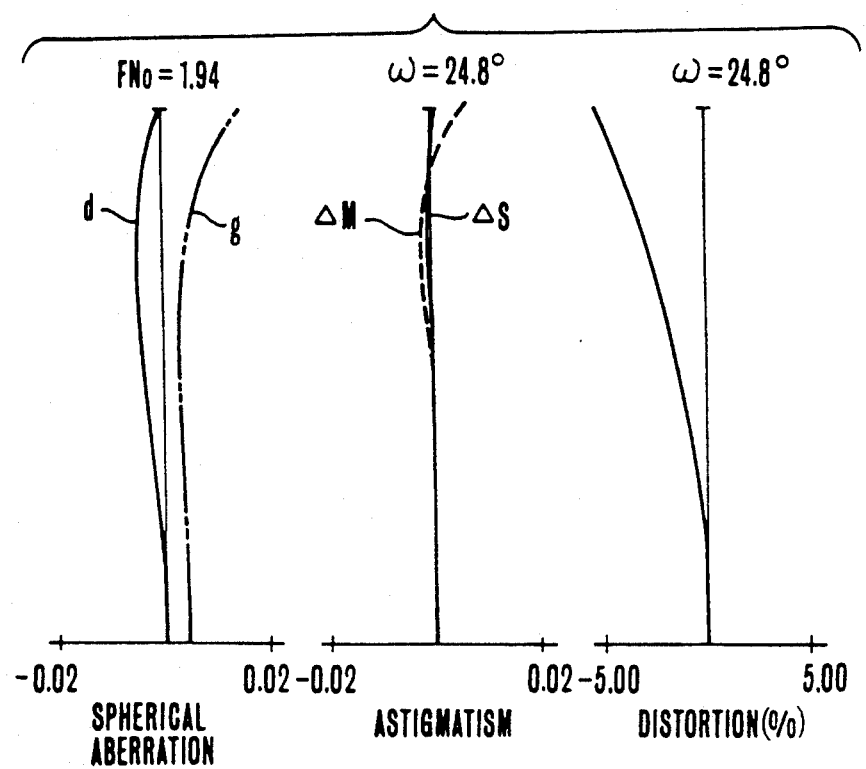
Figure 5B:
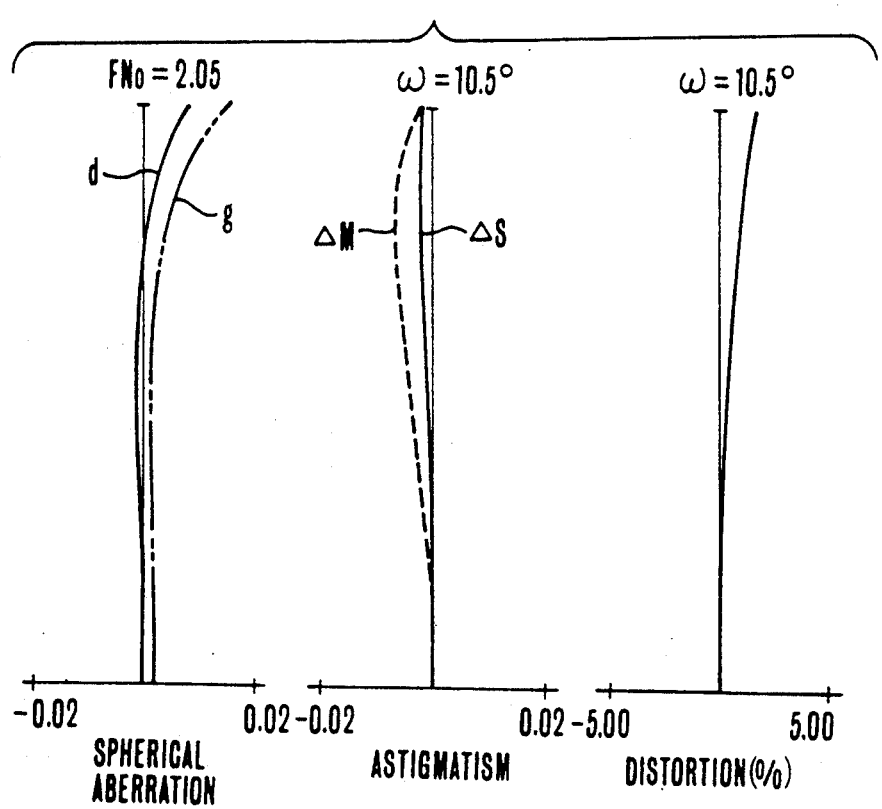
Figure 6A:
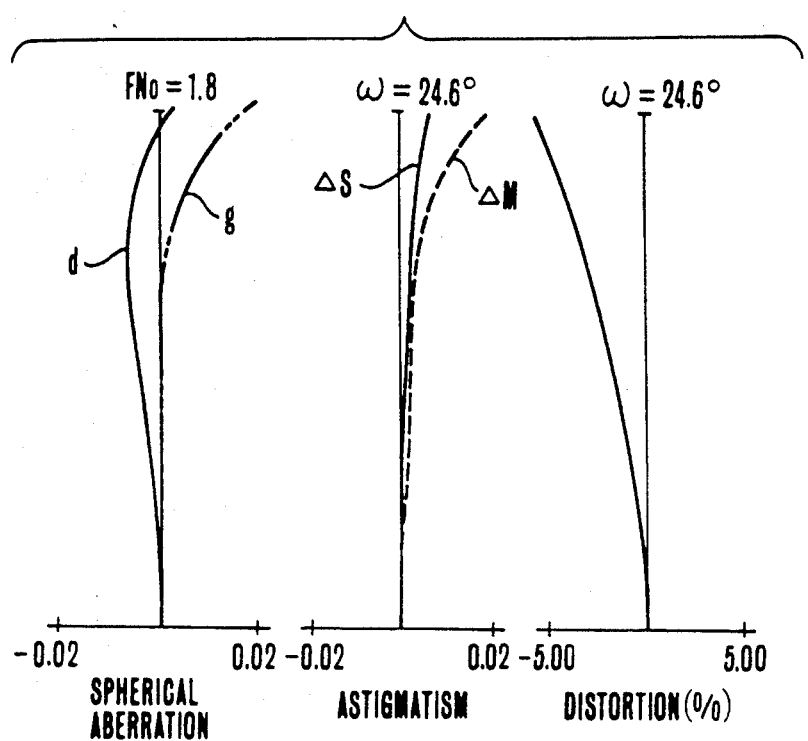
FIGS. 6(A), 6(B) and 6(C) are graphs of the various aberrations of the numerical example 4.
Figure 6B:
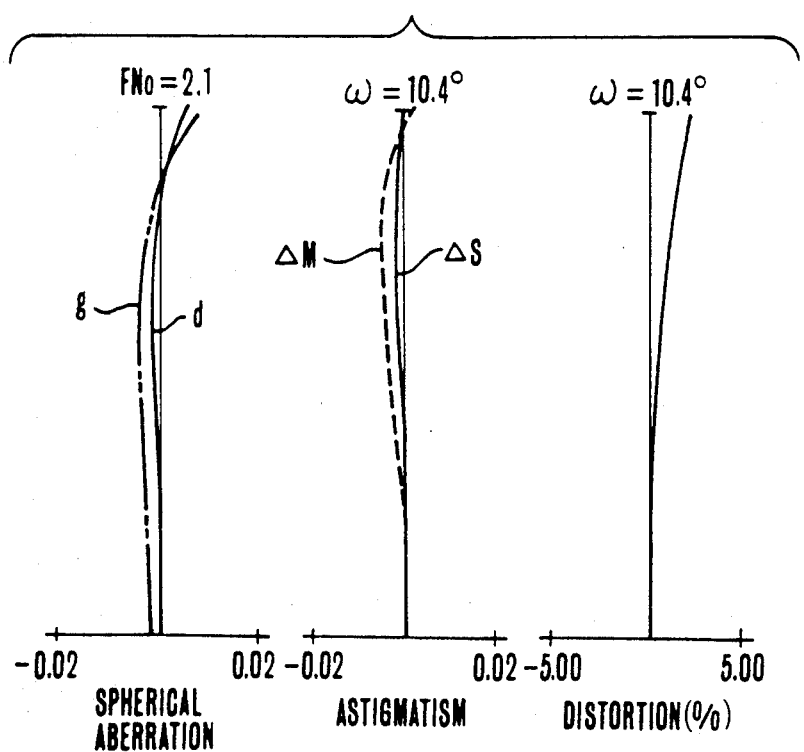
Figure 6C:
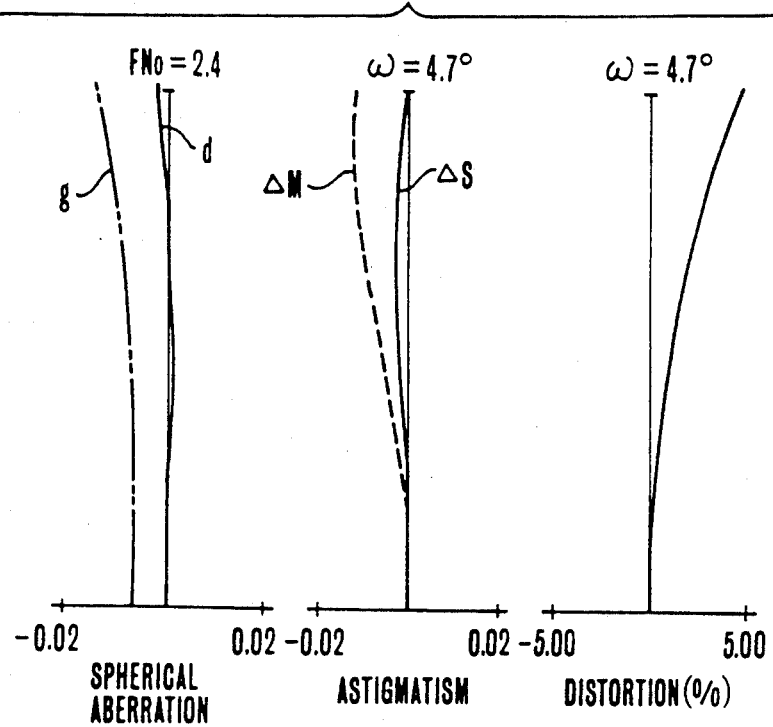
Figure 7A:
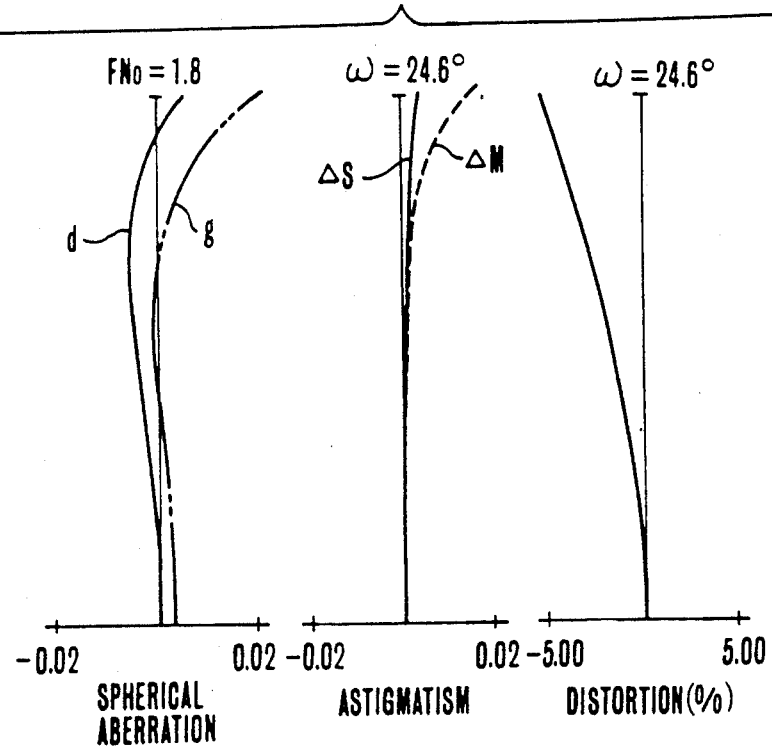
FIGS. 7(A), 7(B) and 7(C) are graphs of the various aberrations of the numerical example 5.
Figure 7B:
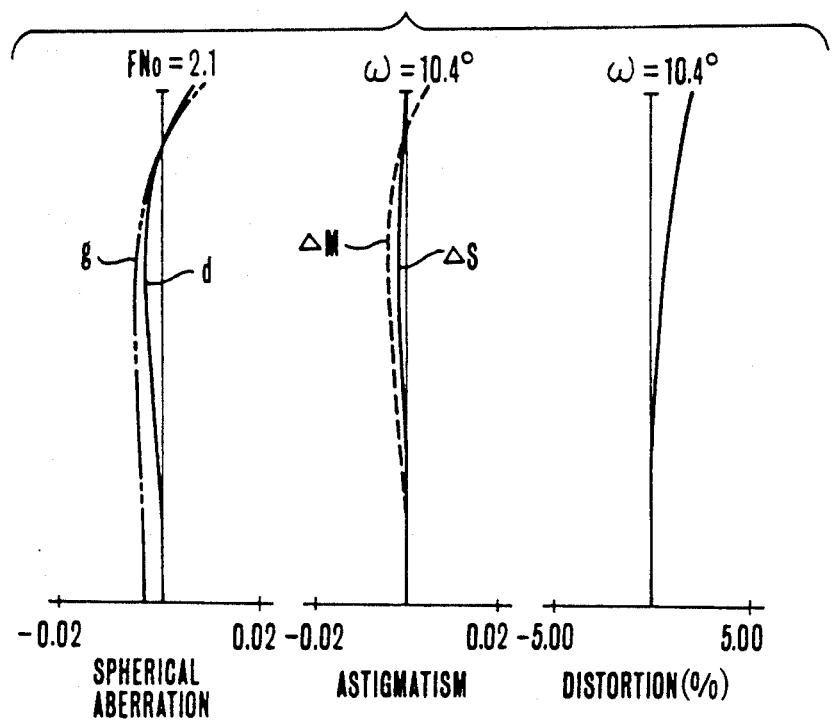
Figure 7C:
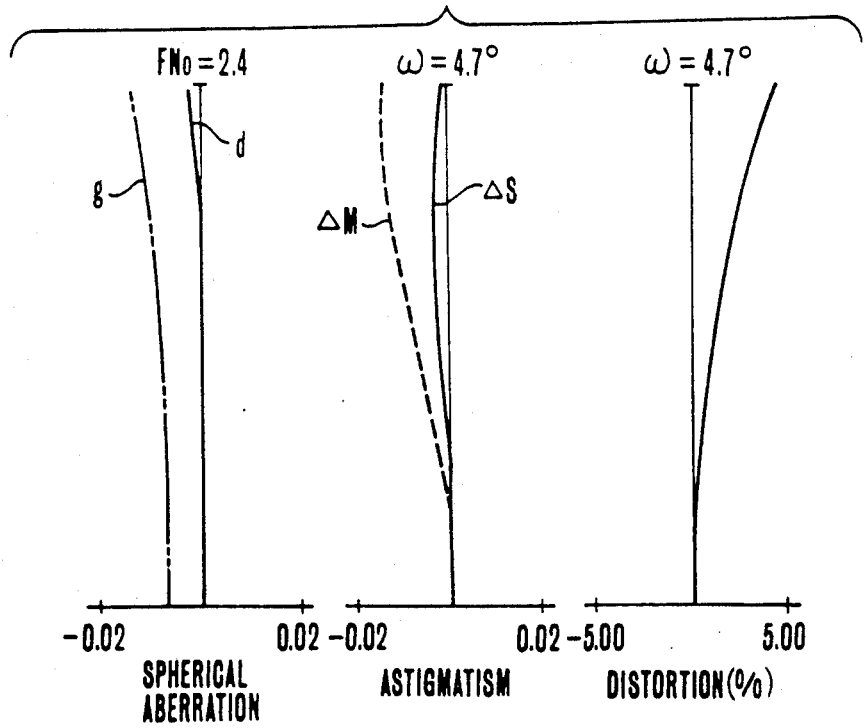
Figure 8A:
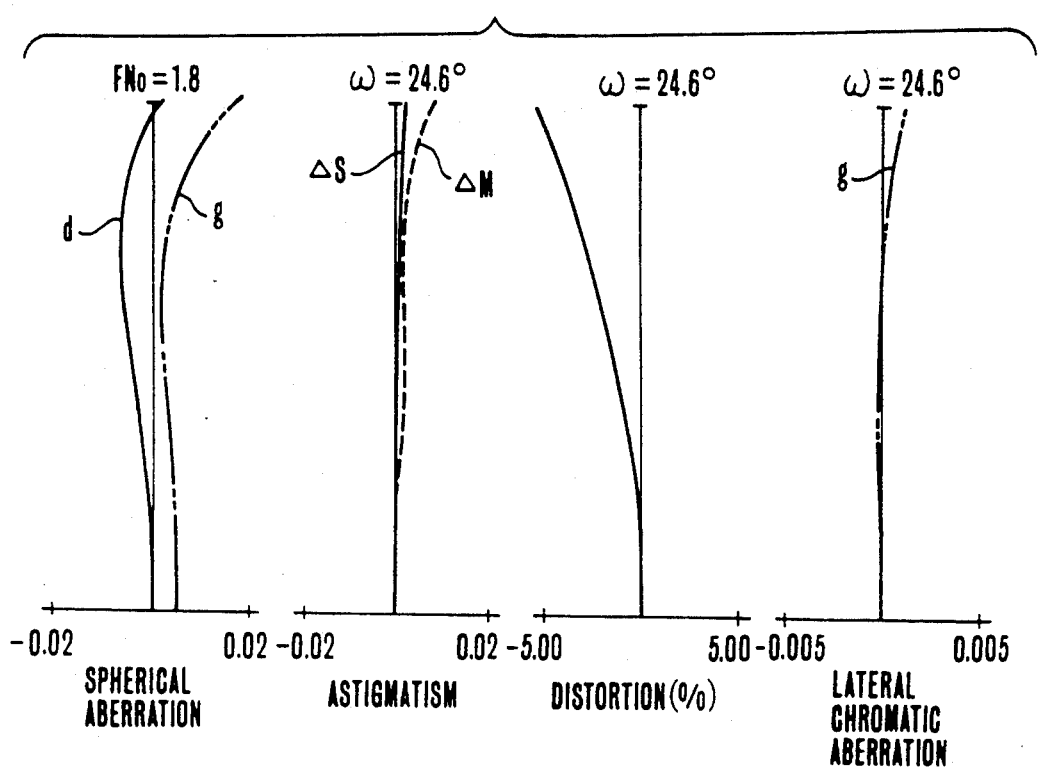
FIGS. 8(A), 8(B) and 8(C) are graphs of the various aberrations of the numerical example 6.
Figure 8B:
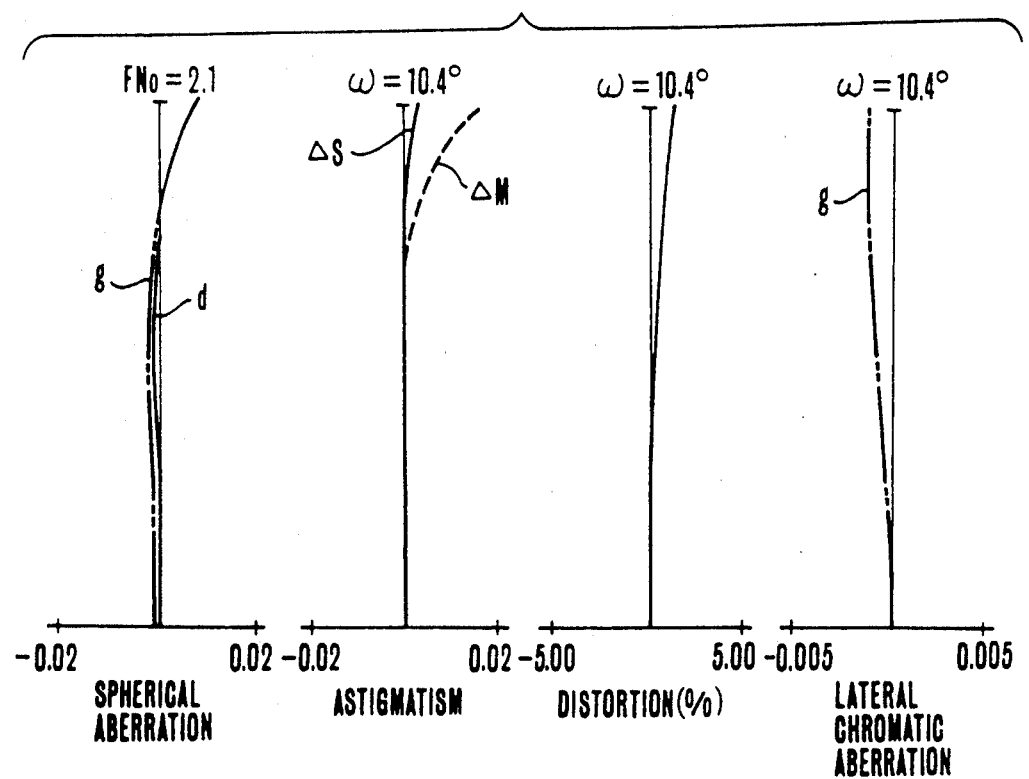
Figure 8C:
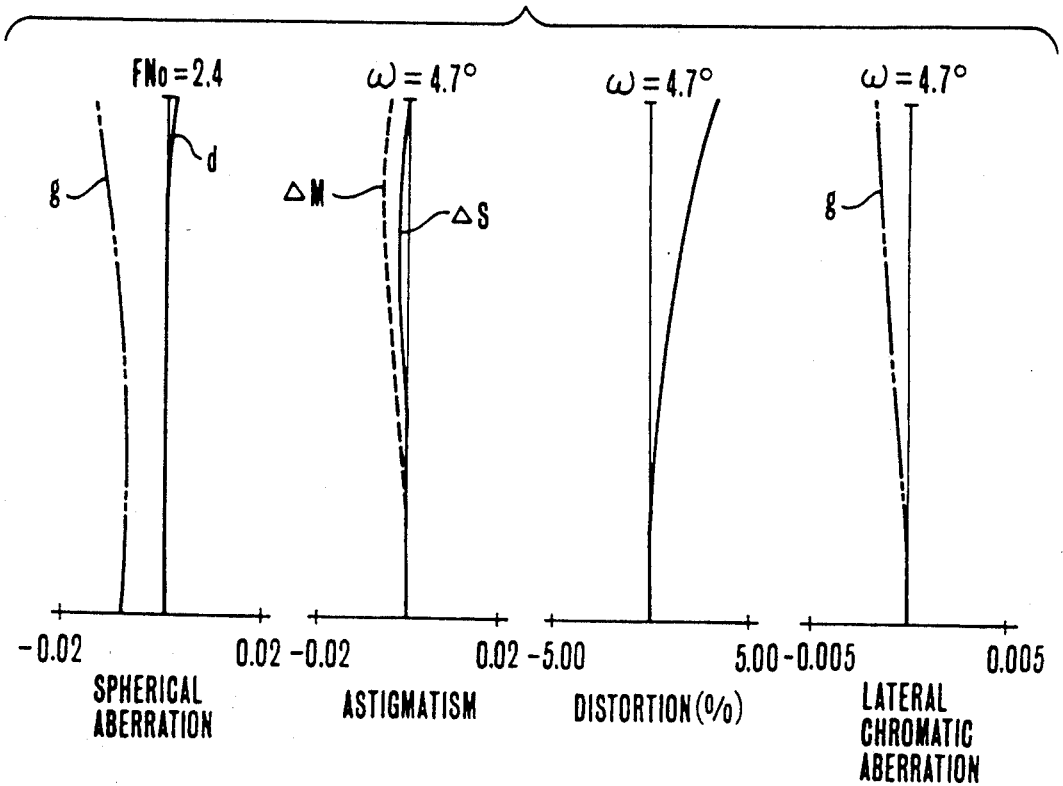

FIG. 1 is a schematic view of the paraxial refractive power arrangement of an embodiment of a zoom lens of the rear focus type according to the invention.

This zoom lens comprises a first lens group I of positive refractive power, a second lens group II of negative refractive power, a third lens group III of positive refractive power and a fourth lens group IV of positive refractive power with an aperture stop SP for determining the F-number arranged in the space between the second lens group II and the third lens group III.

When zooming from the wide-angle end to the telephoto end, as shown by arrows, the first lens group I is moved toward the object side, the second lens group II is moved toward the image side, and, at the same time, the shift of an image plane with variation of the image magnification is compensated for by moving the fourth lens group IV.

Again, this zoom lens employs the rear focus method so that focusing is performed by axially moving the fourth lens group IV. This is indicated by the axially spaced relation of a solid line curve 4a and a dashed line curve 4b from each other, along which the fourth lens group, while keeping focusing on an infinitely distant object or a close object respectively, is moved to compensate for the image shift, as the image magnification is varied from the wide-angle end to the telephoto end. The third lens group remains stationary during focusing and zooming.

In the present embodiment, the compensation for the image shift with the variation of the image magnification is performed by moving the fourth lens group, and focusing is performed by moving the fourth lens group. In particular, as shown in the curves 4a and 4b of FIG. 1, when zooming from the wide-angle end to the telephoto end, the fourth lens group is moved so as to have a locus convex toward the object side. This allows the space between the third lens group and the fourth lens group to be effectively utilized, thus achieving an advantage of shortening the total length of the lens.

In the present embodiment, in, for example, the telephoto end, focusing from an infinitely distant object to a close object is performed by moving the fourth lens group forward as shown by a straight line 4c of FIG. 1.

In the present embodiment, the employment of such a rear focus method as described above more advantageously prevents an increase of the effective diameter of the first lens group than when the first lens group is moved forward to effect focusing in the conventionally common or 4-group zoom lens.

And, by arranging the aperture stop just in front of the third lens group, the variation of aberrations by the movable lens groups is lessened and the distance between the aperture stop and the first lens group gets shorter than was heretofore used. The latter makes it easy to achieve a shortening of the diameter of the front lens groups.

And, in the invention, letting the interval between the principal points of the third and fourth lens groups in the telephoto end when focused on an infinitely distant object be denoted by $e_{3T}$ and the shortest focal length of the entire lens system by $f_W$, the following condition is satisfied:

$$1.4 < e_{3T}/f_W < 2.0 \tag{1}$$

The inequalities of condition (1) concern the paraxial principal point interval of the third lens group and the fourth lens group in the telephoto end. When the spacing between the third and fourth lens groups is too small as beyond the lower limit, it becomes difficult to secure the space that allows forward movement for focusing on the minimum object distance. Conversely, when the spacing is too large as beyond the upper limit, a large dead space is formed, which objectionably increases the total length of the entire system.

Also, letting the zooming movements of the first lens group and the second lens group from the wide-angle end to the telephoto end be denoted by $m_1$ and $m_2$ respectively, the following condition is satisfied:

$$0.9 < m_1/m_2 < 1.9 \tag{2}$$

Further, letting the lateral magnification of the second lens group in the telephoto end be denoted by $\beta_{2T}$ and the zoom ratio by Z, the following condition is satisfied:

$$0.6 < |\beta_{2T}/\sqrt{Z}| < 1.1 \quad (3)$$

Further, it is desirable that the focal lengths $f_1$ and $f_2$ of the first lens group and the second lens group satisfy respectively the following conditions:

$$0.9 < |f_2/F_W| < 1.35 \quad (4)$$

$$0.18 < f_W/f_1 < 0.25 \quad (5)$$

The inequalities of condition (2) concern the ratio of the amount of movement of the first lens group and the second lens group when zooming from the wide-angle end to the telephoto end, and their main aim is that while well correcting the variation of the aberrations when zooming, both of reducing the diameter of the front lens group and shortening of the total length of the entire lens system are carried out in good balance. When the amount of movement of the first lens group is too small as beyond the lower limit, it becomes difficult to advantageously shorten the total length of the lens in the wide-angle end. When the amount of movement of the first lens group is too large as beyond the upper limit, the diameter of the front lens groups for securing the off-axial light beam in the intermediate to the telephoto region of the zooming range is increased objectionably And, preferably, this upper limit may be taken at "1.5" or thereabout.

The inequalities of condition (3) concern the magnification of the second lens group in the telephoto end. When the magnification is too small as beyond the lower limit, the required amount of movement of the second lens group for obtaining the predetermined zoom ratio becomes large, causing the total length of the lens to increase And, preferably, this lower limit may be taken at "0.75" or thereabout. Conversely, when the magnification is too large as beyond the upper limit, the total length of the lens is shortened, but the locus of motion for the infinitely distant object of the fourth lens group changes rapidly in the neighborhood of the telephoto end, which increases the load on the electric motor or like drive means. So, this should be avoided.

The inequalities of condition (4) concern the refractive power of the second lens group and has an aim of advantageously obtaining the predetermined zoom ratio while lessening the variation of the aberrations with zooming. When the refractive power of the second lens group is too strong as beyond the lower limit, the decrease of the size of the entire lens system becomes easy, but the Petzval sum increases in the negative direction and the curvature of field increases. With these, the variation of the aberrations with zooming increases. When the refractive power of the second lens group is too weak as beyond the upper limit, the variation of the aberrations with zooming decreases, but the amount of movement of the second lens group increases to obtain the predetermined zoom; ratio, which causes the total length of the lens to increase objectionably. And, preferably, the upper limit may be taken at "1.2" or thereabout.

The inequalities of condition (5) concern the positive refractive power of the first lens group and the focal length of the entire lens system in the wide-angle end. When the refractive power of the first lens group is weaker than the lower limit, the amount of movement for obtaining the predetermined zoom ratio of the first lens group becomes larger, which in turn causes the total length of the lens to increase. Conversely, when the refractive power is too strong as beyond the upper limit, the influence of the backlash of the first lens group on the image surface increases, so that the image fluctuation increases objectionably.

It is recommended to satisfy the following additional conditions:

$$2.0 < f_4/f_W < 3.1 \quad (6)$$

$$2.2 < f_3/f_W < 3.4 \quad (7)$$

where $f_3$ and $f_4$ are the focal lengths of the third lens group and the fourth lens group respectively.

The inequalities of condition (6) concern the positive refractive power of the fourth lens group and their main aim is to correct well the variation of the aberrations with zooming and focusing. When the positive refractive power of the fourth lens group is too strong as beyond the lower limit, under-correction of spherical aberration results and the variation with zooming of the aberrations, particularly lateral chromatic aberration, increases. So, it becomes difficult to correct these well. When the positive refractive power of the fourth lens group is too weak as beyond the upper limit, the range of zooming and focusing movement of the fourth lens group gets too large, which in turn causes the total length of the lens to increase objectionably.

The inequalities of condition (7) concern the positive refractive power of the third lens group. When the positive refractive power of the third lens group is stronger as exceeding the lower limit, the spherical aberration in the zoom positions on the wideangle side tends to be under-corrected Also, to obtain the predetermined back focal distance, the increase of the positive refractive power of the third lens group has to lead to an equivalent decrease of the positive refractive power of the fourth lens group. Along with this, the amount of movement for focusing of the fourth lens group is caused to increase objectionably. When the positive refractive power of the third lens group is too weak as beyond the upper limit, the spherical aberration on the wide-angle side tends to be over-corrected.

By the way, in the zoom lens of the rear focus type of the present invention, determination of the diameter of the first lens group is made in a different way from that for the zoom lens of the type in which focusing is performed by moving the first lens group, or in such a way that the off-axial light beam in the intermediate focal length positions is not vignetted.

With this in mind, in the present embodiment, further provision is made for an even smaller diameter of the first lens group by lowering the height at which the off-axial light beam passes through the first lens group. For this purpose, the aperture stop SP is brought nearer to the first lens group side (object side) in zooming positions for the intermediate focal length region than at least in the telephoto end, as shown by a dot and dash line arrow S. In other words, the aperture stop SP is made to axially move toward the image side, approaching the third lens group, as zooming from the intermediate focal length position to the telephoto end.

Next, six numerical examples 1 to 6 of zoom lenses of the invention are shown. In the numerical examples 1 to 6, Ri is the radius of curvature of the i-th lens surface counting from front, Di is the i-th axial lens thickness or air separation counting from front, and Ni and vi are respectively the refractive index and Abbe number of the glass of the i-th lens element counting from front.

Incidentally, the R24 and R25 define a face plate or like block of glass material.

| Numerical Example 1 (FIGS. 2, 3(A), 3(B) and 3(C)) | | | |
|---|---|---|---|
| F = 1 − 5.63  FNo = 1:1.85 − 2.44  2ω = 49.59° − 9.37° | | | |
| R1 = 10.2800 | D1 = 0.1529 | N1 = 1.80518 | ν1 = 25.4 |
| R2 = 3.8330 | D2 = 0.5762 | N2 = 1.51633 | ν2 = 64.1 |
| R3 = −12.6757 | D3 = 0.0235 | | |
| R4 = 3.4193 | D4 = 0.3881 | N3 = 1.65844 | ν3 = 50.9 |
| R5 = 16.4603 | D5 = Variable | | |
| R6 = 4.9397 | D6 = 0.0870 | N4 = 1.83400 | ν4 = 37.2 |
| R7 = 0.8056 | D7 = 0.2174 | | |
| R8 = −0.8892 | D8 = 0.0870 | N5 = 1.51823 | ν5 = 59.0 |
| R9 = 1.3628 | D9 = 0.2500 | N6 = 1.84666 | ν6 = 23.9 |
| R10 = −4.0381 | D10 = Variable | | |
| R11 = Stop | D11 = Variable | | |
| R12 = 5.2860 | D12 = 0.3152 | N7 = 1.69680 | ν7 = 55.5 |
| R13 = −1.8972 | D13 = 0.0506 | | |
| R14 = −1.3783 | D14 = 0.0870 | N8 = 1.80518 | ν8 = 25.4 |
| R15 = −2.7818 | D15 = 0.0163 | | |
| R16 = 1.5297 | D16 = 0.2065 | N9 = 1.51633 | ν9 = 64.1 |
| R17 = 2.8053 | D17 = Variable | | |
| R18 = 3.9497 | D18 = 0.0870 | N10 = 1.84666 | ν10 = 23.9 |
| R19 = 1.6801 | D19 = 0.1304 | | |
| R20 = 6.0234 | D20 = 0.3261 | N11 = 1.60311 | ν11 = 60.7 |
| R21 = −2.1193 | D21 = 0.0163 | | |
| R22 = 2.0315 | D22 = 0.3261 | N12 = 1.51633 | ν12 = 64.1 |
| R23 = ∞ | D23 = 0.5435 | | |
| R24 = ∞ | D24 = 0.6522 | N13 = 1.51633 | ν13 = 64.1 |
| R25 = ∞ | | | |

| Variable Separation | Focal Length | | |
|---|---|---|---|
| | 1.00 | 2.49 | 5.63 |
| D5 | 0.21 | 2.04 | 3.12 |
| D10 | 0.70 | 0.44 | 0.29 |
| D11 | 0.98 | 0.44 | 0.11 |
| D17 | 0.69 | 0.47 | 0.88 |

| Numerical Example 2 (FIGS. 2, 4(A), 4(B) and 4(C)) | | | |
|---|---|---|---|
| F = 1 − 5.63  FNo = 1:1.85 − 2.44  2ω = 49.59° − 9.37° | | | |
| R1 = 10.3421 | D1 = 0.1413 | N1 = 1.80518 | ν1 = 25.4 |
| R2 = 3.9992 | D2 = 0.5109 | N2 = 1.51633 | ν2 = 64.1 |
| R3 = −15.7603 | D3 = 0.0217 | | |
| R4 = 3.6596 | D4 = 0.3696 | N3 = 1.65844 | ν3 = 50.9 |
| R5 = 18.5189 | D5 = Variable | | |
| R6 = 8.9176 | D6 = 0.0870 | N4 = 1.83400 | ν4 = 37.2 |
| R7 = 0.8316 | D7 = 0.2174 | | |
| R8 = −0.9693 | D8 = 0.0870 | N5 = 1.51742 | ν5 = 52.4 |
| R9 = 1.3094 | D9 = 0.2500 | N6 = 1.84666 | ν6 = 23.9 |
| R10 = −4.3621 | D10 = Variable | | |
| R11 = Stop | D11 = Variable | | |
| R12 = 3.8602 | D12 = 0.3152 | N7 = 1.69680 | ν7 = 55.5 |
| R13 = −2.0725 | D13 = 0.0870 | | |
| R14 = −1.3745 | D14 = 0.0870 | N8 = 1.80518 | ν8 = 25.4 |
| R15 = −2.7142 | D15 = 0.0163 | | |
| R16 = 1.4873 | D16 = 0.2065 | N9 = 1.51633 | ν9 = 64.1 |
| R17 = 2.6167 | D17 = Variable | | |
| R18 = 3.5822 | D18 = 0.0870 | N10 = 1.84666 | ν10 = 23.9 |
| R19 = 1.6018 | D19 = 0.1304 | | |
| R20 = 7.4759 | D20 = 0.2717 | N11 = 1.62299 | ν11 = 58.1 |
| R21 = −2.1362 | D21 = 0.0163 | | |
| R22 = 1.8207 | D22 = 0.2609 | N12 = 1.51633 | ν12 = 64.1 |
| R23 = ∞ | D23 = 0.5435 | | |
| R24 = ∞ | D24 = 0.6522 | N13 = 1.51633 | ν13 = 64.1 |
| R25 = ∞ | | | |

-continued

| Numerical Example 2 (FIGS. 2, 4(A), 4(B) and 4(C)) | | | |
|---|---|---|---|
| Variable Separation | Focal Length | | |
| | 1.00 | 2.49 | 5.63 |
| D5 | 0.24 | 2.25 | 3.44 |
| D10 | 1.27 | 0.15 | 0.14 |
| D11 | 0.26 | 0.59 | 0.15 |
| D17 | 0.74 | 0.51 | 0.86 |

| Numerical Example 3 (FIGS. 2, 5(A), 5(B) and 5(C)) | | | |
|---|---|---|---|
| F = 1.0 − 5.63  FNo = 1:1.94 − 2.45  2ω = 49.59° − 9.37° | | | |
| R1 = 9.0952 | D1 = 0.1413 | N1 = 1.80518 | ν1 = 25.4 |
| R2 = 3.7347 | D2 = 0.5326 | N2 = 1.51633 | ν2 = 64.1 |
| R3 = −13.0473 | D3 = 0.0217 | | |
| R4 = 3.0669 | D4 = 0.3587 | N3 = 1.65844 | ν3 = 50.9 |
| R5 = 10.6658 | D5 = Variable | | |
| R6 = 3.5481 | D6 = 0.0870 | N4 = 1.83400 | ν4 = 37.2 |
| R7 = 0.7775 | D7 = 0.2604 | | |
| R8 = −0.9545 | D8 = 0.0870 | N5 = 1.51742 | ν5 = 52.4 |
| R9 = 1.3083 | D9 = 0.2500 | N6 = 1.84666 | ν6 = 23.9 |
| R10 = −5.9512 | D10 = Variable | | |
| R11 = Stop | D11 = Variable | | |
| R12 = 4.4207 | D12 = 0.3152 | N7 = 1.69680 | ν7 = 55.5 |
| R13 = −1.9450 | D13 = 0.0796 | | |
| R14 = −1.3663 | D14 = 0.0870 | N8 = 1.80518 | ν8 = 25.4 |
| R15 = −2.7804 | D15 = 0.0163 | | |
| R16 = 1.5491 | D16 = 0.2065 | N9 = 1.51633 | ν9 = 64.1 |
| R17 = 2.8253 | D17 = Variable | | |
| R18 = 3.7821 | D18 = 0.0870 | N10 = 1.84666 | ν10 = 23.9 |
| R19 = 1.6754 | D19 = 0.0834 | | |
| R20 = 5.7695 | D20 = 0.2717 | N11 = 1.62299 | ν11 = 58.1 |
| R21 = −2.1706 | D21 = 0.0163 | | |
| R22 = 1.9265 | D22 = 0.2609 | N12 = 1.51633 | ν12 = 64.1 |
| R23 = ∞ | D23 = 0.5435 | | |
| R24 = ∞ | D24 = 0.6522 | N13 = 1.51633 | ν13 = 64.1 |
| R25 = ∞ | | | |

| Variable Separation | Focal Length | | |
|---|---|---|---|
| | 1.00 | 2.50 | 5.63 |
| D5 | 0.09 | 1.89 | 2.94 |
| D10 | 1.27 | 0.16 | 0.15 |
| D11 | 0.24 | 0.58 | 0.14 |
| D17 | 0.70 | 0.50 | 0.97 |

| Numerical Example 4 (FIGS. 2, 6(A), 6(B) and 6(C)) | | | |
|---|---|---|---|
| F = 1.0 − 5.56  FNo = 1:1.8 − 2.4  2ω = 49.1° − 9.4° | | | |
| R1 = 9.447 | D1 = 0.139 | N1 = 1.80518 | ν1 = 25.4 |
| R2 = 3.605 | D2 = 0.526 | N2 = 1.51633 | ν2 = 64.1 |
| R3 = −11.938 | D3 = 0.021 | | |
| R4 = 3.020 | D4 = 0.354 | N3 = 1.65844 | ν3 = 50.9 |
| R5 = 11.663 | D5 = Variable | | |
| R6 = 3.946 | D6 = 0.086 | N4 = 1.83400 | ν4 = 37.2 |
| R7 = 0.764 | D7 = 0.257 | | |
| R8 = −0.901 | D8 = 0.086 | N5 = 1.51823 | ν5 = 59.0 |
| R9 = 1.304 | D9 = 0.247 | N6 = 1.84666 | ν6 = 23.9 |
| R10 = −4.800 | D10 = Variable | | |
| R11 = Stop | D11 = 0.1 | | |
| R12 = 4.263 | D12 = 0.311 | N7 = 1.69680 | ν7 = 55.5 |
| R13 = −1.916 | D13 = 0.061 | | |
| R14 = −1.364 | D14 = 0.086 | N8 = 1.80518 | ν8 = 25.4 |
| R15 = −2.768 | D15 = 0.016 | | |
| R16 = 1.554 | D16 = 0.204 | N9 = 1.51633 | ν9 = 64.1 |
| R17 = 2.798 | D17 = Variable | | |
| R18 = 3.841 | D18 = 0.086 | N10 = 1.84666 | ν10 = 23.9 |
| R19 = 1.659 | D19 = 0.078 | | |
| R20 = 5.694 | D20 = 0.268 | N11 = 1.60311 | ν11 = 60.7 |
| R21 = −2.067 | D21 = 0.016 | | |

-continued

Numerical Example 4 (FIGS. 2, 6(A), 6(B) and 6(C))

| | | | |
|---|---|---|---|
| R22 = 1.866 | D22 = 0.258 | N12 = 1.51633 | ν12 = 64.1 |
| R23 = ∞ | D23 = 0.537 | | |
| R24 = ∞ | D24 = 0.645 | N13 = 1.51633 | ν13 = 64.1 |
| R25 = ∞ | | | |

| Variable | Focal Length | | |
|---|---|---|---|
| Separation | 1.00 | 2.48 | 5.56 |
| D5 | 0.12 | 1.86 | 2.88 |
| D10 | 1.29 | 0.56 | 0.13 |
| D17 | 0.69 | 0.50 | 0.97 |

Numerical Example 5 (FIGS. 2, 7(A), 7(B) and 7(C))

F = 1.0 − 5.56   FNo = 1:1.8 − 2.4   2ω = 49.1° − 9.4°

| | | | |
|---|---|---|---|
| R1 = 9.350 | D1 = 0.139 | N1 = 1.80518 | ν1 = 25.4 |
| R2 = 3.616 | D2 = 0.526 | N2 = 1.51633 | ν2 = 64.1 |
| R3 = −11.787 | D3 = 0.021 | | |
| R4 = 3.011 | D4 = 0.354 | N3 = 1.65844 | ν3 = 50.9 |
| R5 = 11.186 | D5 = Variable | | |
| R6 = 3.666 | D6 = 0.086 | N4 = 1.83400 | ν4 = 37.2 |
| R7 = 0.772 | D7 = 0.258 | | |
| R8 = −0.909 | D8 = 0.086 | N5 = 1.51835 | ν5 = 60.3 |
| R9 = 1.309 | D9 = 0.247 | N6 = 1.84666 | ν6 = 23.9 |
| R10 = −5.468 | D10 = Variable | | |
| R11 = Stop | D11 = 0.14 | | |
| R12 = 4.106 | D12 = 0.311 | N7 = 1.71299 | ν7 = 53.8 |
| R13 = −1.894 | D13 = 0.075 | | |
| R14 = −1.360 | D14 = 0.086 | N8 = 1.84666 | ν8 = 23.9 |
| R15 = −2.814 | D15 = 0.016 | | |
| R16 = 1.578 | D16 = 0.204 | N9 = 1.51633 | ν9 = 64.1 |
| R17 = 2.884 | D17 = Variable | | |
| R18 = 3.806 | D18 = 0.086 | N10 = 1.80518 | ν10 = 25.4 |
| R19 = 1.644 | D19 = 0.078 | | |
| R20 = 5.784 | D20 = 0.268 | N11 = 1.62299 | ν11 = 58.1 |
| R21 = −2.107 | D21 = 0.016 | | |
| R22 = 1.982 | D22 = 0.258 | N12 = 1.51633 | ν12 = 64.1 |
| R23 = ∞ | D23 = 0.537 | | |
| R24 = ∞ | D24 = 0.645 | N13 = 1.51633 | ν13 = 64.1 |
| R25 = ∞ | | | |

| Variable | Focal Length | | |
|---|---|---|---|
| Separation | 1.00 | 2.48 | 5.56 |
| D5 | 1.10 | 1.84 | 2.86 |
| D10 | 1.30 | 0.57 | 0.14 |
| D17 | 0.67 | 0.49 | 0.96 |

Numerical Example 6 (FIGS. 2, 8(A), 8(B) and 8(C))

F = 1.0 − 5.57   FNo = 1:1.8 − 2.4   2ω = 49.1° − 9.4°

| | | | |
|---|---|---|---|
| R1 = 10.544 | D1 = 0.150 | N1 = 1.80518 | ν1 = 25.4 |
| R2 = 3.912 | D2 = 0.526 | N2 = 1.51633 | ν2 = 64.1 |
| R3 = −14.433 | D3 = 0.021 | | |
| R4 = 3.148 | D4 = 0.365 | N3 = 1.71999 | ν3 = 50.3 |
| R5 = 9.833 | D5 = Variable | | |
| R6 = 3.985 | D6 = 0.086 | N4 = 1.83400 | ν4 = 37.2 |
| R7 = 0.779 | D7 = 0.278 | | |
| R8 = −0.949 | D8 = 0.086 | N5 = 1.51742 | ν5 = 52.4 |
| R9 = 1.329 | D9 = 0.268 | N6 = 1.84666 | ν6 = 23.9 |
| R10 = −4.089 | D10 = Variable | | |
| R11 = Stop | D11 = 0.12 | | |
| R12 = 4.856 | D12 = 0.333 | N7 = 1.69680 | ν7 = 55.5 |
| R13 = −1.710 | D13 = 0.062 | | |
| R14 = −1.368 | D14 = 0.086 | N8 = 1.80518 | ν8 = 25.4 |
| R15 = −3.129 | D15 = 0.016 | | |
| R16 = 1.603 | D16 = 0.204 | N9 = 1.51633 | ν9 = 64.1 |
| R17 = 3.124 | D17 = Variable | | |
| R18 = 3.212 | D18 = 0.086 | N10 = 1.84666 | ν10 = 23.9 |
| R19 = 1.607 | D19 = 0.078 | | |

-continued

Numerical Example 6 (FIGS. 2, 8(A), 8(B) and 8(C))

| | | | |
|---|---|---|---|
| R20 = 5.453 | D20 = 0.268 | N11 = 1.60311 | ν11 = 60.7 |
| R21 = −2.315 | D21 = 0.016 | | |
| R22 = 2.028 | D22 = 0.258 | N12 = 1.51633 | ν12 = 64.1 |
| R23 = ∞ | D23 = 0.537 | | |
| R24 = ∞ | D24 = 0.645 | N13 = 1.51633 | ν13 = 64.1 |
| R25 = ∞ | | | |

| Variable | Focal Length | | |
|---|---|---|---|
| Separation | 1.00 | 2.49 | 5.57 |
| D5 | 0.13 | 2.00 | 3.09 |
| D10 | 1.48 | 0.63 | 0.13 |
| D17 | 0.70 | 0.51 | 0.96 |

Another embodiment which improves the optical performance or reduces the number of lens elements by applying an aspheric sphere to one of the lens groups is described below.

Figure 9:
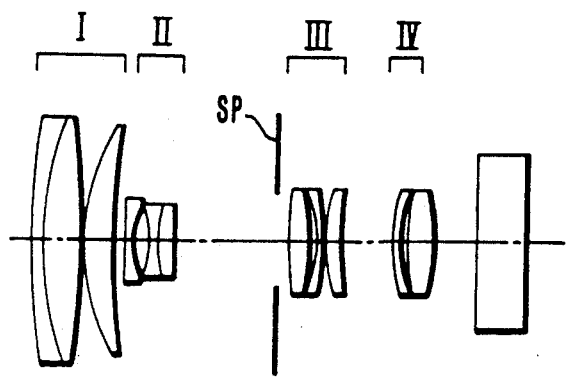
FIG. 9 is a longitudinal section view of numerical examples 7 to 9 of the invention.
Figure 10A:
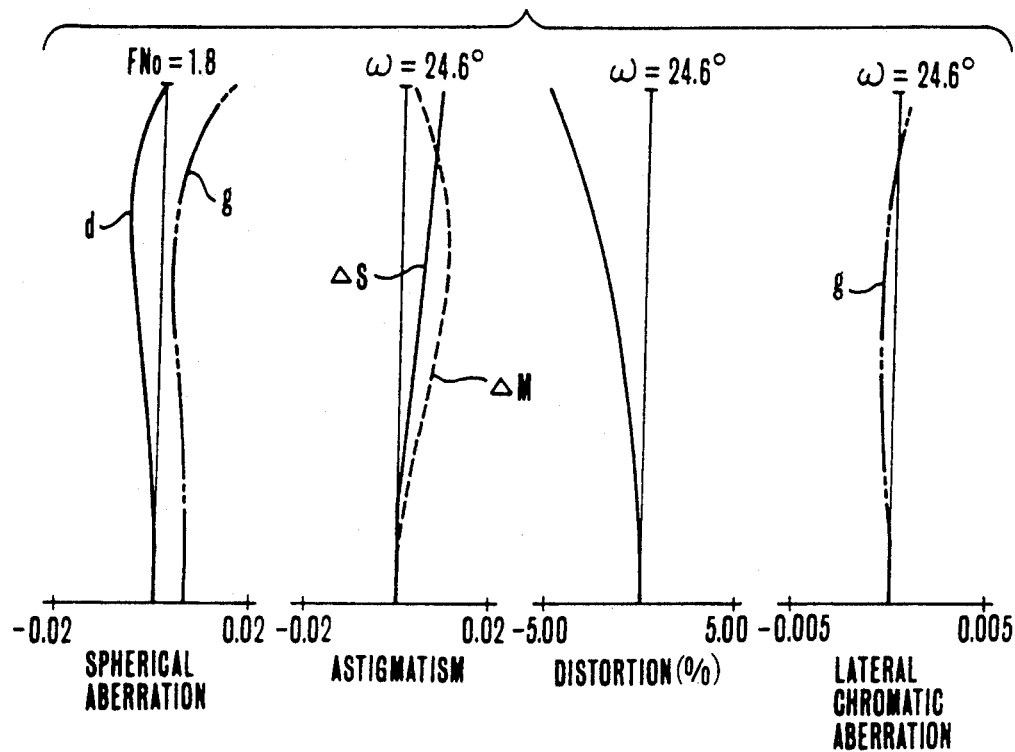
FIGS. 10(A), 10(B) and 10(C) are graphs of the various aberrations of the numerical example 7.
Figure 10B:
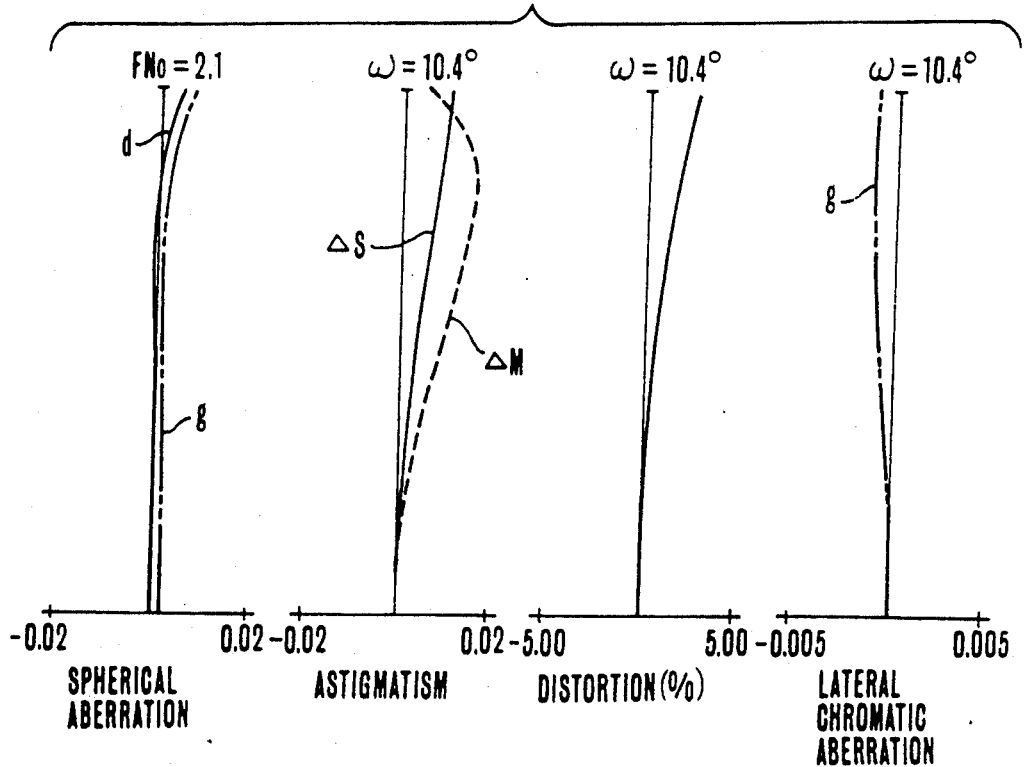
Figure 10C:
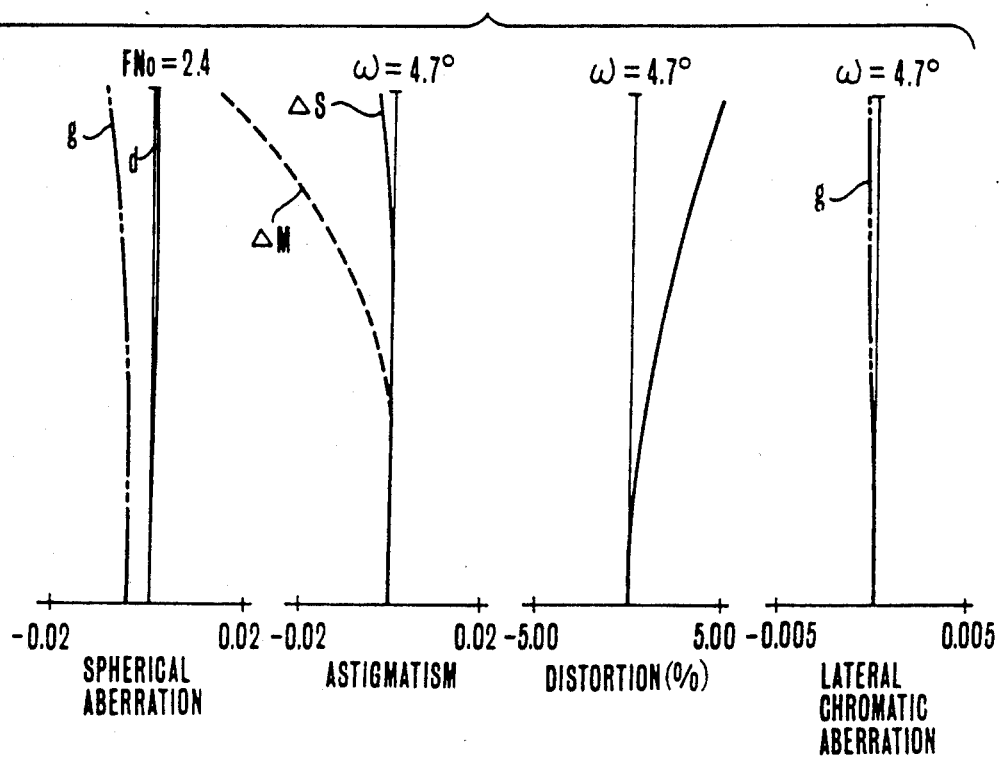
Figure 11A:
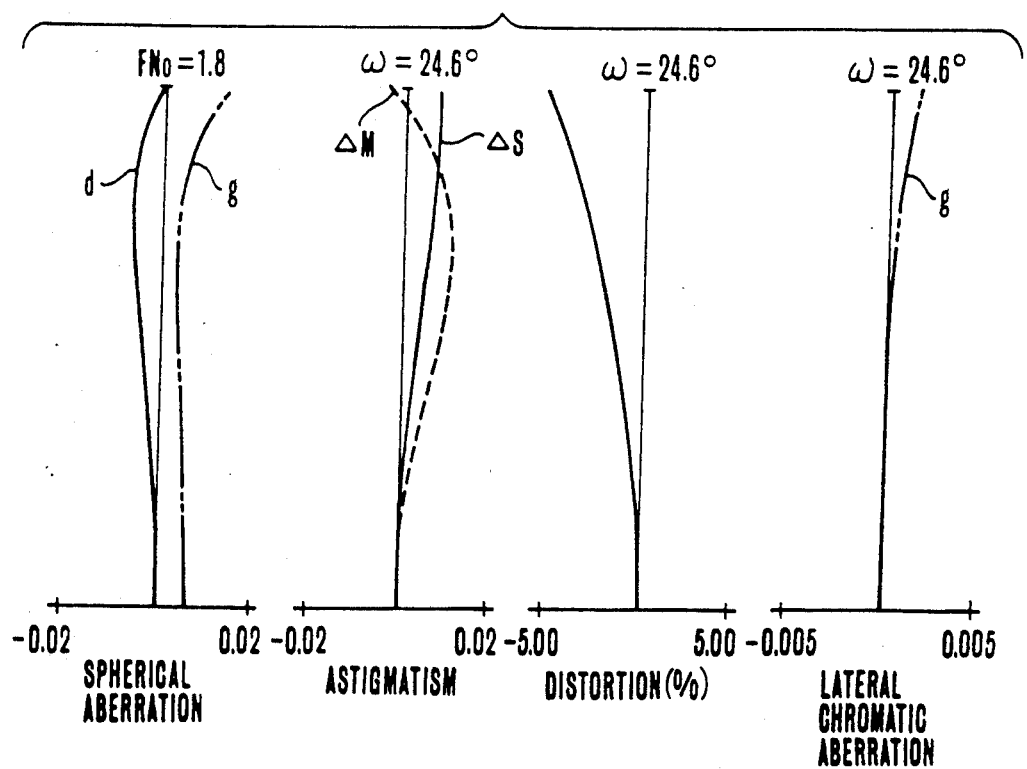
FIGS. 11(A), 11(B) and 11(C) are graphs of the various aberrations of the numerical example 8.
Figure 11B:
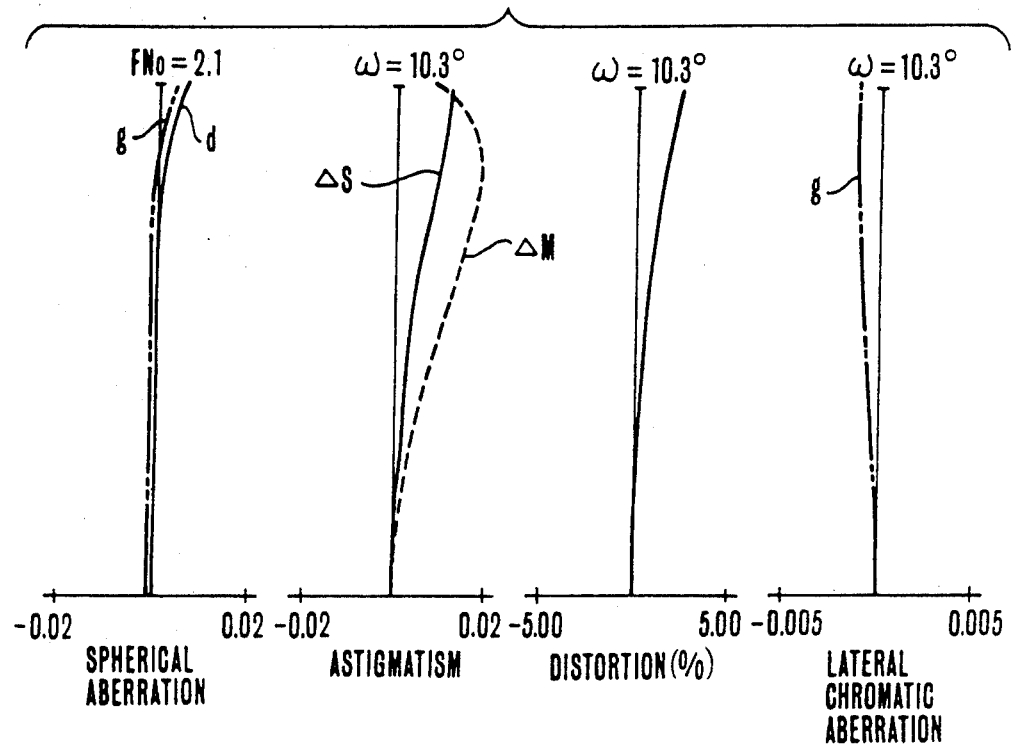
Figure 11C:
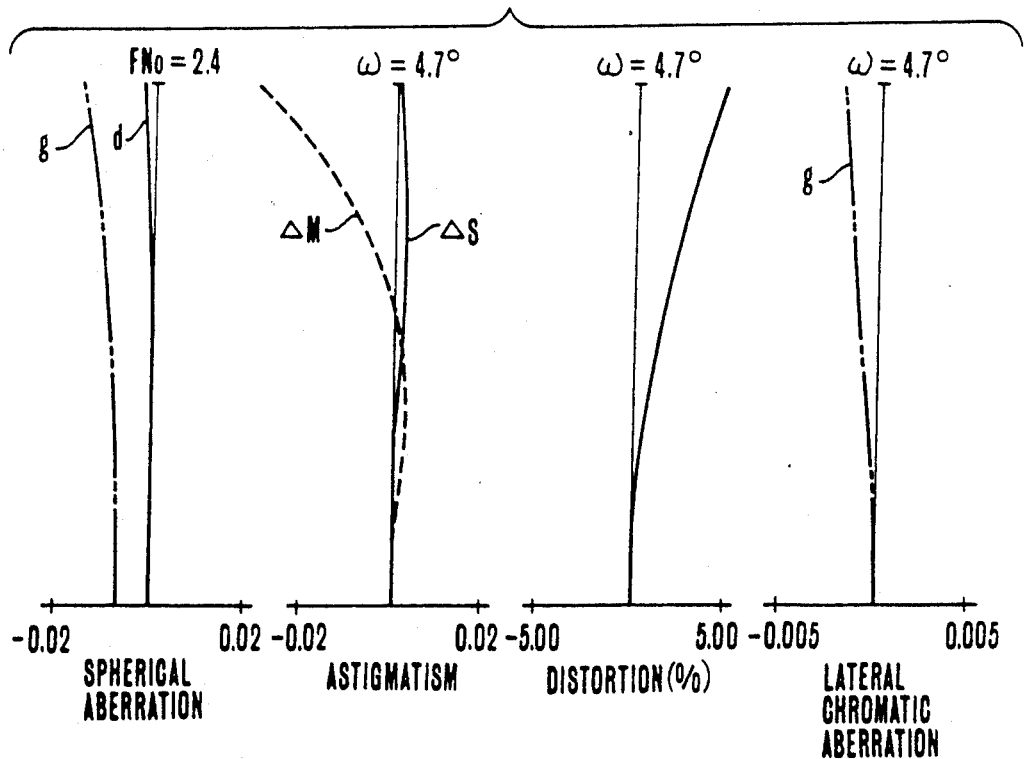
Figure 12A:
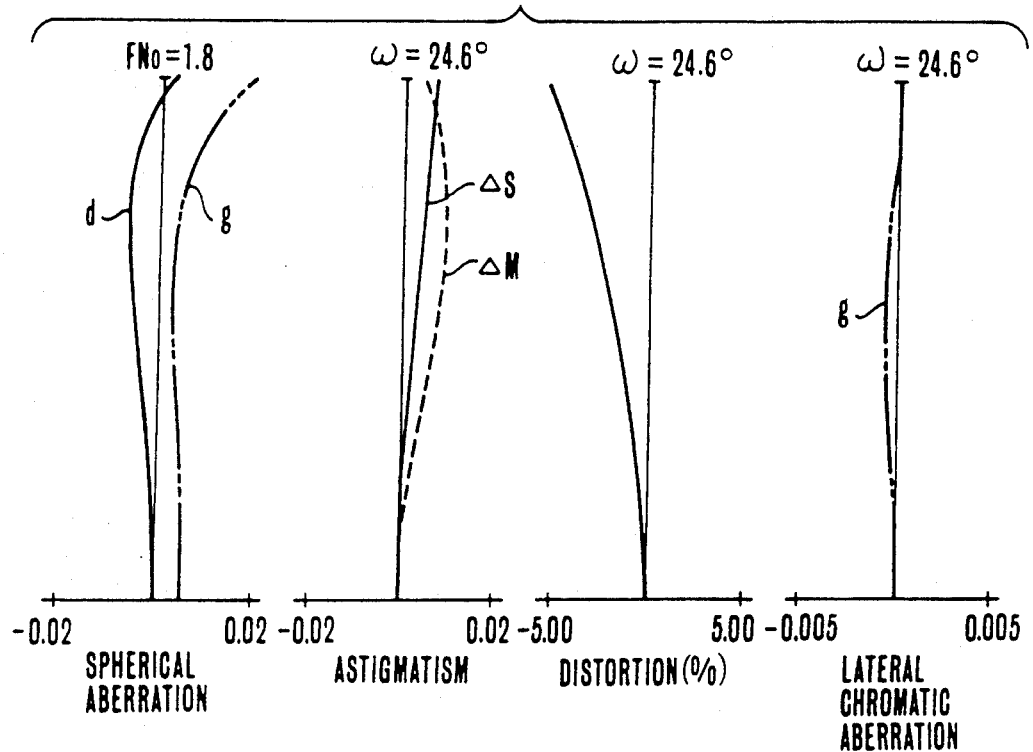
FIGS. 12(A), 12(B) and 12(C) are graphs of the various aberrations of the numerical example 9.
Figure 12B:
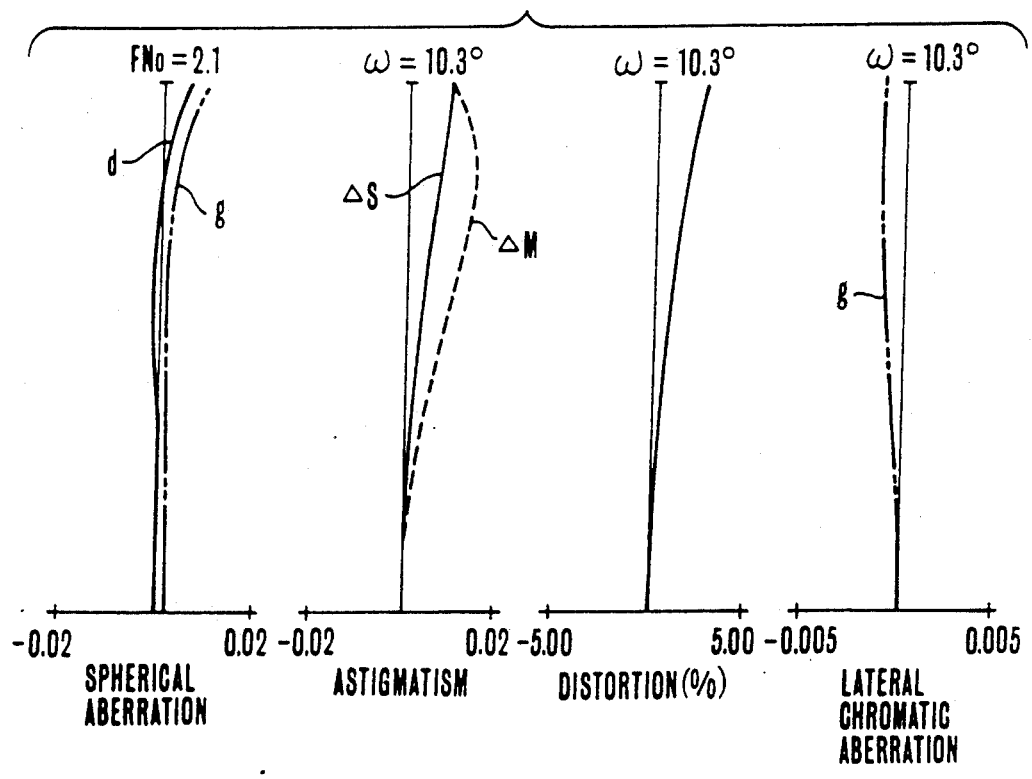
Figure 12C:
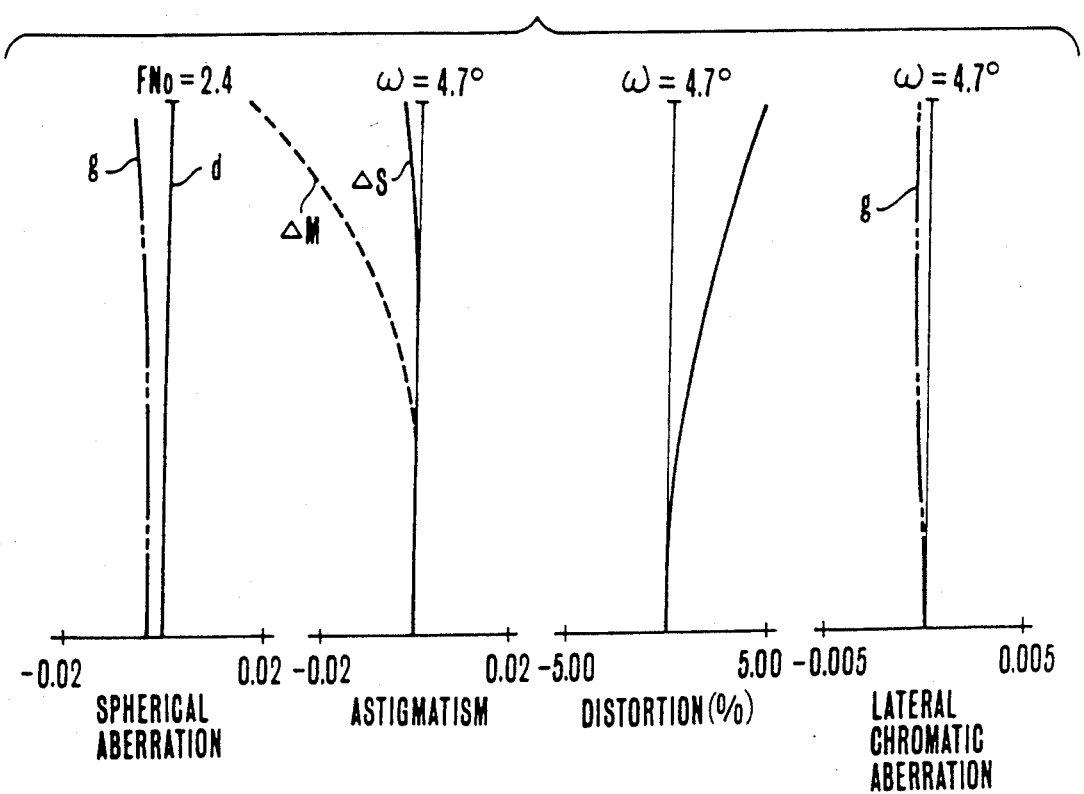

A first specific embodiment shown in the lens block diagram of FIG. 9 is described where the aspheric sphere is applied to the fourth lens group.

In the present embodiment, by applying to at least one of the lens surfaces in the fourth lens group an aspheric surface of such shape that the positive refractive power gets progressively weaker from the center of the area of the lens surface to the margin within a zone up to 0.5 of its effective diameter, variation with zooming and focusing of the aberrations, particularly, spherical aberration and some of the off-axial aberrations such as coma is corrected well.

Particularly in the present embodiment, the fourth lens group is constructed so as to include at least one meniscus-shaped negative lens convex toward the object side. By this, mainly the off-axial aberrations and lateral chromatic aberration are corrected well.

It should be noted that in the present embodiment the aspheric surface in the fourth lens group is figured so as to satisfy the following condition:

$$5 \times 10^{-5} < |\Delta/R| < 6 \times 10^{-4}$$

where $\Delta$ is the deviation of the aspheric surface from the osculating sphere at a height of 0.5 of the effective radius from the optical axis, and R is the radius of curvature of the osculating sphere. This allows the fourth lens group to be constructed from a negative lens and a positive lens, totaling only two lenses. While achieving a simplification of the entirety of the lens system, the variation with zooming and focusing of spherical aberration, coma and other aberrations is thus corrected well.

Three numerical examples 7 to 9 of the invention are shown below. In these numerical examples 7 to 9, Ri is the radius of curvature of the i-th lens surface counting from front, Di is the i-th axial lens thickness or air separation counting from front, and Ni and γi are respectively the refractive index and Abbe number of the glass of the i-th lens element counting from front.

The shape of the aspheric surface is expressed in coordinates with an X axis in the axial direction and an H axis in the perpendicular direction to the optical axis, the direction in which light advances being taken as positive, by the following equation:

$$X = (1/R)H^2/(1+1-(H/R)^2) + AH^2 + BH^4 + CH^6 + DH^8 + ED$$

where R is the radius of curvature of the paraxial region, and A, B, C, D and E are the aspheric coefficients.

Numerical Example 7 (FIGS. 9, 10(A), 10(B) and 10(C))
F = 1.0–5.59   FNo = 1:1.8–2.4   2ω = 49.1°–9.4°

| | | | |
|---|---|---|---|
| R1 = 9.693 | D1 = 0.139 | N1 = 1.80518 | ν1 = 25.4 |
| R2 = 3.800 | D2 = 0.526 | N2 = 1.51633 | ν2 = 64.1 |
| R3 = −10.454 | D3 = 0.021 | | |
| R4 = 2.953 | D4 = 0.354 | N3 = 1.65844 | ν3 = 50.9 |
| R5 = 9.040 | D5 = Variable | | |
| R6 = 6.662 | D6 = 0.086 | N4 = 1.74950 | ν4 = 35.3 |
| R7 = 0.769 | D7 = 0.257 | | |
| R8 = −0.944 | D8 = 0.086 | N5 = 1.51835 | ν5 = 60.3 |
| R9 = 1.295 | D9 = 0.247 | N6 = 1.84666 | ν6 = 23.9 |
| R10 = −5.789 | D10 = Variable | | |
| R11 = Stop | D11 = 0.15 | | |
| R12 = 3.885 | D12 = 0.333 | N7 = 1.69680 | ν7 = 55.5 |
| R13 = −1.794 | D13 = 0.063 | | |
| R14 = −1.412 | D14 = 0.086 | N8 = 1.80518 | ν8 = 25.4 |
| R15 = −3.430 | D15 = 0.016 | | |
| R16 = 1.882 | D16 = 0.215 | N9 = 1.51633 | ν9 = 64.1 |
| R17 = 3.741 | D17 = Variable | | |
| R18 = 2.644 | D18 = 0.086 | N10 = 1.80518 | ν10 = 25.4 |
| R19 = 1.355 | D19 = 0.024 | | |
| R20 = 1.482 | D20 = 0.462 | N11 = 1.60311 | ν11 = 60.7 |
| R21 = Aspheric | D21 = 0.537 | | |
| R22 = ∞ | D22 = 0.645 | N12 = 1.51633 | ν12 = 64.1 |
| R23 = ∞ | | | |

Aspheric surface R21:

Ro = −1.970    B = $7.194 \times 10^{-2}$
C = $-3.080 \times 10^{-2}$    D = $1.937 \times 10^{-2}$

| Variable | Focal Length | | |
|---|---|---|---|
| Separation | 1.00 | 2.50 | 5.59 |
| D5 | 0.15 | 1.89 | 2.92 |
| D10 | 1.31 | 0.58 | 0.15 |
| D17 | 0.69 | 0.51 | 0.98 |

Numerical Example 8 (FIGS. 9, 11(A), 11(B) and 11(C))
F = 1.0–5.57   FNo = 1:1.8–2.4   2ω = 49.1°–9.4°

| | | | |
|---|---|---|---|
| R1 = 10.130 | D1 = 0.139 | N1 = 1.80518 | ν1 = 25.4 |
| R2 = 3.702 | D2 = 0.526 | N2 = 1.51633 | ν2 = 64.1 |
| R3 = −10.679 | D3 = 0.021 | | |
| R4 = 2.925 | D4 = 0.354 | N3 = 1.65844 | ν3 = 50.9 |
| R5 = 9.619 | D5 = Variable | | |
| R6 = 41.703 | D6 = 0.086 | N4 = 1.83400 | ν4 = 37.2 |
| R7 = 0.806 | D7 = 0.230 | | |
| R8 = −0.955 | D8 = 0.086 | N5 = 1.51823 | ν5 = 59.0 |
| R9 = 1.295 | D9 = 0.247 | N6 = 1.84666 | ν6 = 23.9 |
| R10 = −3.490 | D10 = Variable | | |
| R11 = Stop | D11 = 0.09 | | |
| R12 = 4.396 | D12 = 0.333 | N7 = 1.69680 | ν7 = 55.5 |
| R13 = −1.800 | D13 = 0.066 | | |
| R14 = −1.383 | D14 = 0.086 | N8 = 1.80518 | ν8 = 25.4 |
| R15 = −3.529 | D15 = 0.016 | | |
| R16 = 1.871 | D16 = 0.161 | N9 = 1.51633 | ν9 = 64.1 |
| R17 = 6.281 | D17 = Variable | | |
| R18 = 3.080 | D18 = 0.086 | N10 = 1.84666 | ν10 = 23.9 |
| R19 = 1.467 | D19 = 0.024 | | |
| R20 = 1.610 | D20 = 0.462 | N11 = 1.62299 | ν11 = 58.1 |
| R21 = Aspheric | D21 = 0.537 | | |
| R22 = ∞ | D22 = 0.645 | N12 = 1.51633 | ν12 = 64.1 |
| R23 = ∞ | | | |

Aspheric surface R21:

Ro = −1.903    B = $7.957 \times 10^{-2}$
C = $-3.245 \times 10^{-2}$    D = $2.874 \times 10^{-2}$

| Variable | Focal Length | | |
|---|---|---|---|
| Separation | 1.00 | 2.51 | 5.57 |
| D5 | 0.22 | 1.96 | 2.99 |
| D10 | 1.27 | 0.53 | 0.10 |
| D17 | 0.67 | 0.48 | 0.96 |

Numerical Example 9 (FIGS. 9, 12(A), 12(B) and 12(C))
F = 1.0–5.55  FNo = 1:1.8–2.4  2ω = 49.1°–9.4°

| | | | |
|---|---|---|---|
| R1 = 10.015 | D1 = 0.139 | N1 = 1.78472 | ν1 = 25.7 |
| R2 = 3.705 | D2 = 0.526 | N2 = 1.51633 | ν2 = 64.1 |
| R3 = −11.122 | D3 = 0.021 | | |
| R4 = 2.976 | D4 = 0.354 | N3 = 1.65844 | ν3 = 50.9 |
| R5 = 9.879 | D5 = Variable | | |
| R6 = 5.965 | D6 = 0.086 | N4 = 1.74950 | ν4 = 35.3 |
| R7 = 0.764 | D7 = 0.256 | | |
| R8 = −0.933 | D8 = 0.086 | N5 = 1.51835 | ν5 = 60.3 |
| R9 = 1.295 | D9 = 0.247 | N6 = 1.84666 | ν6 = 23.9 |
| R10 = −5.777 | D10 = Variable | | |
| R11 = Stop | D11 = 0.14 | | |
| R12 = 3.234 | D12 = 0.333 | N7 = 1.69680 | ν7 = 55.5 |
| R13 = −1.828 | D13 = 0.066 | | |
| R14 = −1.392 | D14 = 0.086 | N8 = 1.80518 | ν8 = 25.4 |
| R15 = −3.313 | D15 = 0.016 | | |
| R16 = 1.964 | D16 = 0.215 | N9 = 1.51633 | ν9 = 64.1 |
| R17 = 3.373 | D17 = Variable | | |
| R18 = 2.595 | D18 = 0.086 | N10 = 1.80518 | ν10 = 25.4 |
| R19 = 1.296 | D19 = 0.024 | | |
| R20 = 1.428 | D20 = 0.462 | N11 = 1.60311 | ν11 = 60.7 |
| R21 = Aspheric | D21 = 0.537 | | |
| R22 = ∞ | D22 = 0.645 | N12 = 1.51633 | ν12 = 64.1 |
| R23 = ∞ | | | |

Aspheric surface R21:
Ro = −1.857  B = $7.159 \times 10^{-2}$
C = $-2.944 \times 10^{-2}$  D = $5.983 \times 10^{-3}$

| Variable Separation | Focal Length | | |
|---|---|---|---|
| | 1.00 | 2.51 | 5.55 |
| D5 | 0.16 | 1.90 | 2.92 |
| D10 | 1.27 | 0.54 | 0.11 |
| D17 | 0.63 | 0.45 | 0.91 |

Figure 13:
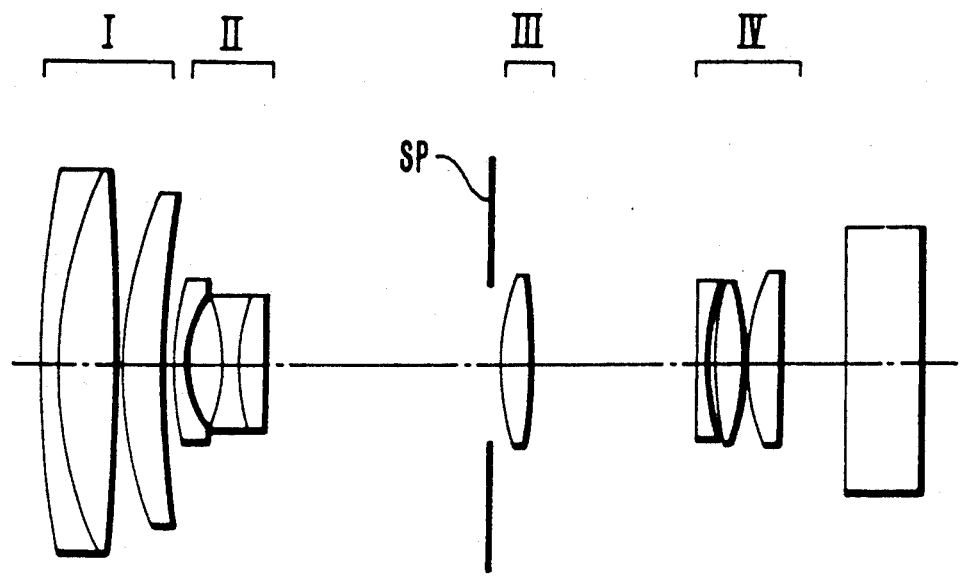
FIG. 13 is a longitudinal section view of numerical examples 10 and 11 of the invention.
Figure 14:
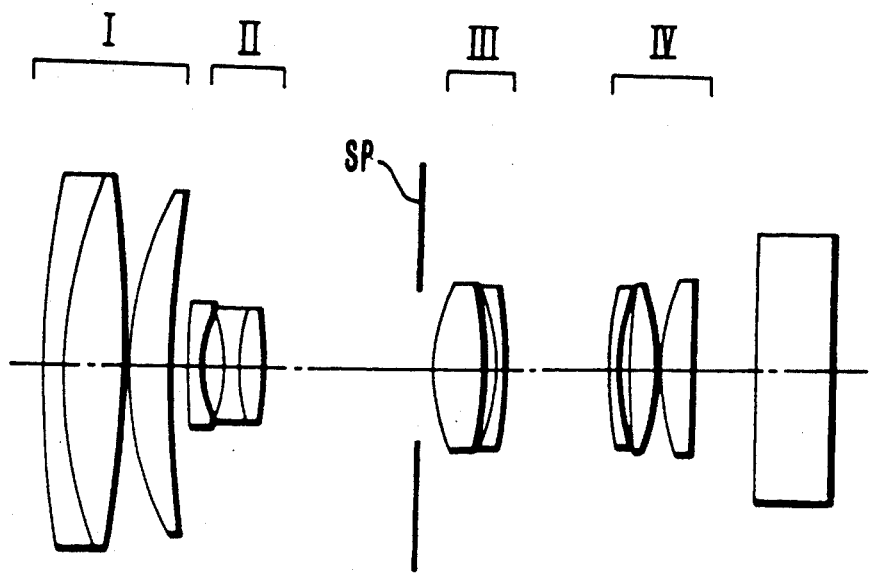
FIG. 14 is a longitudinal section view of a numerical example 12 of the invention.
Figure 15A:
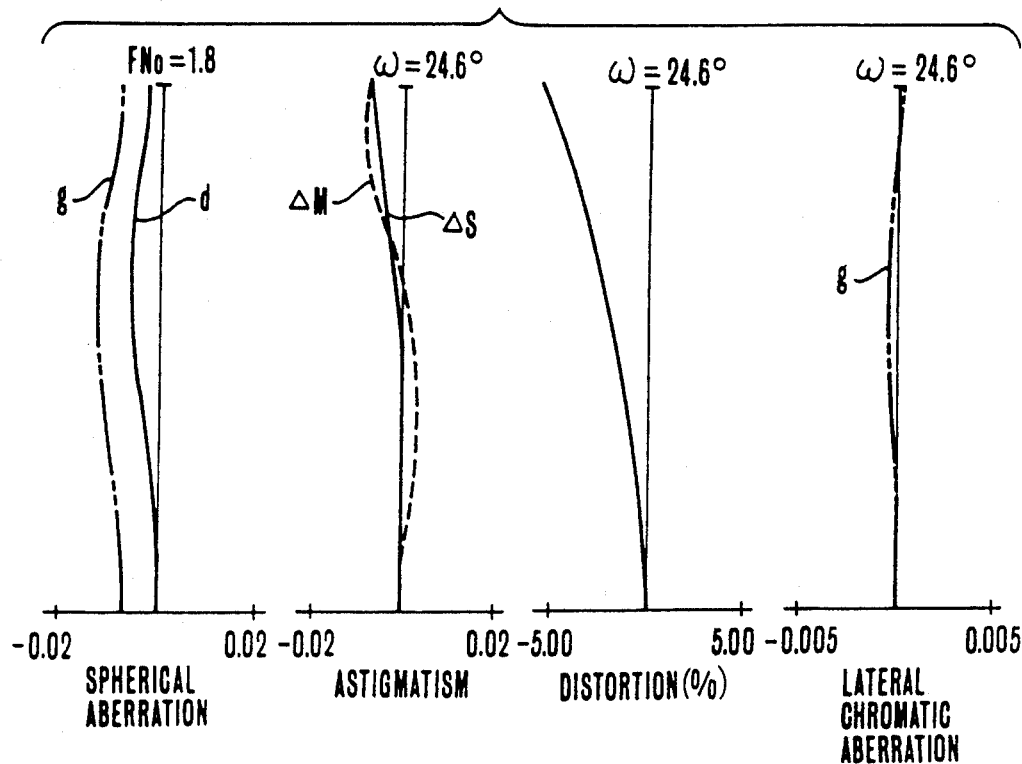
FIGS. 15(A), 15(B) and 15(C) are graphs of the various aberrations of the numerical example 10.
Figure 15B:
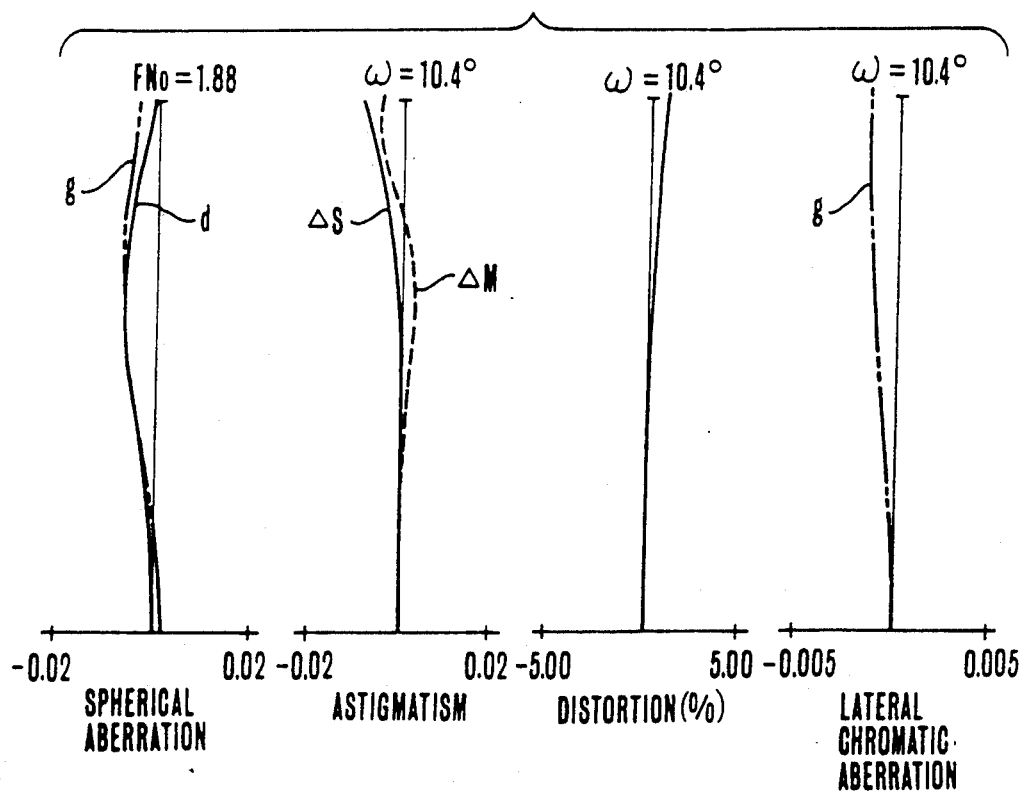
Figure 15C:
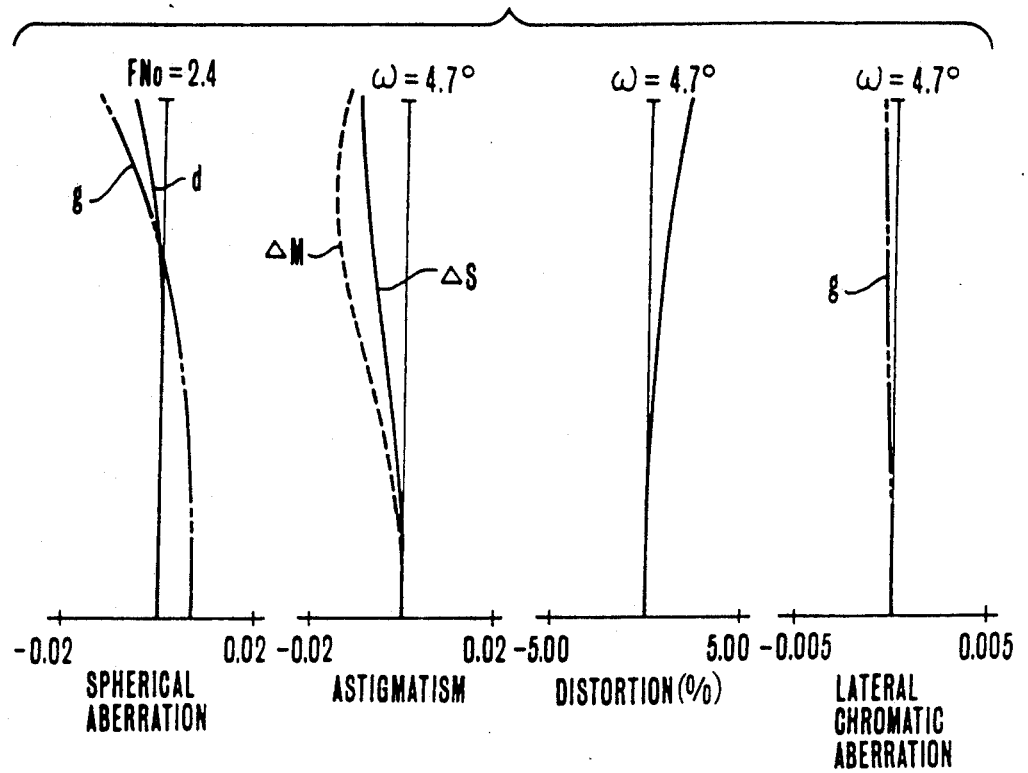
Figure 16A:
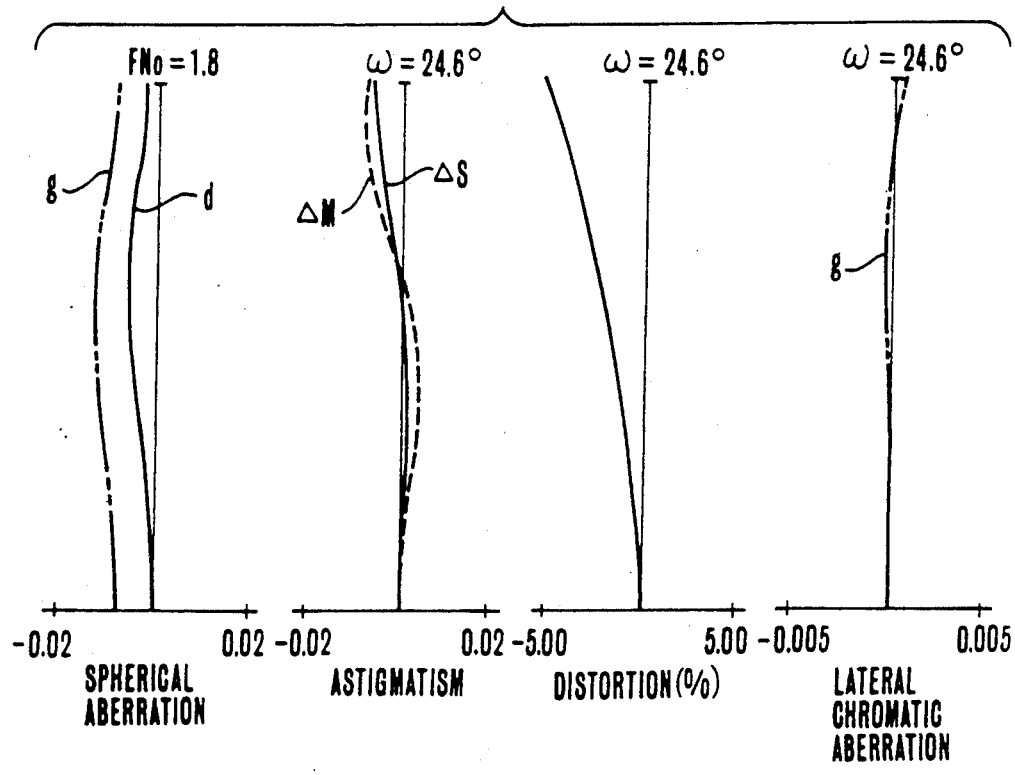
FIGS. 16(A), 16(B) and 16(C) are graphs of the various aberrations of the numerical example 11.
Figure 16B:
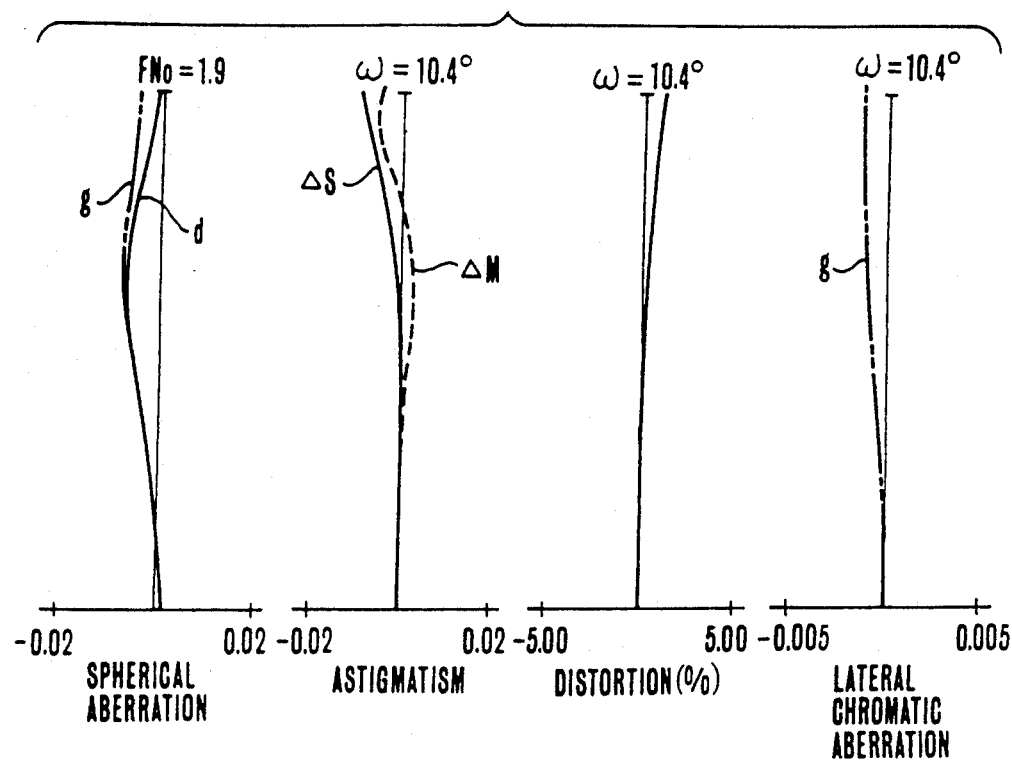
Figure 16C:
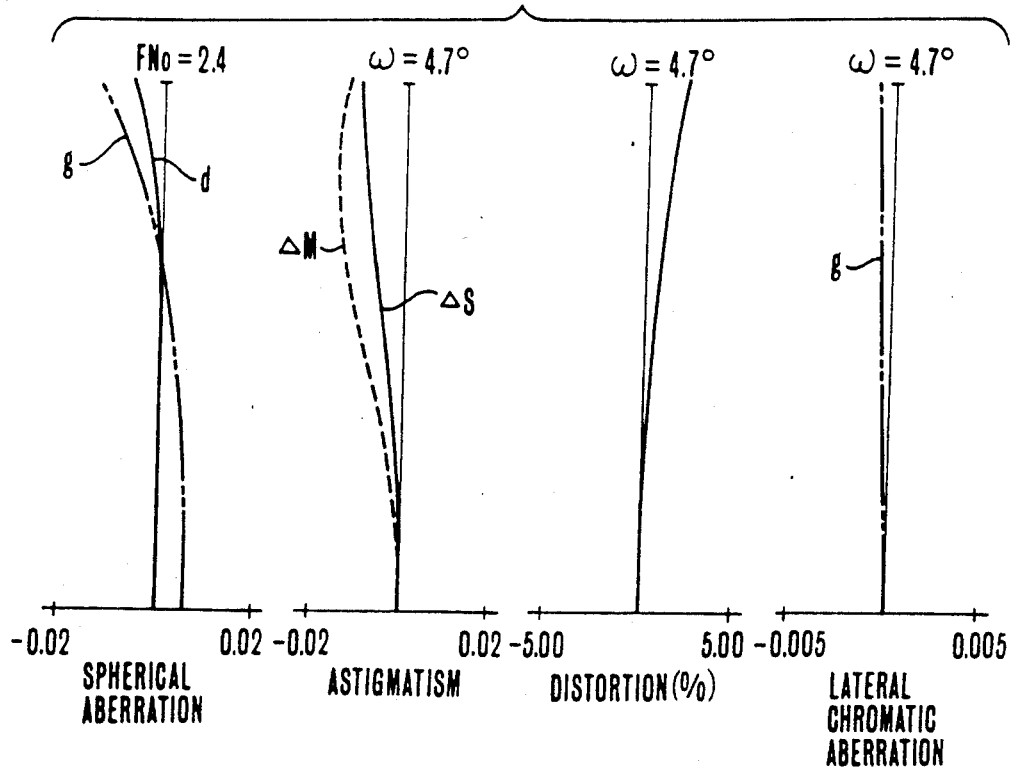
Figure 17A:
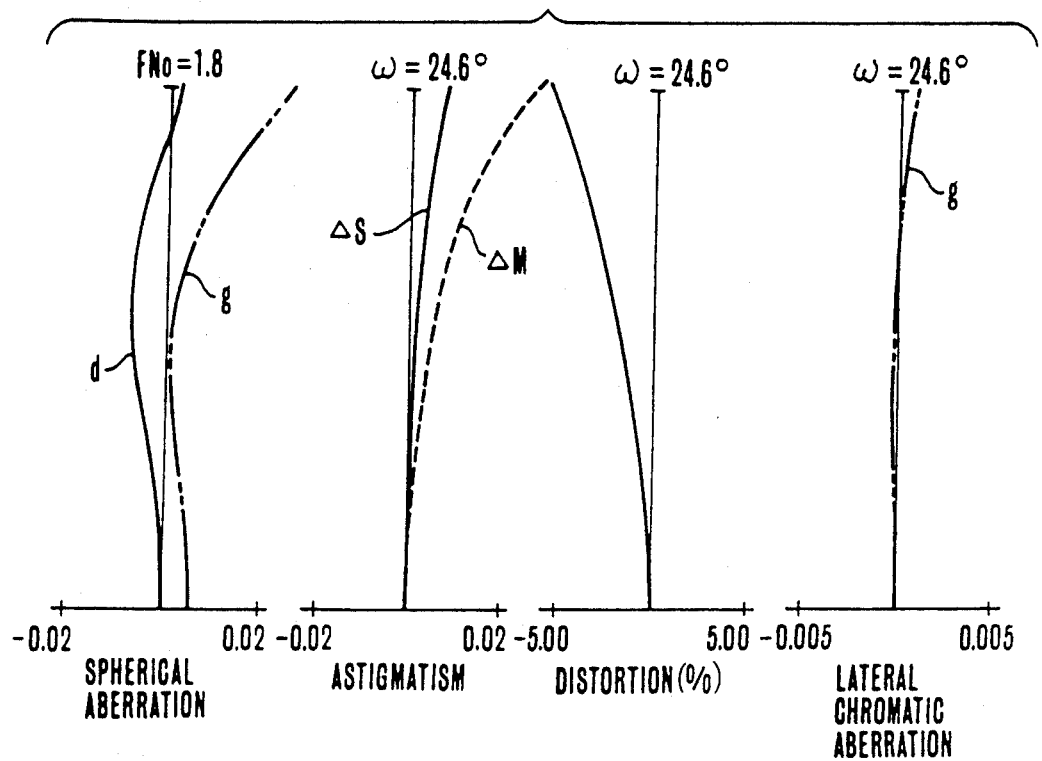
Figure 17B:
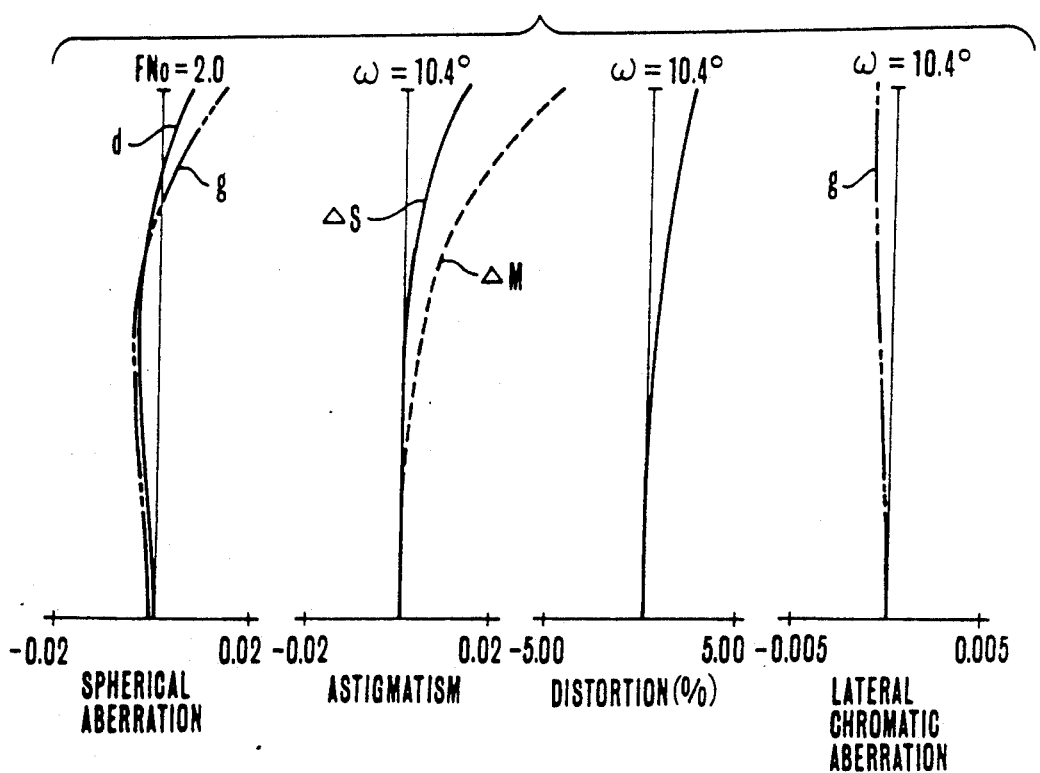

Another specific embodiment is described where the aspheric sphere is applied to the third lens group as shown in the lens block diagrams of FIGS. 13 and 14.

In the present embodiment, by applying to at least one of the lens surfaces in the third lens group an aspheric surface of such shape that the positive refractive power gets progressively weaker from the center of the area of the lens surface to the margin, variation of the aberrations, particularly spherical aberration and coma in that region of the zooming range which is from the wide-angle end to the intermediate focal length position is corrected well. The use of such an aspheric surface of the prescribed shape in the third lens group produces another advantage that the third lens group can be constructed from one or two lens element or elements, thus contributing to a reduction of the number of lens elements of the entire system.

That is, in numerical examples to be described later, the third lens group is constructed from either a single positive lens in bi-concave form, or two lenses, one of which is a bi-convex positive lens and the other of which is a meniscus-shaped negative lens convex toward the image side. Yet, a good optical performance is obtained.

It should be noted that in the present embodiment, the aspheric surface in the third lens group must be figured so as to satisfy the following condition:

$$1 \times 10^{-4} < |\Delta/R| < 4 \times 10^{-3}$$

where Δ is the deviation of the aspheric surface from the osculating sphere at a height of 0.7 of the effective radius from the optical axis, and R is the radius of curvature of the oscillating sphere. When this is satisfied, good stability of optical performance is attained over the entire range of variation of the image magnification.

Three numerical examples 10 to 12 of the invention are shown below.

Numerical Example 10 (FIGS. 13, 15(A), 15(B) and 15(C))
F = 1.0–5.56  FNo = 1:1.8–2.4  2ω = 49.1°–9.4°

| | | | |
|---|---|---|---|
| R1 = 8.927 | D1 = 0.139 | N1 = 1.80518 | ν1 = 25.4 |
| R2 = 3.812 | D2 = 0.494 | N2 = 1.60311 | ν2 = 60.7 |
| R3 = −19.739 | D3 = 0.021 | | |
| R4 = 3.122 | D4 = 0.322 | N3 = 1.61271 | ν3 = 58.8 |
| R5 = 8.993 | D5 = Variable | | |
| R6 = 2.437 | D6 = 0.086 | N4 = 1.74950 | ν4 = 35.3 |
| R7 = 0.802 | D7 = 0.360 | | |
| R8 = −1.098 | D8 = 0.086 | N5 = 1.53172 | ν5 = 48.9 |
| R9 = 1.250 | D9 = 0.247 | N6 = 1.84666 | ν6 = 23.9 |
| R10 = 113.103 | D10 = Variable | | |
| R11 = Stop | D11 = 0.1 | | |
| R12 = Aspheric | D12 = 0.301 | N7 = 1.51633 | ν7 = 64.1 |
| R13 = −5.555 | D13 = Variable | | |
| R14 = 80.968 | D14 = 0.086 | N8 = 1.84666 | ν8 = 23.9 |
| R15 = 1.913 | D15 = 0.064 | | |
| R16 = 2.649 | D16 = 0.268 | N9 = 1.60311 | ν9 = 60.7 |
| R17 = −2.328 | D17 = 0.016 | | |

-continued

Numerical Example 10 (FIGS. 13, 15(A), 15(B) and 15(C))
F = 1.0–5.56   FNo = 1:1.8–2.4   2ω = 49.1°–9.4°

| | | | |
|---|---|---|---|
| R18 = 1.712 | D18 = 0.258 | N10 = 1.51633 | ν10 = 64.1 |
| R19 = ∞ | D19 = 0.537 | | |
| R20 = ∞ | D20 = 0.645 | N11 = 1.51633 | ν11 = 64.1 |
| R21 = ∞ | | | |

Aspheric surface R12:

Ro = 1.721         B = −4.769 × 10$^{-2}$
C = −2.347 × 10$^{-2}$   D = 2.179 × 10$^{-2}$

| Variable | Focal Length | | |
|---|---|---|---|
| Separation | 1.00 | 2.49 | 5.56 |
| D5 | 0.10 | 1.84 | 2.86 |
| D10 | 1.91 | 0.85 | 0.23 |
| D13 | 1.38 | 1.10 | 1.42 |

Numerical Example 11 (FIGS. 13, 16(A), 16(B) and 16(C))
F = 1.0–5.56   FNo = 1:1.8–2.4   2ω = 49.1°–9.4°

| | | | |
|---|---|---|---|
| R1 = 9.287 | D1 = 0.139 | N1 = 1.80518 | ν1 = 25.4 |
| R2 = 3.766 | D2 = 0.494 | N2 = 1.62299 | ν2 = 58.1 |
| R3 = −20.115 | D3 = 0.021 | | |
| R4 = 3.115 | D4 = 0.322 | N3 = 1.60729 | ν3 = 59.4 |
| R5 = 8.904 | D5 = Variable | | |
| R6 = 2.421 | D6 = 0.085 | N4 = 1.74950 | ν4 = 35.3 |
| R7 = 0.803 | D7 = 0.363 | | |
| R8 = −1.099 | D8 = 0.085 | N5 = 1.52310 | ν5 = 50.8 |
| R9 = 1.250 | D9 = 0.247 | N6 = 1.84666 | ν6 = 23.9 |
| R10 = 36.218 | D10 = Variable | | |
| R11 = Stop | D11 = 0.1 | | |
| R12 = Aspheric | D12 = 0.300 | N7 = 1.51633 | ν7 = 64.1 |
| R13 = −5.571 | D13 = Variable | | |
| R14 = 84.072 | D14 = 0.085 | N8 = 1.84666 | ν8 = 23.9 |
| R15 = 1.910 | D15 = 0.064 | | |
| R16 = 2.633 | D16 = 0.268 | N9 = 1.60311 | ν9 = 60.7 |
| R17 = −2.324 | D17 = 0.016 | | |
| R18 = 1.717 | D18 = 0.257 | N10 = 1.51633 | ν10 = 64.1 |
| R19 = ∞ | D19 = 0.537 | | |
| R20 = ∞ | D20 = 0.644 | N11 = 1.51633 | ν11 = 64.1 |
| R21 = ∞ | | | |

Aspheric surface R12:

Ro = 1.721         B = −4.786 × 10$^{-2}$
C = −2.339 × 10$^{-2}$   D = 2.184 × 10$^{-2}$

| Variable | Focal Length | | |
|---|---|---|---|
| Separation | 1.00 | 2.49 | 5.56 |
| D5 | 0.09 | 1.83 | 2.85 |
| D10 | 1.92 | 0.86 | 0.23 |
| D13 | 1.38 | 1.09 | 1.42 |

Numerical Example 12 (FIGS. 14, 17(A), 17(B) and 17(C))
F = 1.0–5.55   FNo = 1:1.8–2.4   2ω = 49.1°–9.4°

| | | | |
|---|---|---|---|
| R1 = 10.107 | D1 = 0.139 | N1 = 1.80518 | ν1 = 25.4 |
| R2 = 3.716 | D2 = 0.537 | N2 = 1.51633 | ν2 = 64.1 |
| R3 = −9.672 | D3 = 0.021 | | |
| R4 = 2.896 | D4 = 0.354 | N3 = 1.65844 | ν3 = 50.9 |
| R5 = 8.874 | D5 = Variable | | |
| R6 = 7.391 | D6 = 0.086 | N4 = 1.83400 | ν4 = 37.2 |
| R7 = 0.783 | D7 = 0.241 | | |
| R8 = −0.936 | D8 = 0.086 | N5 = 1.51823 | ν5 = 59.0 |
| R9 = 1.295 | D9 = 0.247 | N6 = 1.84666 | ν6 = 23.9 |
| R10 = −4.058 | D10 = Variable | | |
| R11 = Stop | D11 = 0.16 | | |
| R12 = 1.588 | D12 = 0.483 | N7 = 1.58313 | ν7 = 59.4 |
| R13 = Aspheric | D13 = 0.055 | | |
| R14 = −1.373 | D14 = 0.086 | N8 = 1.80518 | ν8 = 25.4 |
| R15 = −3.883 | D15 = Variable | | |
| R16 = 3.986 | D16 = 0.086 | N9 = 1.84666 | ν9 = 23.9 |
| R17 = 1.829 | D17 = 0.078 | | |
| R18 = 6.766 | D18 = 0.258 | N10 = 1.60311 | ν10 = 60.7 |
| R19 = −2.113 | D19 = 0.016 | | |
| R20 = 1.784 | D20 = 0.268 | N11 = 1.51633 | ν11 = 64.1 |
| R21 = ∞ | D21 = 0.537 | | |
| R22 = ∞ | D22 = 0.645 | N12 = 1.51633 | ν12 = 64.1 |

-continued

Numerical Example 12 (FIGS. 14, 17(A), 17(B) and 17(C))
F = 1.0–5.55    FNo = 1:1.8–2.4    2ω = 49.1°–9.4°

R23 = ∞

Aspheric surface R13:

Ro = −1.542         B = 3.512 × $10^{-2}$
C = 3.204 × $10^{-2}$   D = −7.259 × $10^{-2}$

| Variable Separation | Focal Length | | |
|---|---|---|---|
| | 1.00 | 2.46 | 5.55 |
| D5 | 0.14 | 1.87 | 2.89 |
| D10 | 1.28 | 0.55 | 0.13 |
| D15 | 0.85 | 0.67 | 1.13 |

Figure 18:
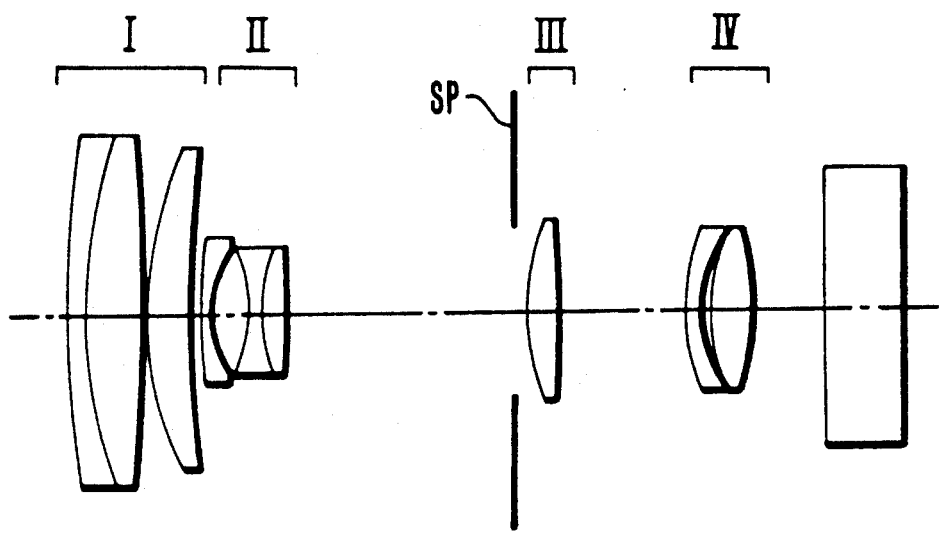
FIG. 18 is a longitudinal section view of numerical examples 13 and 14 of the invention.
Figure 19:
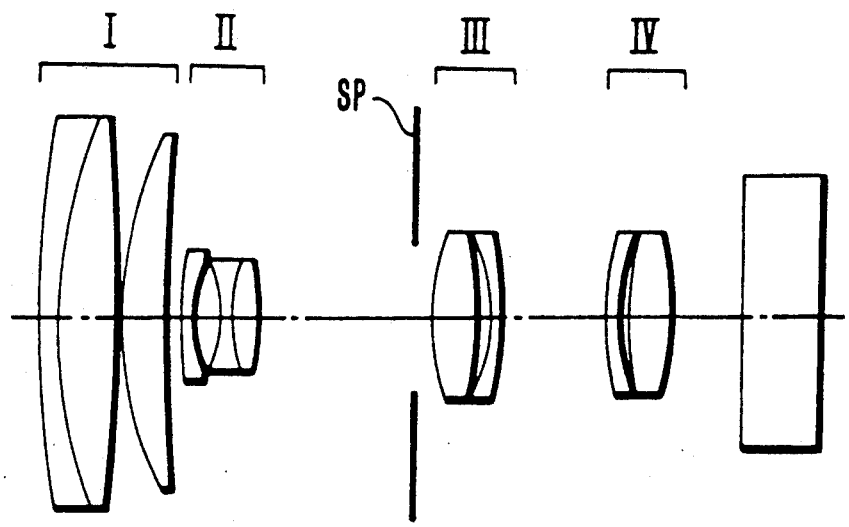
FIG. 19 is a longitudinal section view of a numerical example 15 of the invention.
Figure 20A:
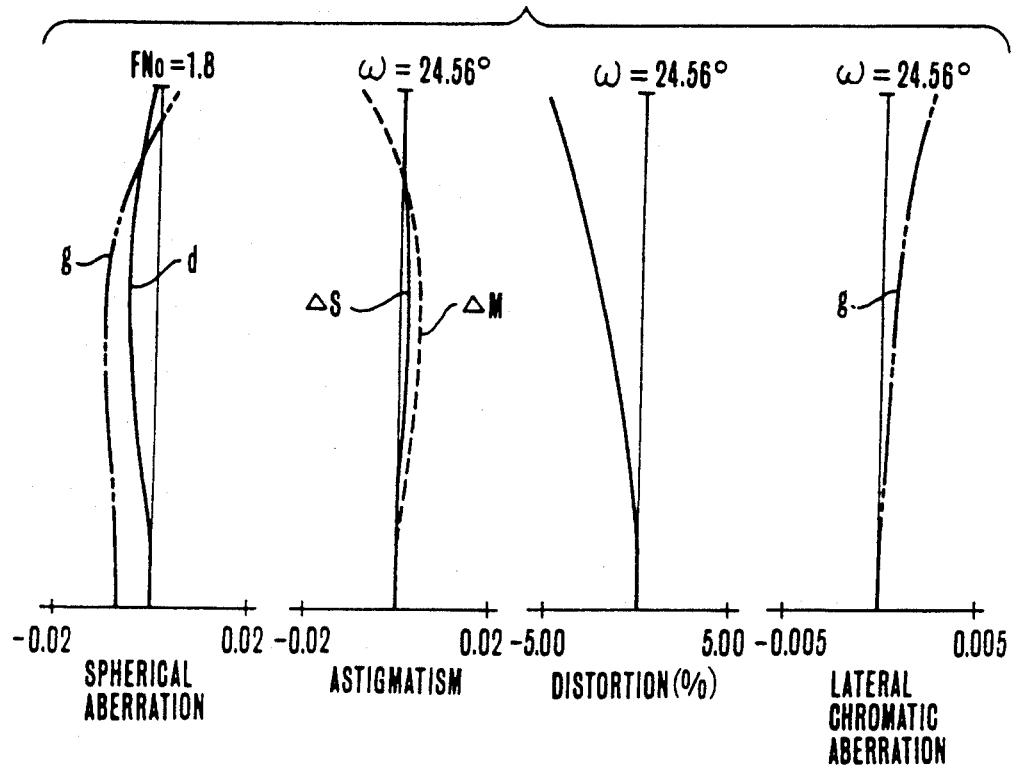
FIGS. 20(A), 20(B) and 20(C) are graphs of the various aberrations of the numerical example 13.
Figure 20B:
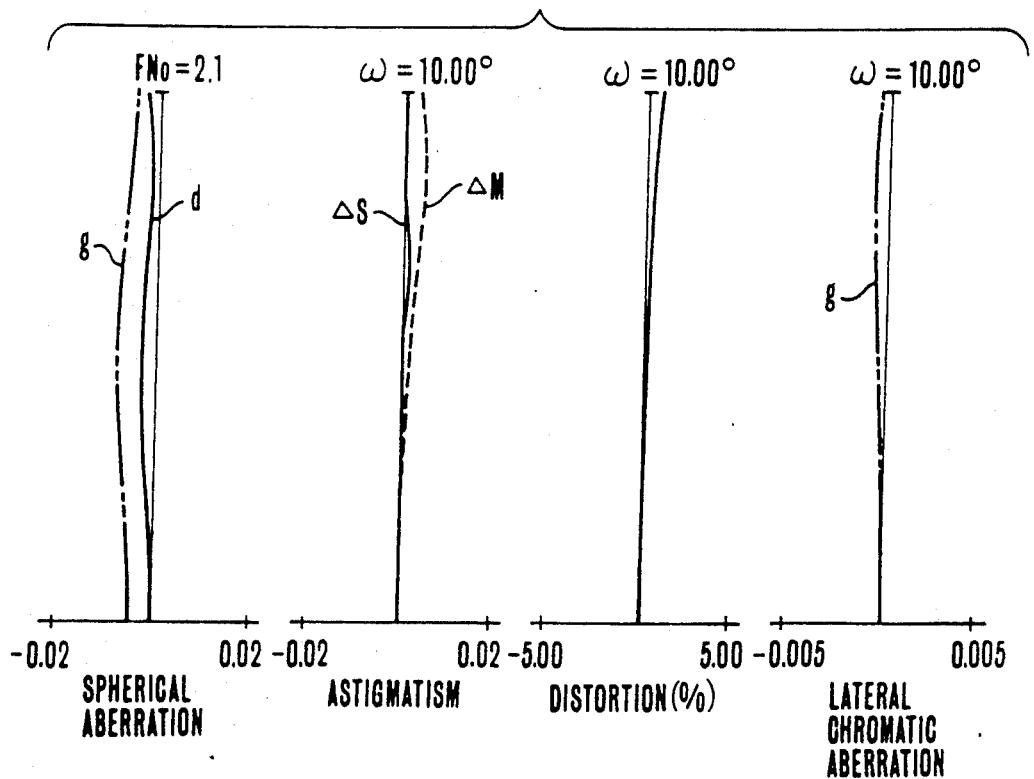
Figure 20C:
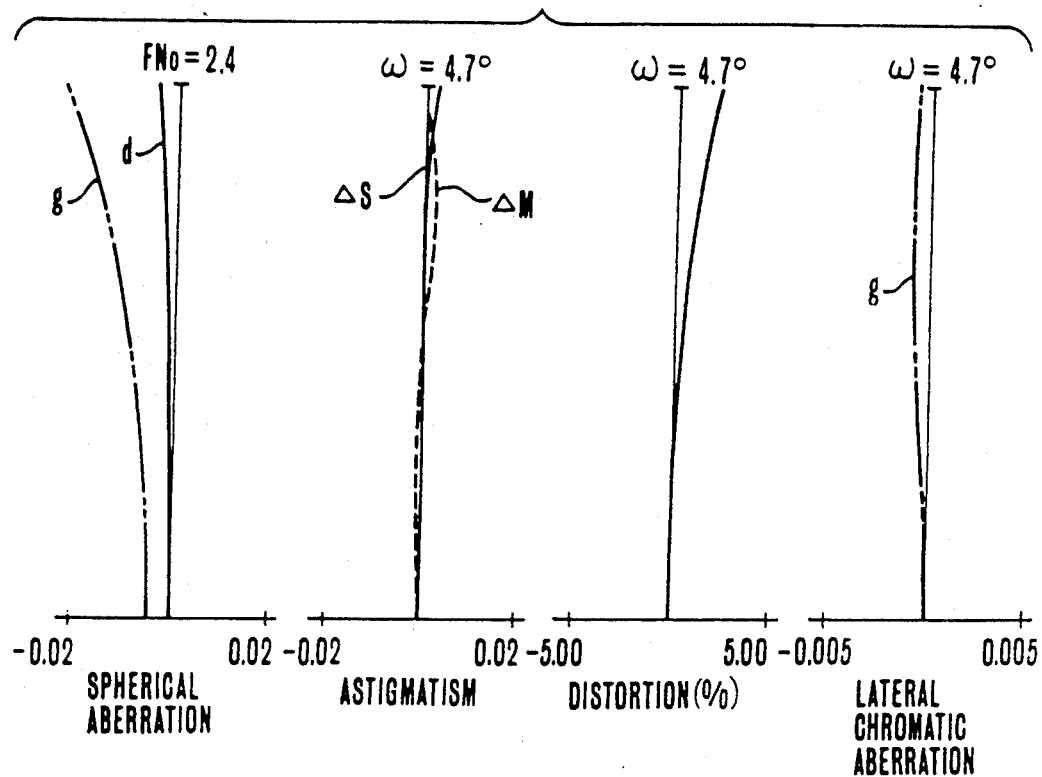
Figure 21A:
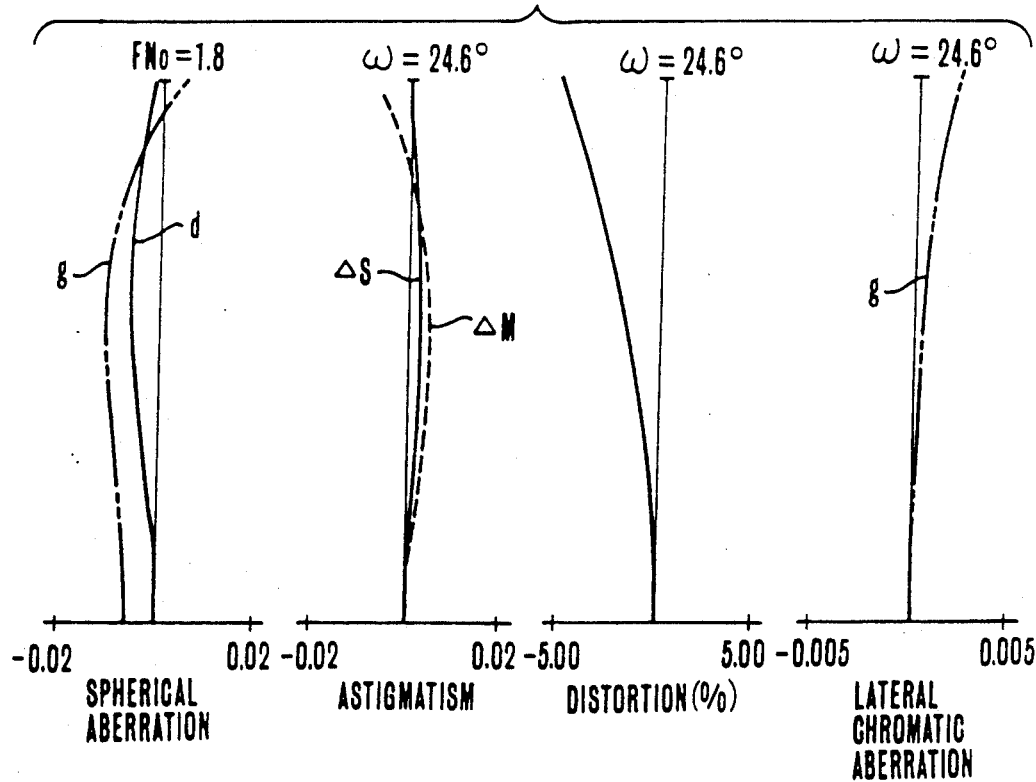
FIGS. 21(A), 21(B) and 21(C) are graphs of the various aberrations of the numerical example 14.
Figure 21B:
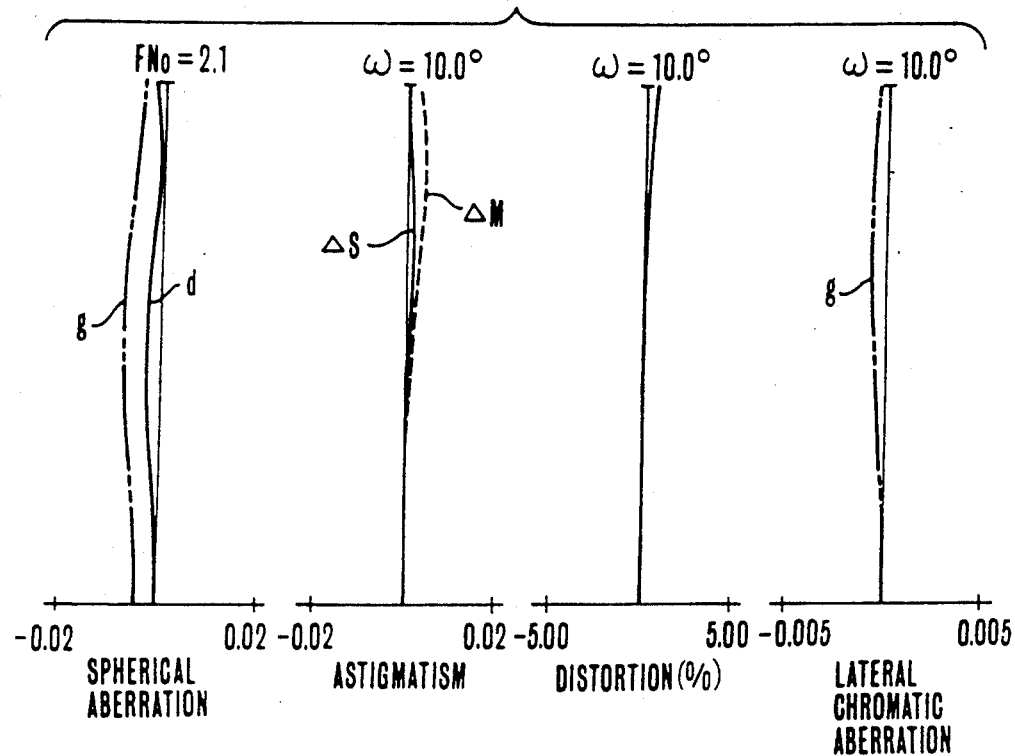
Figure 21C:
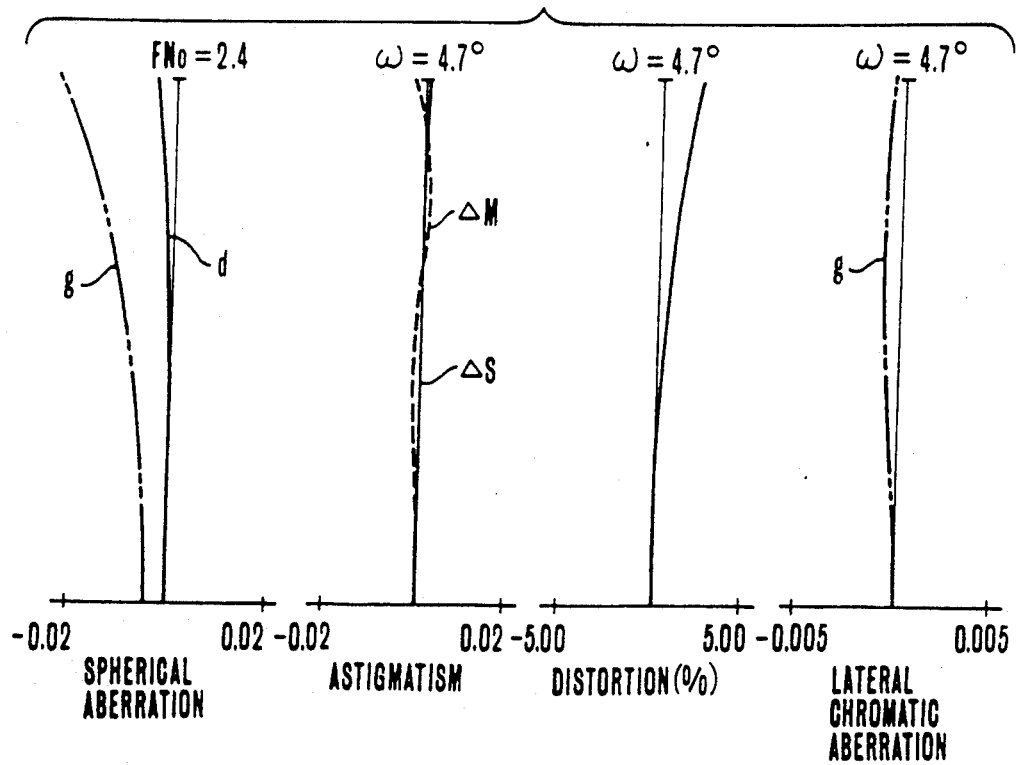
Figure 22A:
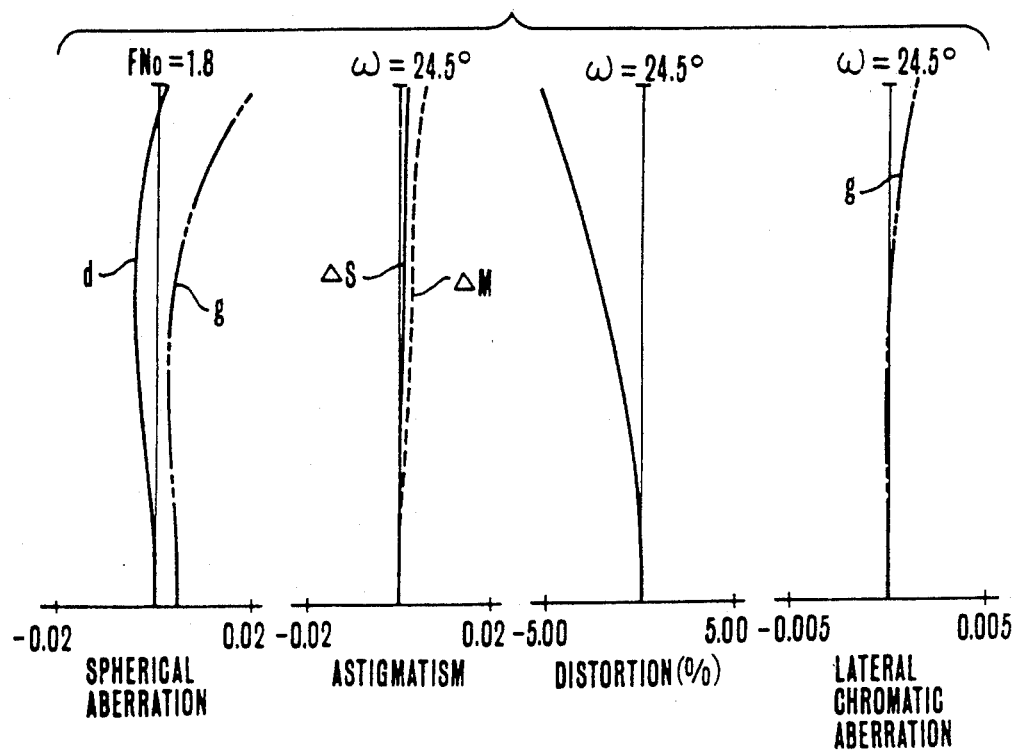
FIGS. 22(A), 22(B) and 22(C) are graphs of the various aberrations of the numerical example 15.
Figure 22B:
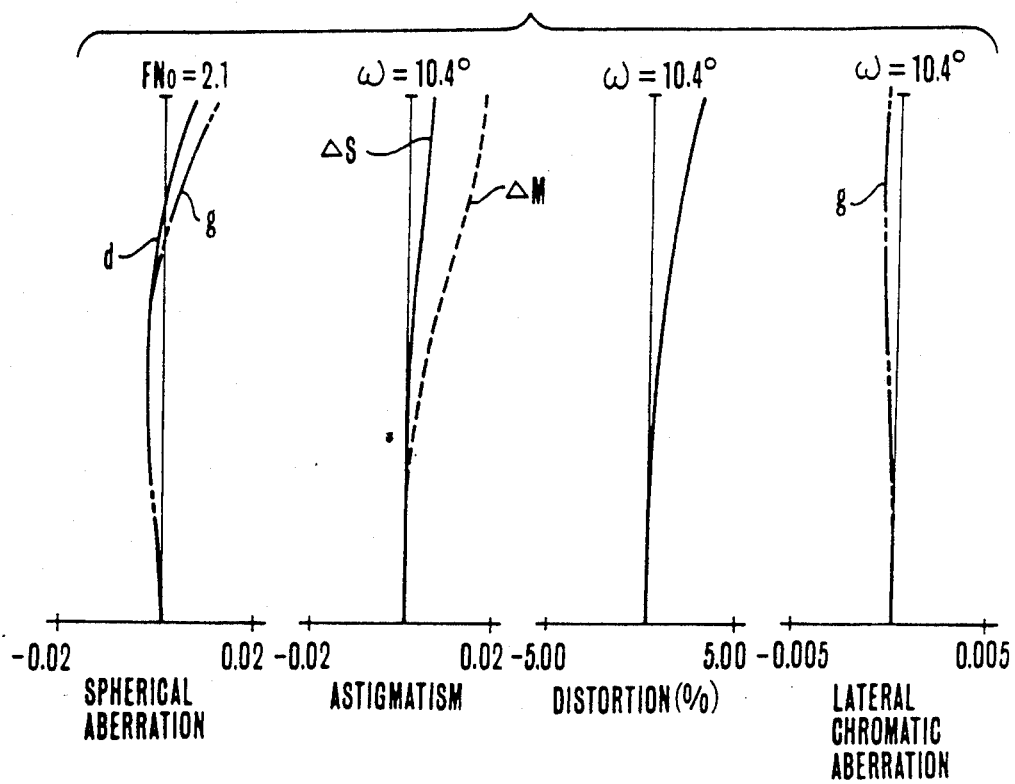
Figure 22C:
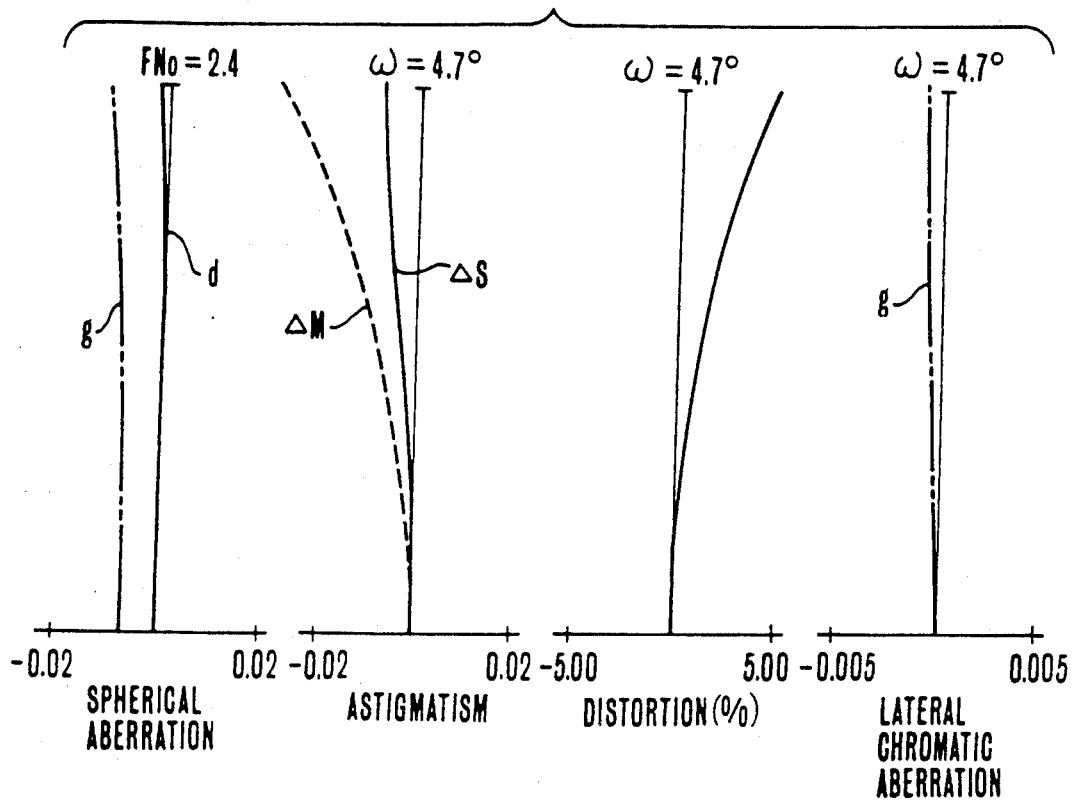

Another specific embodiment is described where the aspheric sphere is applied to the third and fourth lens groups as shown in the lens block diagrams of FIGS. 18 and 19.

In the present embodiment, by applying aspheric surfaces to the third lens group and the fourth lens group, good stability of optical performance is obtained throughout the entire range of variation of the image magnification and further throughout the entire range of object distances, while achieving a simplification of the entirety of the lens system.

Particularly in the present embodiment, by applying to at least one of the lens surfaces in the third lens group an aspheric surface of such shape that the positive refractive power gets progressively weaker from the center of the area of the lens surface to the margin, variation with zooming of the aberrations, particularly spherical aberration and coma in that region of the zooming range which is from the wide-angle end to the intermediate position, is corrected well. The use of such an aspheric surface of the prescribed shape in the third lens group produces another advantage that the third lens group can be constructed from one or two lens element or elements, thus reducing the number of lens elements of the entire system.

That is, in numerical examples to be described later, the third lens group is constructed from a single positive lens in bi-convex form, or from two lenses, one of which is a bi-convex positive lens and a meniscus-shaped negative lens convex toward the image side. Yet, a good optical performance is obtained.

It should be noted that when the third lens group is constructed from the single positive lens, it is preferred to choose a material whose Abbe number is not less than "58" from the point of view of well correcting longitudinal chromatic aberration.

Again, in the present embodiment, by applying to at least one of the lens surfaces in the fourth lens group an aspheric surface of such shape that the positive refractive power gets progressively weaker from the center of the area of the lens surface to the margin within a zone of up to 0.5 of its effective diameter, variation with zooming and focusing of the aberrations, particularly spherical aberration and some of the off-axial aberrations such as coma, is corrected well.

Particularly in the present embodiment, the fourth lens group is constructed so as to include at least one meniscus-shaped negative lens convex toward the object side, thereby contributing to a good correction of mainly off-axial aberrations and longitudinal chromatic aberration.

It should be noted that in the present embodiment, for the aspheric surfaces in the third lens group and the fourth lens group, letting the radii of curvature of their respective osculating spheres be denoted by RA3 and RA4 respectively, and the deviations of them from their respective osculating spheres at a height of 0.7 of the effective radius from the optical axis be denoted by 3 and 4 respectively, they must be figured so as to satisfy the following conditions:

$$1 \times 10^{-4} < |\Delta 3/RA3| < 4 \times 10^{-3}$$

$$7 \times 10^{-5} < |\Delta 4/RA4| < 3 \times 10^{-3}$$

When these conditions are satisfied, the third lens group can be constructed from one or two lens or lenses and the fourth lens group can be constructed from a negative lens and a positive lens, totaling two lenses. Accordingly, a good stability of correction of the spherical aberration, coma and other various aberrations against zooming and focusing is attained, while achieving a simplification of the entirety of the lens system.

Particularly in the present embodiment, as shown in numerical examples to be described later, the total number of constituent lens elements is 9 or 10 so that a 4-group rear focus type zoom lens of reduced size with a range of 6 and an F-number of about 1.8, while still preserving good optical performance, is achieved.

Three numerical example 13 to 15 of that zoom lens are shown below.

Numerical Example 13 (FIGS. 18, 20(A), 20(B) and 20(C))
F = 1.0 − 5.56    FNo = 1:1.8 − 2.4    2ω = 49.1° − 9.4°

| | | | |
|---|---|---|---|
| R1 = 9.344 | D1 = 0.139 | N1 = 1.80518 | ν1 = 25.4 |
| R2 = 3.763 | D2 = 0.494 | N2 = 1.60311 | ν2 = 60.7 |
| R3 = −19.161 | D3 = 0.021 | | |
| R4 = 2.839 | D4 = 0.322 | N3 = 1.61271 | ν3 = 58.8 |
| R5 = 7.726 | D5 = Variable | | |
| R6 = 5.496 | D6 = 0.086 | N4 = 1.74950 | ν4 = 35.3 |
| R7 = 0.772 | D7 = 0.308 | | |
| R8 = −1.090 | D8 = 0.086 | N5 = 1.53172 | ν5 = 48.9 |
| R9 = 1.229 | D9 = 0.247 | N6 = 1.84666 | ν6 = 23.9 |
| R10 = −5.940 | D10 = Variable | | |
| R11 = Stop | D11 = 0.082 | | |
| R12 = Aspheric | D12 = 0.301 | N7 = 1.51633 | ν7 = 64.1 |
| R13 = −11.280 | D13 = Variable | | |
| R14 = 2.141 | D14 = 0.086 | N8 = 1.84666 | ν8 = 23.9 |
| R15 = 1.003 | D15 = 0.016 | | |
| R16 = 1.062 | D16 = 0.462 | N9 = 1.60311 | ν9 = 60.7 |
| R17 = Aspheric | D17 = 0.537 | | |
| R18 = ∞ | D18 = 0.645 | N10 = 1.51633 | ν10 = 64.1 |
| R19 = ∞ | | | |

Aspheric surface R12:
Ro = 1.647            B = −5.039 × $10^{-2}$
C = −1.106 × $10^{-2}$   D = −8.906 × $10^{-3}$ Aspheric surface R17:
Ro = −2.433           B = 1.5173 × $10^{-2}$
C = −2.283 × $10^{-4}$   D = −1.239 × $10^{-1}$ -continued Numerical Example 13 (FIGS. 18, 20(A), 20(B) and 20(C))

| Variable Separation | Focal Length | | |
|---|---|---|---|
| | 1.00 | 2.59 | 5.56 |
| D5 | 0.07 | 1.82 | 2.84 |
| D10 | 1.86 | 0.80 | 0.17 |
| D13 | 1.02 | 0.72 | 1.07 |

Numerical Example 14 (FIGS. 18, 21(A), 21(B) and 21(C))

F = 1.0 − 5.56   FNo = 1:1.8 − 2.4   2ω = 49.1° − 9.4°

| R1 = 9.525 | D1 = 0.139 | N1 = 1.80518 | ν1 = 25.4 |
|---|---|---|---|
| R2 = 3.679 | D2 = 0.494 | N2 = 1.61117 | ν2 = 55.9 |
| R3 = −19.007 | D3 = 0.021 | | |
| R4 = 2.818 | D4 = 0.322 | N3 = 1.60311 | ν3 = 60.7 |
| R5 = 7.785 | D5 = Variable | | |
| R6 = 5.396 | D6 = 0.086 | N4 = 1.74950 | ν4 = 35.3 |
| R7 = 0.767 | D7 = 0.308 | | |
| R8 = −1.066 | D8 = 0.086 | N5 = 1.54814 | ν5 = 45.8 |
| R9 = 1.222 | D9 = 0.247 | N6 = 1.84666 | ν6 = 23.9 |
| R10 = −4.793 | D10 = Variable | | |
| R11 = Stop | D11 = 0.082 | | |
| R12 = Aspheric | D12 = 0.301 | N7 = 1.51633 | ν7 = 64.1 |
| R13 = −11.389 | D13 = Variable | | |
| R14 = 2.143 | D14 = 0.086 | N8 = 1.84666 | ν8 = 23.9 |
| R15 = 1.006 | D15 = 0.016 | | |
| R16 = 1.064 | D16 = 0.462 | N9 = 1.60311 | ν9 = 60.7 |
| R17 = Aspheric | D17 = 0.537 | | |
| R18 = ∞ | D18 = 0.645 | N10 = 1.51633 | ν10 = 64.1 |
| R19 = ∞ | | | |

Aspheric surface R12:
Ro = 1.646    B = −5.040 × $10^{-2}$
C = −1.078 × $10^{-2}$    D = −8.872 × $10^{-3}$
Aspheric surface R17:
Ro = −2.436    B = 1.528 × $10^{-2}$
C = −1.444 × $10^{-3}$    D = −1.230 × $10^{-1}$

| Variable Separation | Focal Length | | |
|---|---|---|---|
| | 1.00 | 2.59 | 5.56 |
| D5 | 0.08 | 1.82 | 2.85 |
| D10 | 1.85 | 0.79 | 0.16 |
| D13 | 1.02 | 0.72 | 1.07 |

Numerical Example 15 (FIGS. 19, 22(A), 22(B) and 22(C))

F = 1.0 − 5.50   FNo = 1:1.8 − 2.4   2ω = 49° − 9.4°

| R1 = 9.019 | D1 = 0.139 | N1 = 1.80518 | ν1 = 25.4 |
|---|---|---|---|
| R2 = 3.562 | D2 = 0.524 | N2 = 1.51633 | ν2 = 64.1 |
| R3 = −13.507 | D3 = 0.021 | | |
| R4 = 3.048 | D4 = 0.353 | N3 = 1.65844 | ν3 = 50.9 |
| R5 = 12.925 | D5 = Variable | | |
| R6 = 6.540 | D6 = 0.085 | N4 = 1.83400 | ν4 = 37.2 |
| R7 = 0.804 | D7 = 0.240 | | |
| R8 = −0.914 | D8 = 0.085 | N5 = 1.51823 | ν5 = 59.0 |
| R9 = 1.354 | D9 = 0.246 | N6 = 1.84666 | ν6 = 23.9 |
| R10 = −4.285 | D10 = Variable | | |
| R11 = Stop | D11 = 0.1443 | | |
| R12 = Aspheric | D12 = 0.449 | N7 = 1.62299 | ν7 = 58.1 |
| R13 = −1.587 | D13 = 0.061 | | |
| R14 = −1.301 | D14 = 0.085 | N8 = 1.80518 | ν8 = 25.4 |
| R15 = −3.268 | D15 = Variable | | |
| R16 = 2.490 | D16 = 0.085 | N9 = 1.84666 | ν9 = 23.9 |
| R17 = 1.418 | D17 = 0.016 | | |
| R18 = 1.498 | D18 = 0.460 | N10 = 1.60311 | ν10 = 60.7 |
| R19 = Aspheric | D19 = 0.535 | | |
| R20 = ∞ | D20 = 0.642 | N11 = 1.51633 | ν11 = 64.1 |
| R21 = ∞ | | | |

Aspheric surface R12:

-continued

Numerical Example 15 (FIGS. 19, 22(A), 22(B) and 22(C))

Ro = 1.745    B = −1.728 × $10^{-2}$
C = −9.754 × $10^{-4}$    D = 4.633 × $10^{-2}$
Aspheric surface R19:
Ro = −2.049    B = 6.820 × $10^{-2}$
C = −1.088 × $10^{-2}$    D = −1.864 × $10^{-2}$

| Variable Separation | Focal Length | | |
|---|---|---|---|
| | 1.00 | 2.47 | 5.50 |
| D5 | 0.13 | 1.86 | 2.87 |
| D10 | 1.29 | 0.57 | 0.15 |
| D15 | 0.85 | 0.66 | 1.12 |

Figure 23:
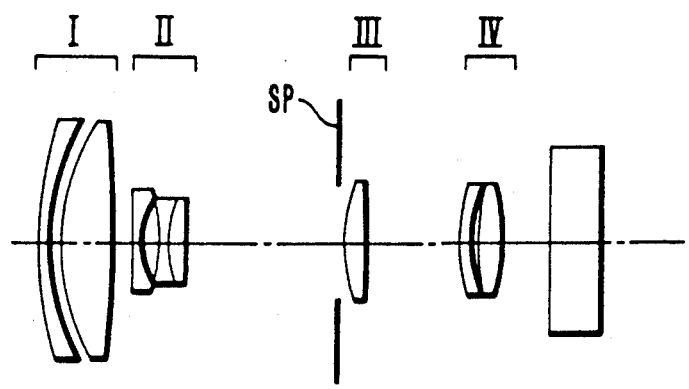
FIG. 23 is a longitudinal section view of numerical examples 16 to 18 of the invention.
Figure 24A:
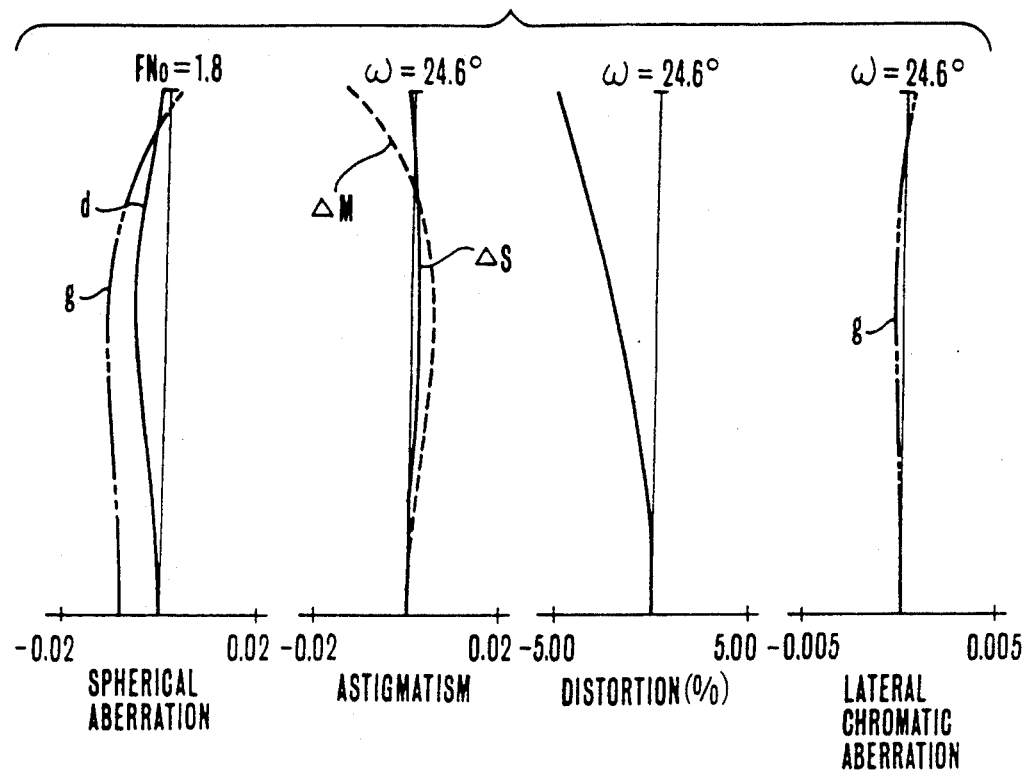
FIGS. 24(A), 24(B) and 24(C) are graphs of the various aberrations of the numerical example 16.
Figure 24B:
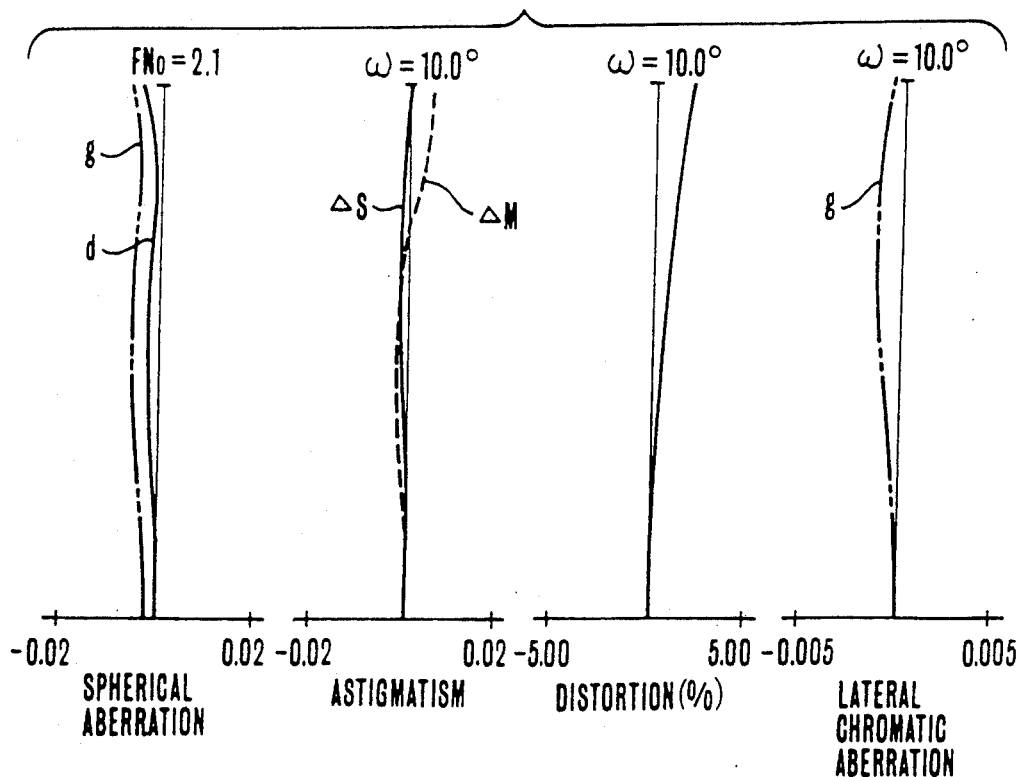
Figure 24C:
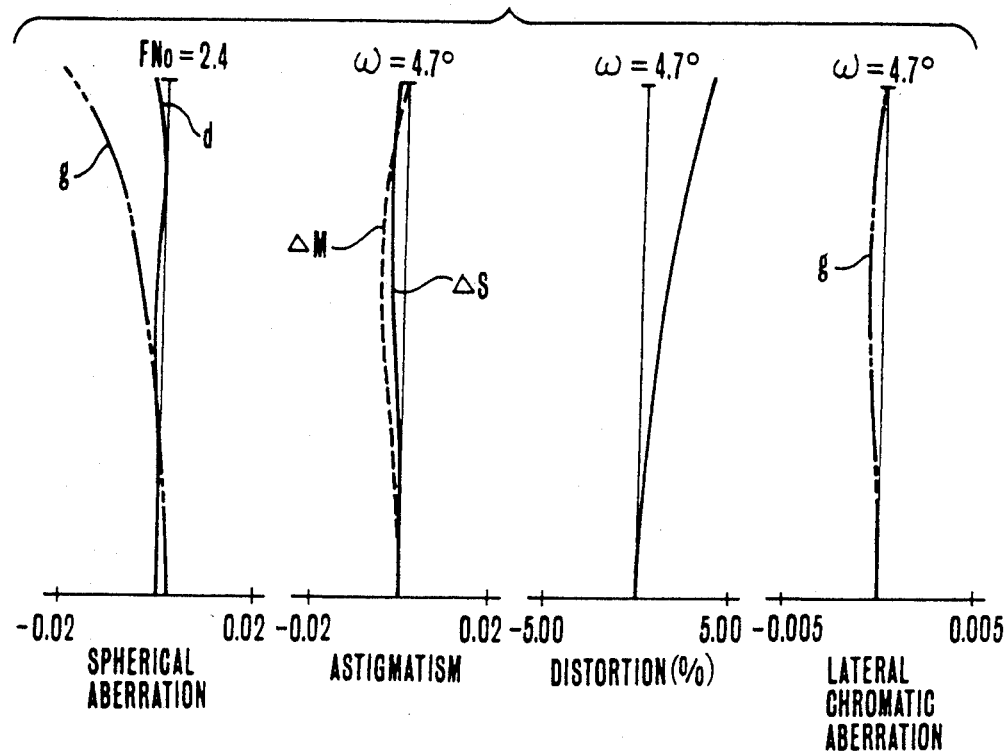
Figure 25A:
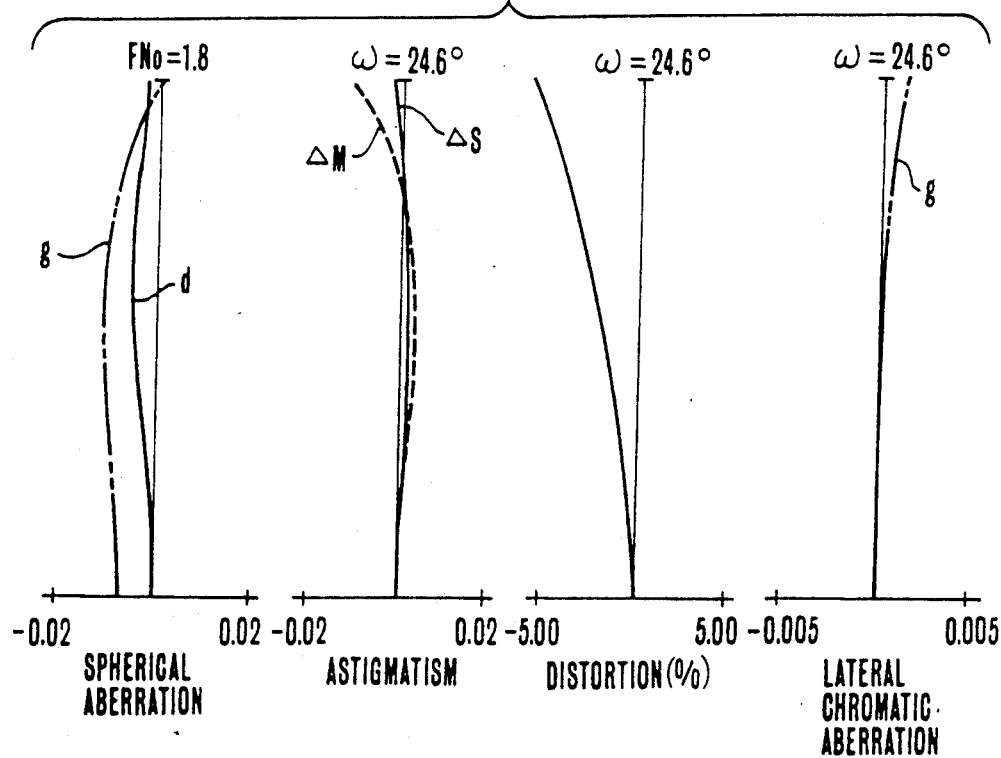
FIGS. 25(A), 25(B) and 25(C) are graphs of the various aberrations of the numerical example 17.
Figure 25B:
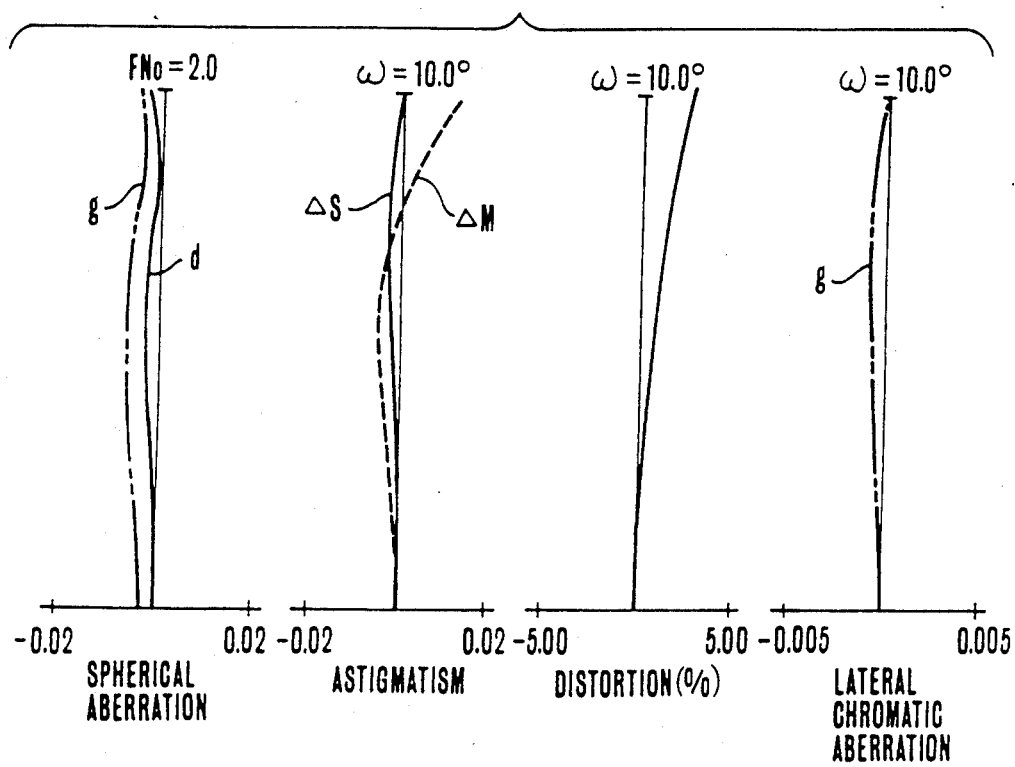
Figure 25C:
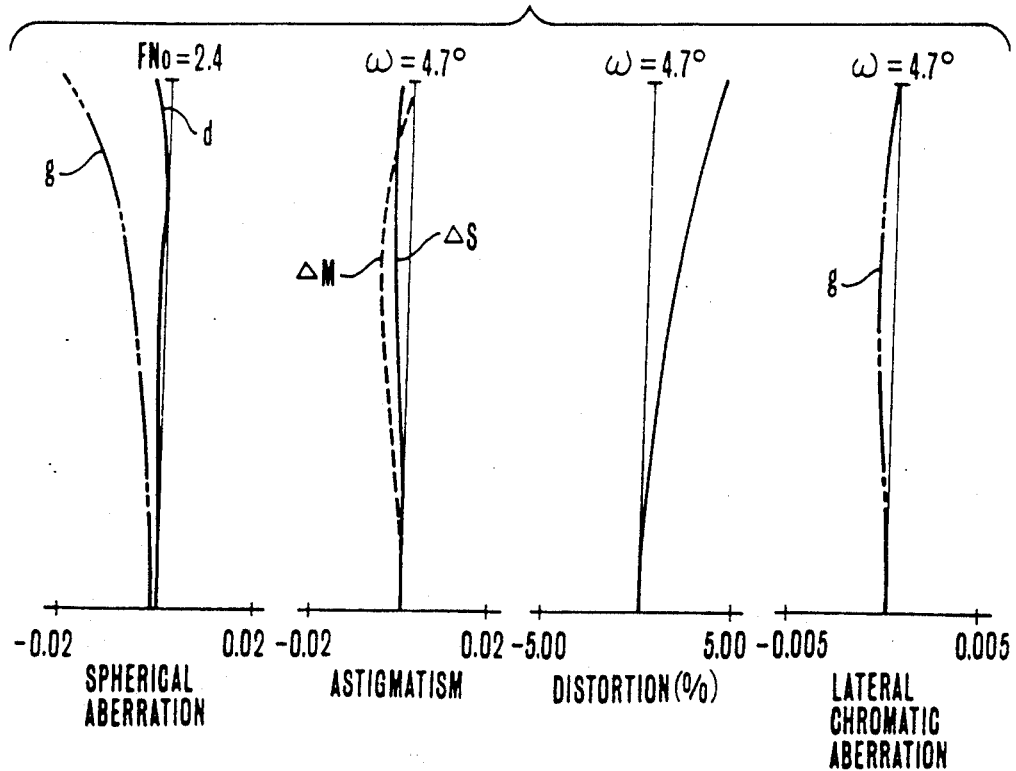
Figure 26A:
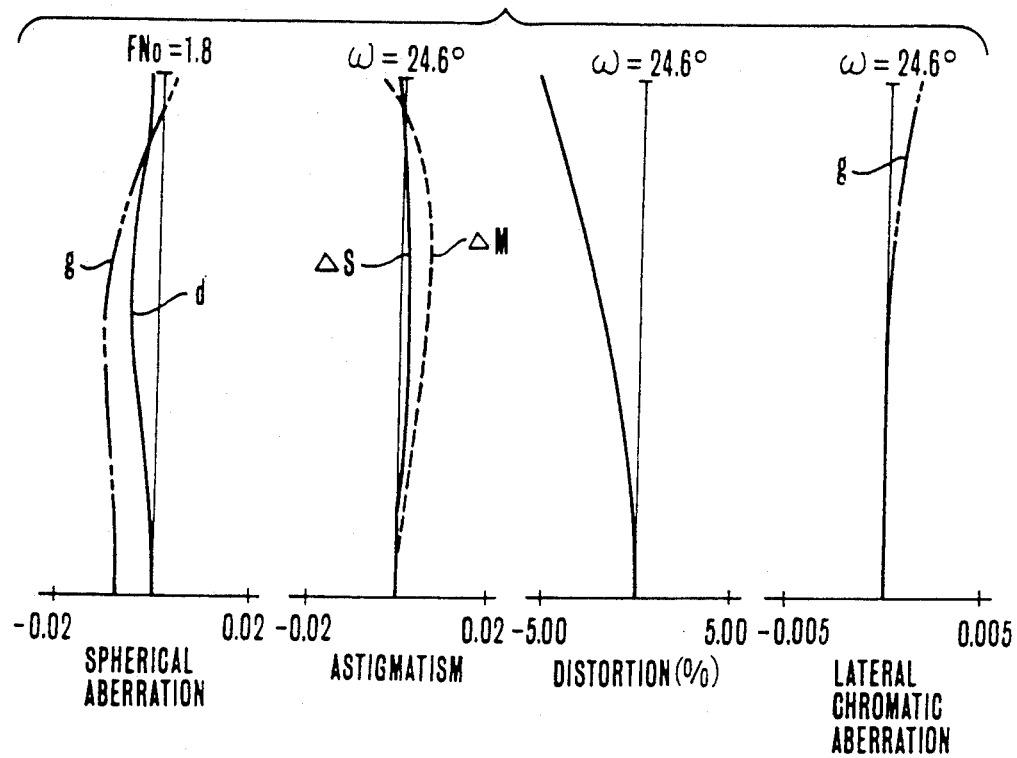
FIGS. 26(A), 26(B) and 26(C) are graphs of the various aberrations of the numerical example 18.
Figure 26B:
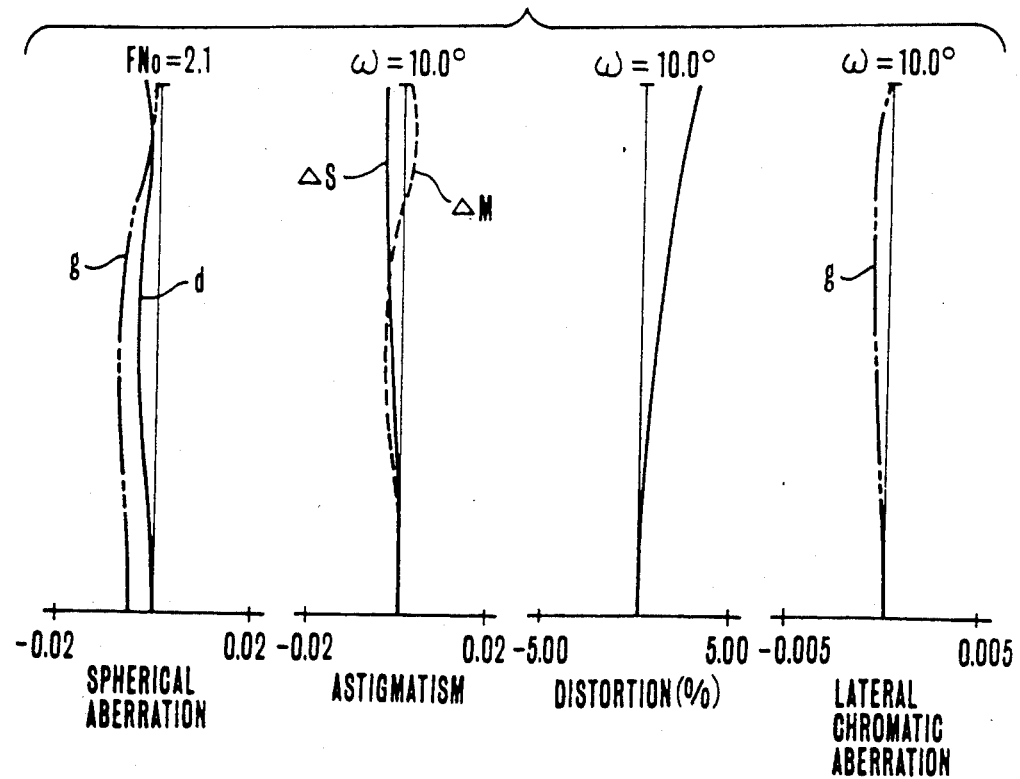
Figure 26C:
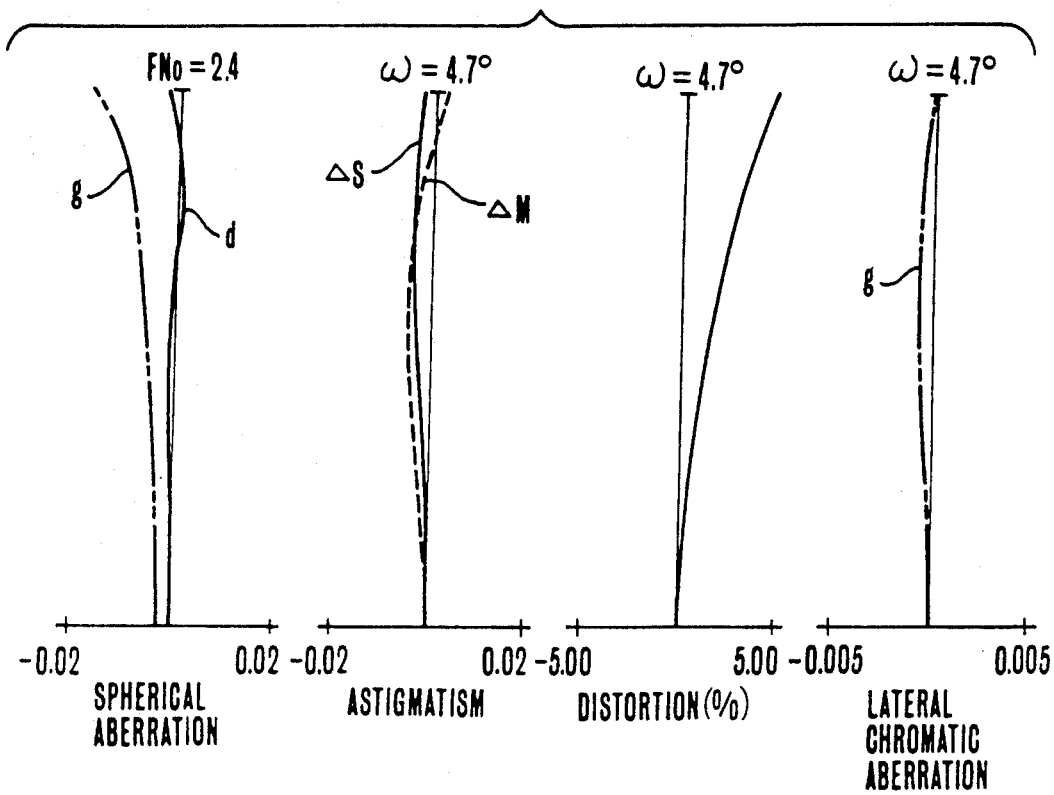

Another specific embodiment is described below where aspheric surfaces are applied to the first, third and fourth lens groups as shown in the lens block diagram of FIG. 23.

And, in the present embodiment, by applying aspheric surfaces to the first lens group, the third lens group and the fourth lens group, good optical performance is obtained over the entire range of variation of the image magnification and further over the entire range of object distances, while achieving a simplification of the entire system.

In the present embodiment, by applying to at least one of the lens surfaces in the first lens group an aspheric surface of such shape that the positive refractive power gets progressively weaker from the center of the area of the lens surface to the margin within a zone of up to 0.7 of the effective diameter, mainly the spherical aberration and coma in the telephoto end are corrected well.

Also, in the present embodiment, by applying to at least one of the lens surfaces in the third lens group, an aspheric surface of such shape that the positive refractive power gets progressively weaker from the center of the area of the lens surface to the margin, variation with zooming of the aberrations, particularly spherical aberration and coma in that region of the zooming range which is from the wide-angle end to the intermediate position, is corrected well. The use of such an aspheric surface of the prescribed shape in the third lens group produces another advantage that the third lens group can be constructed from one lens, thus contributing to a reduction of the total number of constituent lens elements of the entire system.

That is, in numerical examples to be described later, the third lens group is constructed from a single positive lens in bi-convex form. Accordingly, a good optical performance is obtained.

It should be noted that for the positive lens of the third lens group, it is preferred from the standpoint of good correction of longitudinal chromatic aberration to choose a material whose Abbe number is not less than "58".

Also, in the present embodiment, by applying to at least one of the lens surfaces in the fourth lens group an aspheric surface of such shape that the positive refractive power decreases with increases of the height from the center of the lens surface to the margin within a zone of up to 0.5 of the effective diameter, variation with zooming and focusing of the aberrations, particularly spherical aberration and some of the off-axial aberrations such as coma, is corrected well.

Particularly in the present embodiment, the fourth lens group is constructed so as to include at least one meniscus-shaped negative lens convex toward the object side, thereby correcting well mainly the off-axial aberrations and lateral chromatic aberration.

It should be noted that for the aspheric surfaces in the first lens group, the third lens group and the fourth lens group, letting the deviations of them from their respective osculating spheres at a height of 0.7 of the effective radius from the optical axis be denoted by $\Delta 1$, $\Delta 3$ and $\Delta 4$ respectively and the radii of curvature of these osculating spheres by RA1, RA3 and RA4 respectively, they must be figured so as to satisfy the following conditions:

$$1 \times 10^{-4} < |\Delta 1/RA1| < 3 \times 10^{-3}$$

$$1 \times 10^{-4} < |\Delta 3/RA3| < 4 \times 10^{-3}$$

$$7 \times 10^{-5} < |\Delta 4/RA4| < 3 \times 10^{-3}$$

When these conditions are satisfied, the first lens group can be constructed from a negative lens and a positive lens, totaling two lenses, the third lens group from one positive lens, and the fourth lens group from a negative lens and a positive lens, totaling two lenses, thus contributing to a simplification of the entire lens system. Yet, good correction of spherical aberration, coma and other various aberrations are stabilized against zooming and focusing.

Particularly in the present embodiment, as shown in numerical examples to be described later, the total number of constituent lens elements is 8, so that a 4-group rear focus type zoom lens of reduced size with a range of 6 and an F-number of about 1.8, while still preserving good optical performance, is achieved.

Three numerical examples 16 to 18 of the invention are shown below.

| Numerical Example 16 (FIGS. 23, 24(A), 24(B) and 24(C)) | | | |
|---|---|---|---|
| $F = 1.0 - 5.56$ | $FNo = 1:1.8 - 2.4$ | $2\omega = 49.1° - 9.4°$ | |
| R1 = 5.517 | D1 = 0.139 | N1 = 1.78472 | $\nu 1$ = 25.7 |
| R2 = 2.921 | D2 = 0.107 | | |
| R3 = Aspheric | D3 = 0.731 | N2 = 1.60311 | $\nu 2$ = 60.7 |
| R4 = Aspheric | D4 = Variable | | |
| R5 = −57.596 | D5 = 0.086 | N3 = 1.74950 | $\nu 3$ = 35.3 |
| R6 = 0.833 | D6 = 0.270 | | |
| R7 = −1.439 | D7 = 0.086 | N4 = 1.53172 | $\nu 4$ = 48.9 |
| R8 = 1.073 | D8 = 0.247 | N5 = 1.80518 | $\nu 5$ = 25.4 |
| R9 = −7.825 | D9 = Variable | | |
| R10 = Stop | D10 = 0.1 | | |
| R11 = Aspheric | D11 = 0.301 | N6 = 1.51633 | $\nu 6$ = 64.1 |
| R12 = −28.491 | D12 = Variable | | |
| R13 = 2.090 | D13 = 0.086 | N7 = 1.84666 | $\nu 7$ = 23.9 |
| R14 = 1.047 | D14 = 0.016 | | |
| R15 = 1.106 | D15 = 0.462 | N8 = 1.60311 | $\nu 8$ = 60.7 |
| R16 = Aspheric | D16 = 0.537 | | |
| R17 = ∞ | D17 = 0.645 | N9 = 1.51633 | $\nu 9$ = 64.1 |
| R18 = ∞ | | | |

| Aspheric surface R3: | |
|---|---|
| Ro = 2.360 | B = −3.676 × $10^{-3}$ |
| C = −6.314 × $10^{-4}$ | D = −9.493 × $10^{-5}$ |
| Aspheric surface R4: | |
| Ro = −8.165 | B = 3.232 × $10^{-3}$ |
| C = −4.399 × $10^{-5}$ | D = −2.333 × $10^{-6}$ |
| Aspheric surface R11: | |
| Ro = 1.655 | B = −4.587 × $10^{-2}$ |
| C = −1.552 × $10^{-2}$ | D = −2.335 × $10^{-3}$ |
| Aspheric surface R16: | |
| Ro = −2.450 | B = 2.480 × $10^{-2}$ |
| C = −8.002 × $10^{-3}$ | D = −7.749 × $10^{-2}$ |

| Variable | Focal Length | | |
|---|---|---|---|

-continued

| Numerical Example 16 (FIGS. 23, 24(A), 24(B) and 24(C)) | | | |
|---|---|---|---|
| Separation | 1.00 | 2.59 | 5.56 |
| D4 | 0.17 | 1.91 | 2.94 |
| D9 | 1.87 | 0.81 | 0.18 |
| D12 | 1.13 | 0.83 | 1.17 |

| Numerical Example 17 (FIGS. 23, 25(A), 25(B) and 25(C)) | | | |
|---|---|---|---|
| $F = 1.0 - 5.56$ | $FNo = 1:1.8 - 2.4$ | $2\omega = 49.1° - 9.4°$ | |
| R1 = 5.741 | D1 = 0.139 | N1 = 1.80518 | $\nu 1$ = 25.4 |
| R2 = 3.025 | D2 = 0.107 | | |
| R3 = Aspheric | D3 = 0.731 | N2 = 1.60311 | $\nu 2$ = 60.7 |
| R4 = Aspheric | D4 = Variable | | |
| R5 = −18.419 | D5 = 0.086 | N3 = 1.74950 | $\nu 3$ = 35.3 |
| R6 = 0.873 | D6 = 0.262 | | |
| R7 = −1.605 | D7 = 0.086 | N4 = 1.53172 | $\nu 4$ = 48.9 |
| R8 = 1.115 | D8 = 0.247 | N5 = 1.84666 | $\nu 5$ = 23.9 |
| R9 = −22.353 | D9 = Variable | | |
| R10 = Stop | D10 = 0.10 | | |
| R11 = Aspheric | D11 = 0.301 | N6 = 1.51633 | $\nu 6$ = 64.1 |
| R12 = −58.482 | D12 = Variable | | |
| R13 = 2.096 | D13 = 0.086 | N7 = 1.84666 | $\nu 7$ = 23.9 |
| R14 = 1.032 | D14 = 0.016 | | |
| R15 = 1.090 | D15 = 0.462 | N8 = 1.60311 | $\nu 8$ = 60.7 |
| R16 = Aspheric | D16 = 0.537 | | |
| R17 = ∞ | D17 = 0.645 | N9 = 1.51633 | $\nu 9$ = 64.1 |
| R18 = ∞ | | | |

| Aspheric surface R3: | |
|---|---|
| Ro = 2.421 | B = −2.983 × $10^{-3}$ |
| C = −4.590 × $10^{-4}$ | D = −1.023 × $10^{-4}$ |
| Aspheric surface R4: | |
| Ro = −7.537 | B = 4.263 × $10^{-3}$ |
| C = −5.909 × $10^{-5}$ | D = −2.804 × $10^{-5}$ |
| Aspheric surface R11: | |
| Ro = −1.558 | B = −5.151 × $10^{-2}$ |
| C = −1.249 × $10^{-2}$ | D = −6.017 × $10^{-3}$ |
| Aspheric surface R16: | |
| Ro = −2.460 | B = 2.539 × $10^{-2}$ |
| C = 7.781 × $10^{-5}$ | D = −9.795 × $10^{-2}$ |

| Variable | Focal Length | | |
|---|---|---|---|
| Separation | 1.00 | 2.59 | 5.56 |
| D4 | 0.18 | 1.92 | 2.94 |
| D9 | 1.90 | 0.84 | 0.22 |
| D12 | 1.10 | 0.80 | 1.15 |

| Numerical Example 18 (FIGS. 23, 26(A), 26(B) and 26(C)) | | | |
|---|---|---|---|
| $F = 1.0 - 5.56$ | $FNo = 1:1.8 - 2.4$ | $2\omega = 49.1° - 9.4°$ | |
| R1 = 5.439 | D1 = 0.139 | N1 = 1.80518 | $\nu 1$ = 25.4 |
| R2 = 2.919 | D2 = 0.107 | | |
| R3 = Aspheric | D3 = 0.731 | N2 = 1.60311 | $\nu 2$ = 60.7 |
| R4 = Aspheric | D4 = Variable | | |
| R5 = −11.774 | D5 = 0.086 | N3 = 1.83400 | $\nu 3$ = 37.2 |
| R6 = 0.979 | D6 = 0.242 | | |
| R7 = −1.647 | D7 = 0.086 | N4 = 1.53172 | $\nu 4$ = 48.9 |
| R8 = 1.196 | D8 = 0.247 | N5 = 1.84666 | $\nu 5$ = 23.9 |
| R9 = −13.072 | D9 = Variable | | |
| R10 = Stop | D10 = 0.14 | | |
| R11 = Aspheric | D11 = 0.301 | N6 = 1.51633 | $\nu 6$ = 64.1 |
| R12 = 9.697 | D12 = Variable | | |
| R13 = 2.054 | D13 = 0.086 | N7 = 1.84666 | $\nu 7$ = 23.9 |
| R14 = 1.028 | D14 = 0.016 | | |
| R15 = 1.087 | D15 = 0.462 | N8 = 1.60311 | $\nu 8$ = 60.7 |
| R16 = Aspheric | D16 = 0.537 | | |
| R17 = ∞ | D17 = 0.645 | N9 = 1.51633 | $\nu 9$ = 64.1 |
| R18 = ∞ | | | |

-continued

Numerical Example 18 (FIGS. 23, 26(A), 26(B) and 26(C))

Aspheric surface R3:
Ro = 2.426          B = −2.508 × 10⁻³
C = −4.071 × 10⁻⁴   D = −6.829 × 10⁻⁵

Aspheric surface R4:
Ro = −7.329         B = 4.433 × 10⁻³
C = −1.799 × 10⁻⁵   D = −2.630 × 10⁻⁵

Aspheric surface R11:
Ro = 1.369          B = −6.110 × 10⁻²
C = −1.769 × 10⁻²   D = −8.490 × 10⁻³

Aspheric surface R16:
Ro = −2.475         B = 3.370 × 10⁻²
C = 1.108 × 10⁻³    D = −9.750 × 10⁻²

| Variable Separation | Focal Length | | |
|---|---|---|---|
| | 1.00 | 2.59 | 5.56 |
| D4 | 0.19 | 1.93 | 2.96 |
| D9 | 1.91 | 0.85 | 0.22 |
| D12 | 1.06 | 0.77 | 1.11 |

Figure 27:
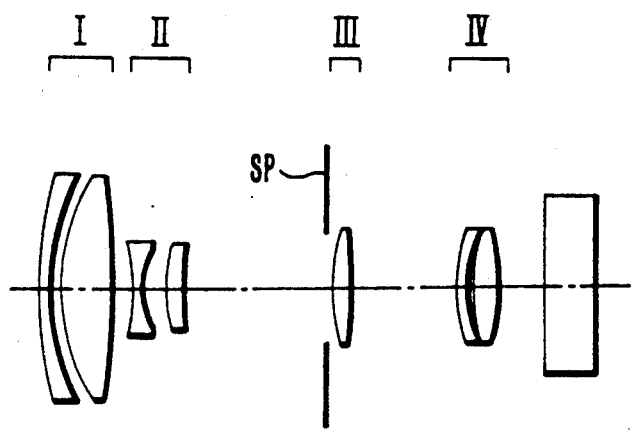
FIG. 27 is a longitudinal section view of numerical examples 19 to 21 of the invention.
Figure 28A:
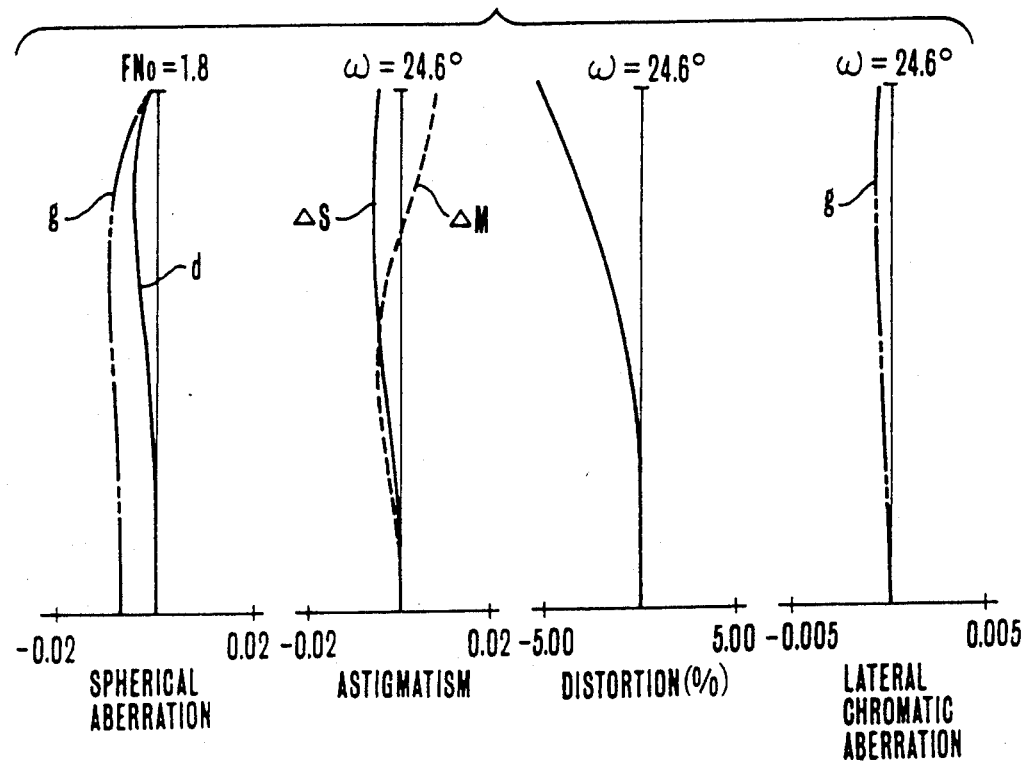
FIGS. 28(A), 28(B) and 28(C) are graphs of the various aberrations of the numerical example 19.
Figure 28B:
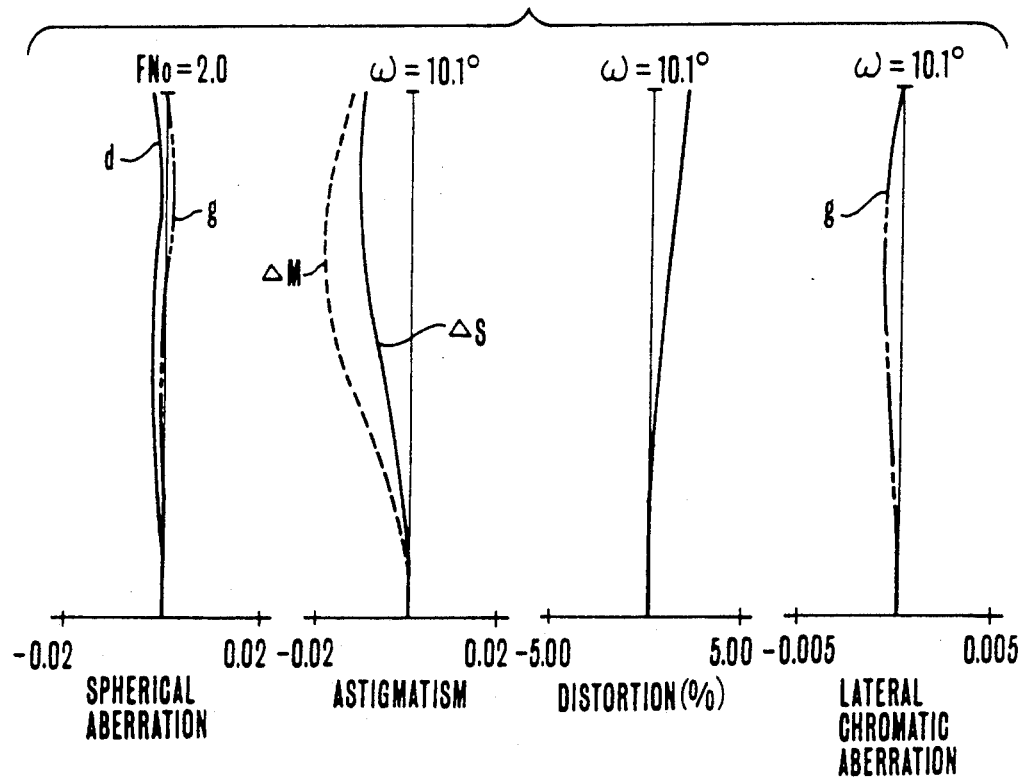
Figure 28C:
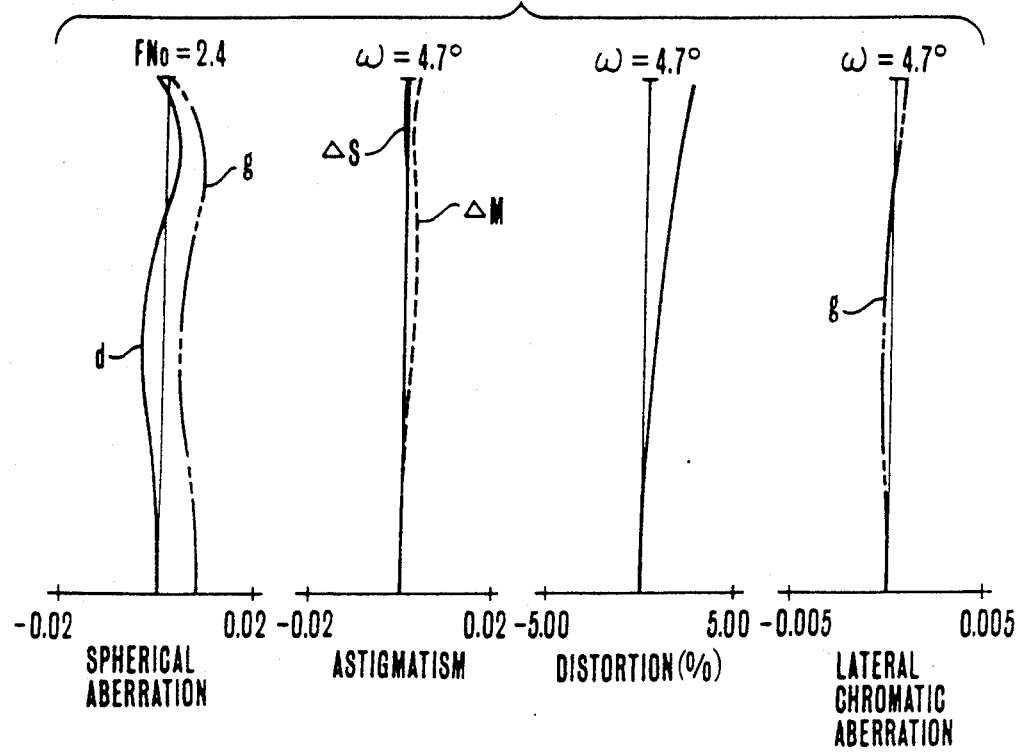
Figure 29A:
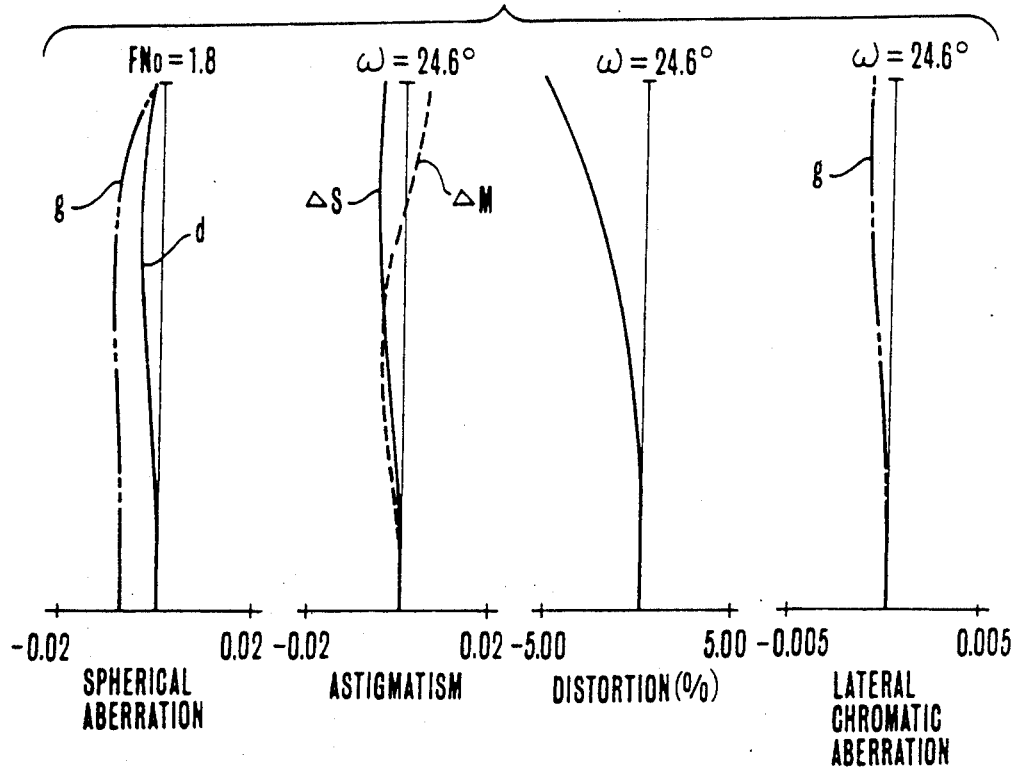
FIGS. 29(A), 29(B) and 29(C) are graphs of the various aberrations of the numerical example 20.
Figure 29B:
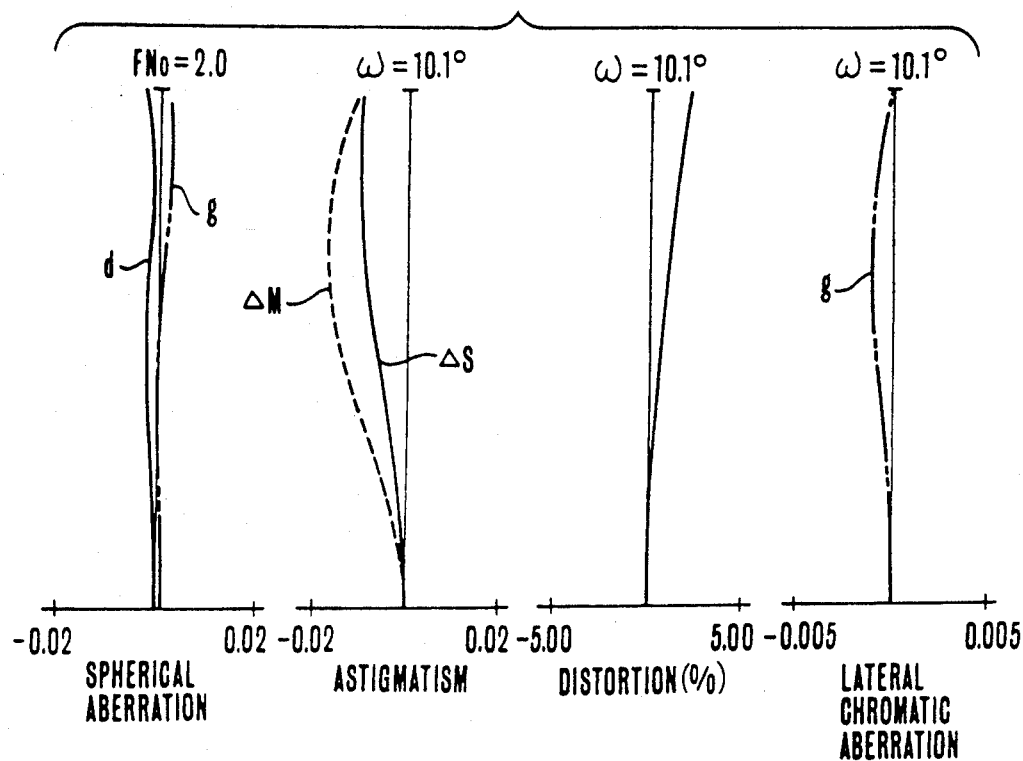
Figure 29C:
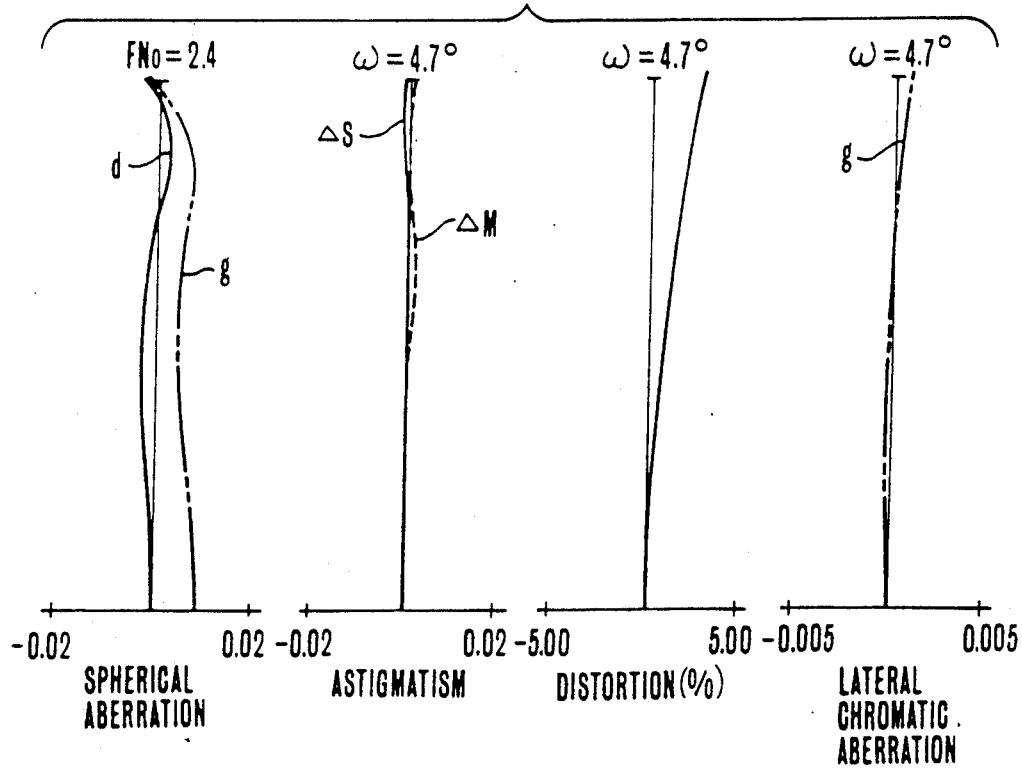
Figure 30A:
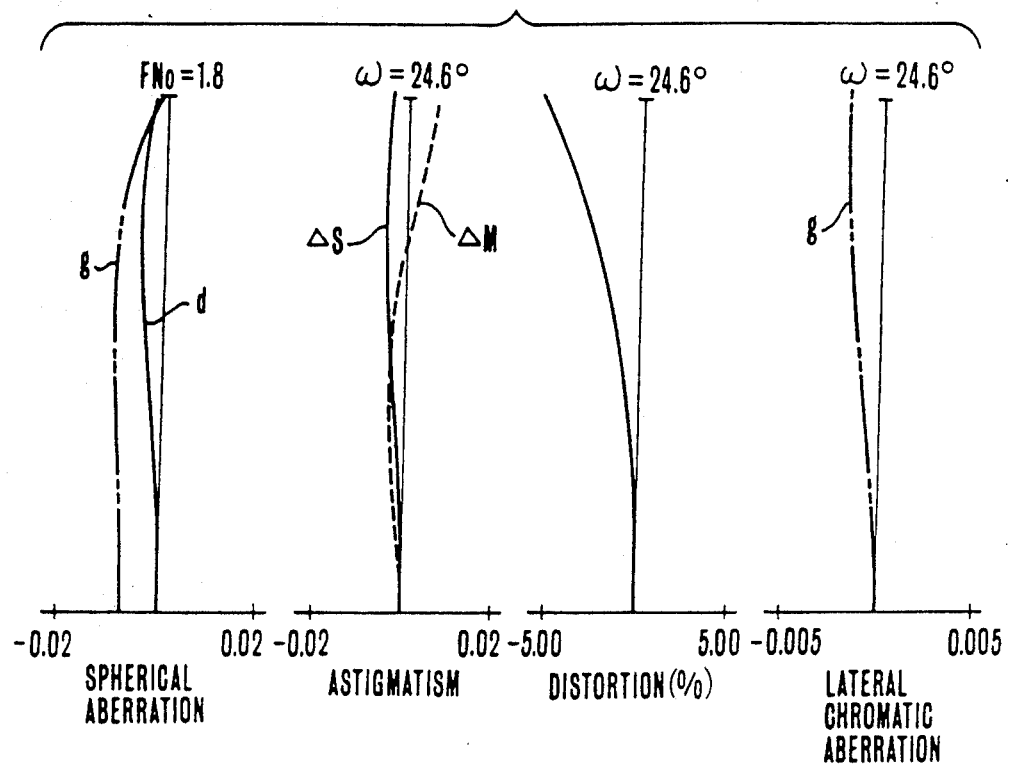
FIGS. 30(A), 30(B) and 30(C) are graphs of the various aberrations of the numerical example 21.
Figure 30B:
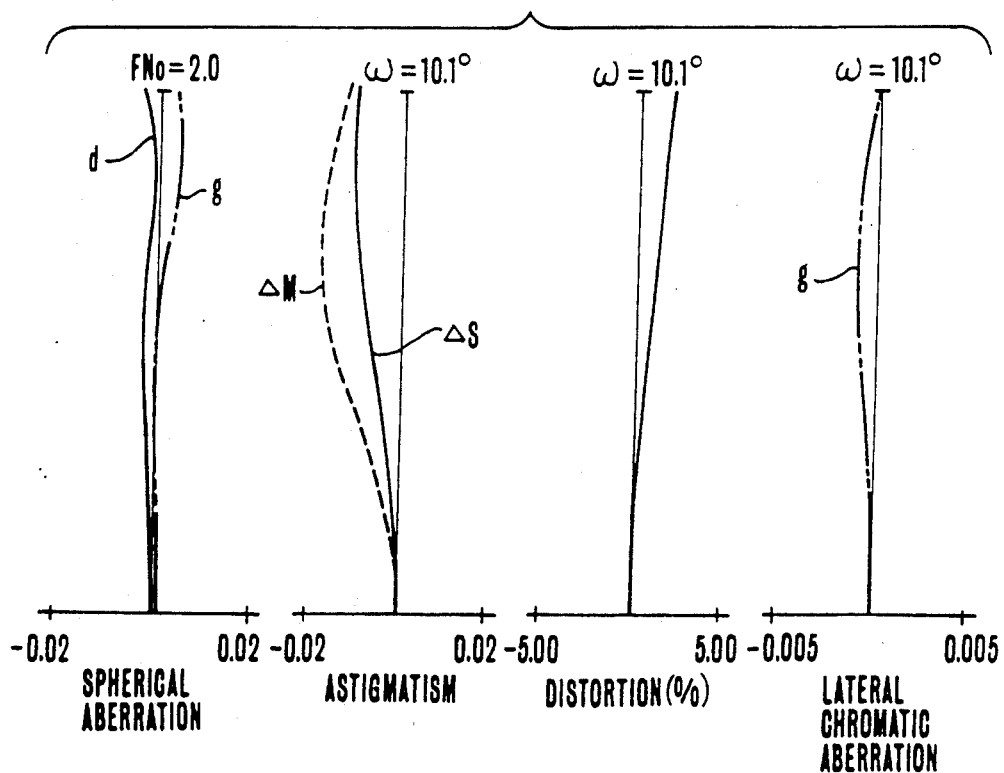
Figure 30C:
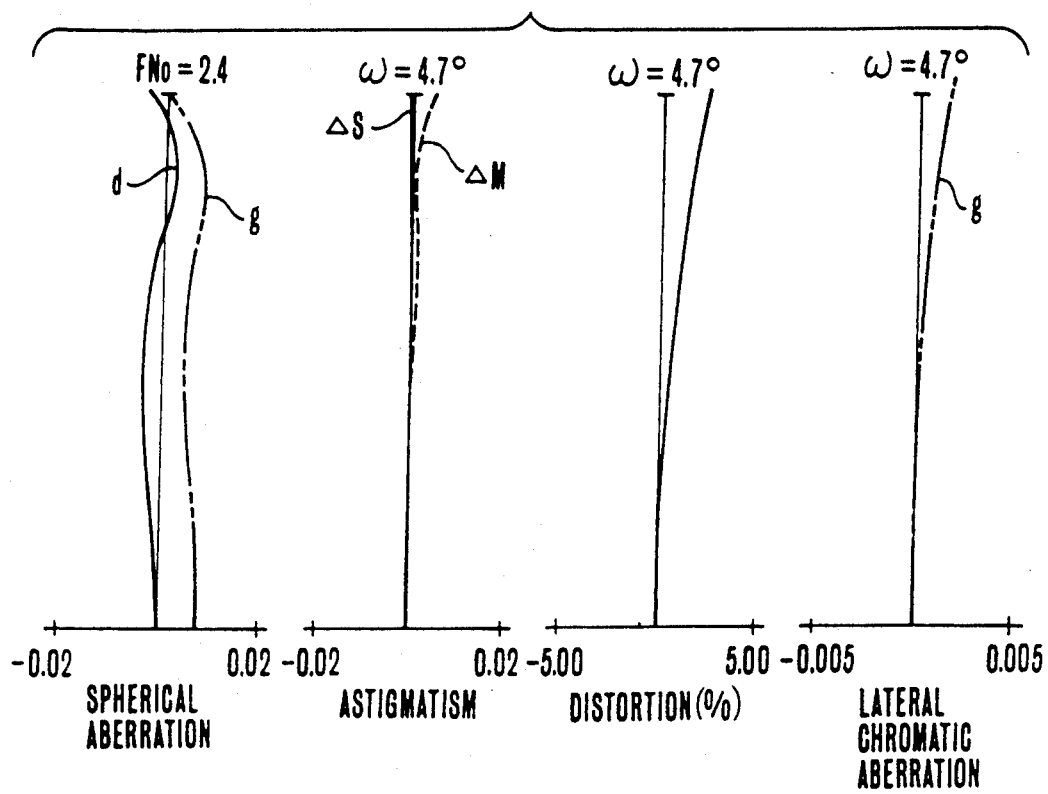

In final, yet another specific embodiment is described where aspheric surfaces are applied to all the lens groups as shown in the lens block diagram of FIG. 27.

In the present embodiment, by applying to at least one of the lens surfaces in the first lens group an aspheric surface of such shape that the positive refractive power gets progressively weaker from the center of the area of the lens surface to the margin within a zone of up to 0.7 of the effective diameter, mainly spherical aberration and coma are corrected well despite the reduction of the number of lens elements in the first lens group.

Also, by applying to at least one of the lens surfaces in the second lens group an aspheric surface of such shape that the negative refractive power gets progressively weaker from the center of the area of the lens surface to the margin within a zone of up to 0.7 of the effective diameter, variation with zooming of the aberrations is corrected well. So the second lens group can be constructed from a bi-concave negative lens and a positive lens, totaling two lenses, thus contributing to a reduction of the total number of constituent lens elements of the entire system.

In the present embodiment, because the second lens group has the lens of negative refractive power, the lower the refractive index of the material of that negative lens, the preferable, for the Petzval sum can be made smaller. But if too much lower, the curvature of the lens surfaces of the negative lens has to be strengthened, which in turn causes the amount of spherical aberration and other various aberrations produced to be increased objectionably. On this account, in the present invention, a range for the refractive index N2N of the material of the negative lens is set forth as follows:

$$1.68 < N2N < 1.80$$

When this is satisfied, a good compromise between the minimization of the Petzval sum and the correction of all aberrations is attained.

Also, by applying to at least one of the lens surfaces in the third lens group an aspheric surface of such shape that the positive refractive power gets progressively weaker from the center of the area of the lens surface to the margin, variation with zooming of the aberrations, particularly spherical aberration and coma in that region of the zooming range which is from the wide-angle end to an intermediate position is corrected well. The use of such an aspheric surface of the prescribed shape in the third lens group produces another advantage that as the third lens group is constructed from one lens, the total number of constituent lens elements of the entire system is reduced.

That is, in numerical examples to be described later, the third lens group is constructed from a single positive lens in bi-convex form. Yet, a good optical performance is obtained.

It should be noted that for the positive lens of the third lens group it is preferred from the standpoint of good correction of longitudinal chromatic aberration to choose a material whose Abbe number is not less than "58".

Also, in the present embodiment, by applying to at least one of the lens surfaces in the fourth lens group an aspheric surface of such shape that the positive refractive power decreases with increase of the distance from the center of the area of the lens surface within a zone of up to 0.5 of the effective diameter, variation with zooming and focusing of the aberrations, particularly spherical aberration and some of the off-axial aberrations such as coma, is corrected well.

Particularly in the present embodiment, the fourth lens group is constructed so as to include at least one meniscus-shaped negative lens convex toward the object side, thereby correcting well mainly the off-axial aberrations and lateral chromatic aberration.

It should be noted that, in the present embodiment, the aspheric surfaces in the first, second, third and fourth lens groups must be figured so as to satisfy the following conditions:

$$1 \times 10^{-4} < |\Delta 1/RA1| < 3 \times 10^{-3}$$
$$1 \times 10^{-3} < |\Delta 2/RA2| < 2 \times 10^{-2}$$
$$1 \times 10^{-4} < |\Delta 3/RA3| < 4 \times 10^{-3}$$
$$7 \times 10^{-5} < |\Delta 4/RA4| < 3 \times 10^{-3}$$

where $\Delta 1$, $\Delta 2$, $\Delta 3$ and $\Delta 4$ are respectively the deviations of the aspheric surfaces in the first to fourth lens groups from the respective osculating spheres, and RA1, RA2, RA3 and RA4 are the radii of curvature of the paraxial osculating spheres in the first to fourth lens groups respectively. When these conditions are satisfied, the first lens group can be constructed from a negative lens and a positive lens, totaling two lenses, the second lens group from a bi-concave negative lens and a positive lens, totaling two lenses, the third lens group from one positive lens, and the fourth lens group from a negative lens and a positive lens, totaling two lenses. Despite such a simplification of the entire lens system, good correction of spherical aberration, coma and other various aberrations is stabilized against zooming and focusing.

Particularly in the present embodiment, as shown in numerical examples to be described later, the total number of constituent lens elements is 7, thus reducing the size of the lens system. Accordingly, a 4-group rear focus type zoom lens having a range of 6 and an F-number of about 1.8 and well corrected for high optical performance is achieved.

Three numerical examples 19 to 21 of the invention are shown below.

Numerical Example 19 (FIGS. 27, 28(A), 28(B) and 28(C))

F = 1.0 − 5.56   FNo = 1:1.8 − 2.4   2ω = 49.1° − 9.4°

R1 = 6.052   D1 = 0.139   N1 = 1.80518   ν1 = 25.4

-continued

Numerical Example 19 (FIGS. 27, 28(A), 28(B) and 28(C))

| | | | |
|---|---|---|---|
| R2 = 3.036 | D2 = 0.107 | | |
| R3 = Aspheric | D3 = 0.731 | N2 = 1.60311 | $\nu 2$ = 60.7 |
| R4 = Aspheric | D4 = Variable | | |
| R5 = −2.491 | D5 = 0.086 | N3 = 1.77250 | $\nu 3$ = 49.6 |
| R6 = Aspheric | D6 = 0.307 | | |
| R7 = 1.815 | D7 = 0.247 | N4 = 1.84666 | $\nu 4$ = 23.9 |
| R8 = 6.787 | D8 = Variable | | |
| R9 = Stop | D9 = 0.1 | | |
| R10 = Aspheric | D10 = 0.301 | N5 = 1.51633 | $\nu 5$ = 64.1 |
| R11 = −5.187 | D11 = Variable | | |
| R12 = 2.310 | D12 = 0.086 | N6 = 1.84666 | $\nu 6$ = 23.9 |
| R13 = 1.100 | D13 = 0.016 | | |
| R14 = 1.154 | D14 = 0.462 | N7 = 1.60311 | $\nu 7$ = 60.7 |
| R15 = Aspheric | D15 = 0.537 | | |
| R16 = ∞ | D16 = 0.645 | N8 = 1.51633 | $\nu 8$ = 64.1 |
| R17 = ∞ | | | |

Aspheric surface R3:
Ro = 2.324   B = −4.342 × $10^{-3}$
C = −8.034 × $10^{-4}$   D = −2.515 × $10^{-4}$ Aspheric surface R4:
Ro = −7.803   B = 4.136 × $10^{-3}$
C = −5.524 × $10^{-4}$   D = −5.521 × $10^{-6}$ Aspheric surface R6:
Ro = 0.743   B = −4.234 × $10^{-1}$
C = 2.568 × $10^{-1}$   D = −2.252

Aspheric surface R10:
Ro = 2.027   B = −4.451 × $10^{-2}$
C = 1.977 × $10^{-3}$   D = −9.095 × $10^{-3}$ Aspheric surface R15:
Ro = −2.393   B = 2.149 × $10^{-2}$
C = −1.911 × $10^{-2}$   D = −2.580 × $10^{-2}$

| Variable Separation | Focal Length | | |
|---|---|---|---|
| | 1.00 | 2.55 | 5.56 |
| D4 | 0.22 | 1.96 | 2.98 |
| D8 | 1.80 | 0.74 | 0.12 |
| D11 | 1.30 | 0.99 | 1.34 |

Numerical Example 20 (FIGS. 27, 29(A), 29(B) and 29(C))

F = 1.0 − 5.56   FNo = 1:1.8 − 2.4   2$\omega$ = 49.1° − 9.4°

| | | | |
|---|---|---|---|
| R1 = 6.665 | D1 = 0.139 | N1 = 1.78472 | $\nu 1$ = 25.7 |
| R2 = 3.037 | D2 = 0.107 | | |
| R3 = Aspheric | D3 = 0.731 | N2 = 1.62299 | $\nu 2$ = 58.1 |
| R4 = Aspheric | D4 = Variable | | |
| R5 = −2.509 | D5 = 0.086 | N3 = 1.74320 | $\nu 3$ = 49.3 |
| R6 = Aspheric | D6 = 0.312 | | |
| R7 = 1.715 | D7 = 0.247 | N4 = 1.84666 | $\nu 4$ = 23.9 |
| R8 = 4.756 | D8 = Variable | | |
| R9 = Stop | D9 = 0.10 | | |
| R10 = Aspheric | D10 = 0.301 | N5 = 1.51633 | $\nu 5$ = 64.1 |
| R11 = −5.088 | D11 = Variable | | |
| R12 = 2.314 | D12 = 0.086 | N6 = 1.84666 | $\nu 6$ = 23.9 |
| R13 = 1.123 | D13 = 0.016 | | |
| R14 = 1.176 | D14 = 0.462 | N7 = 1.60311 | $\nu 7$ = 60.7 |
| R15 = Aspheric | D15 = 0.537 | | |
| R16 = ∞ | D16 = 0.645 | N8 = 1.51633 | $\nu 8$ = 64.1 |
| R17 = ∞ | | | |

Aspheric surface R3:
Ro = 2.355   B = −4.286 × $10^{-3}$
C = −8.227 × $10^{-4}$   D = −2.982 × $10^{-4}$ Aspheric surface R4:
Ro = −7.748   B = 3.938 × $10^{-3}$
C = −6.490 × $10^{-4}$   D = −2.587 × $10^{-5}$ Aspheric surface R6:
Ro = 0.735   B = −4.106 × $10^{-1}$
C = 1.751 × $10^{-1}$   D = −2.091

Aspheric surface R10:
Ro = 2.094   B = −4.226 × $10^{-2}$
C = −2.742 × $10^{-4}$   D = −6.090 × $10^{-3}$ Aspheric surface R15:
Ro = −2.394   B = 2.237 × $10^{-2}$
C = −1.619 × $10^{-2}$   D = −2.158 × $10^{-2}$

| Variable Separation | Focal Length | | |
|---|---|---|---|
| | 1.00 | 2.55 | 5.56 |
| D4 | 0.23 | 1.97 | 2.99 |
| D8 | 1.82 | 0.76 | 0.14 |
| D11 | 1.34 | 1.05 | 1.39 |

Numerical Example 21 (FIGS. 27, 30(A), 30(B) and 30(C))

F = 1.0 − 5.56   FNo = 1:1.8 − 2.4   2$\omega$ = 49.1° − 9.4°

| | | | |
|---|---|---|---|
| R1 = 6.472 | D1 = 0.139 | N1 = 1.78472 | $\nu 1$ = 25.7 |
| R2 = 3.187 | D2 = 0.107 | | |
| R3 = Aspheric | D3 = 0.731 | N2 = 1.60311 | $\nu 2$ = 60.7 |
| R4 = Aspheric | D4 = Variable | | |
| R5 = −2.548 | D5 = 0.086 | N3 = 1.74320 | $\nu 3$ = 49.3 |
| R6 = Aspheric | D6 = 0.313 | | |
| R7 = 1.690 | D7 = 0.247 | N4 = 1.80518 | $\nu 4$ = 25.4 |
| R8 = 5.147 | D8 = Variable | | |
| R9 = Stop | D9 = 0.13 | | |
| R10 = Aspheric | D10 = 0.301 | N5 = 1.60311 | $\nu 5$ = 60.7 |
| R11 = −9.711 | D11 = Variable | | |
| R12 = 2.283 | D12 = 0.086 | N6 = 1.84666 | $\nu 6$ = 23.9 |
| R13 = 1.121 | D13 = 0.016 | | |
| R14 = 1.175 | D14 = 0.462 | N7 = 1.60311 | $\nu 7$ = 60.7 |
| R15 = Aspheric | D15 = 0.537 | | |
| R16 = ∞ | D16 = 0.645 | N8 = 1.51633 | $\nu 8$ = 64.1 |
| R17 = ∞ | | | |

Aspheric surface R3:
Ro = 2.382   B = −3.998 × $10^{-3}$
C = −6.729 × $10^{-4}$   D = −3.751 × $10^{-4}$ Aspheric surface R4:
Ro = −7.852   B = 4.390 × $10^{-3}$
C = −6.121 × $10^{-4}$   D = −1.113 × $10^{-4}$ Aspheric surface R6:
Ro = 0.726   B = −4.179 × $10^{-1}$
C = 1.636 × $10^{-1}$   D = −2.229

Aspheric surface R10:
Ro = 2.207   B = −3.262 × $10^{-2}$
C = −2.253 × $10^{-3}$   D = −4.352 × $10^{-3}$ Aspheric surface R15:
Ro = −2.394   B = 2.254 × $10^{-2}$
C = −1.402 × $10^{-2}$   D = −2.660 × $10^{-2}$

| Variable Separation | Focal Length | | |
|---|---|---|---|
| | 1.00 | 2.56 | 5.55 |
| D4 | 0.21 | 1.95 | 2.97 |
| D8 | 1.81 | 0.75 | 0.13 |
| D11 | 1.31 | 1.01 | 1.35 |

According to the present invention, as has been described above, the conditions for the refractive powers of the four lens groups and the zooming movements of the first, second and fourth lens groups are set forth and the lens arrangement that when focusing the fourth lens group is moved is employed. The use of these features provides a possibility of reducing the bulk and size of the entirety of the lens system in such a manner that though the zoom ratio is high, good correction of the aberrations is attained over the entire range of variation of the focal length, and good stability of correction of the aberrations is maintained over the entire focusing range. Thus, a compact, high-performance zoom lens of the rear focus type can be achieved.

What is claimed is:

1. A zoom lens comprising:
from front to rear,
a first lens group having a positive refractive power;
a second lens group having a negative refractive power;
a third lens group having a positive refractive power;
a fourth lens group having a positive refractive power; and
a stop positioned in a space between said second lens group and said third lens group,
wherein, when zooming from the wide-angle end to the telephoto end, an air separation between said first lens group and said second lens group is widened, an air separation between said second lens group and said third lens group is narrowed, and said fourth lens group is axially moved, wherein focusing is performed by moving said fourth lens group, and wherein said stop moves toward the object side during zooming from the telephoto end to an intermediate focal length position.

2. A zoom lens according to claim 1, wherein zooming from the wide-angle end to the telephoto end is performed by moving said first lens group toward the object side and said second lens group toward the image side, while said third lens group remains stationary.

3. A zoom lens according to claim 2, wherein said fourth lens group, during zooming from the wide-angle end to the telephoto end, moves so as to depict a locus convex toward the object side.

4. A zoom lens according to any one of claims 1 to 3, satisfying the following condition:

$$1.4 < e_{3T}/f_W < 2.0$$

where $e_{3T}$ is the interval between principal points of said third lens group and said fourth lens group in the telephoto end when focused on an infinitely distant object, and $f_W$ is the shortest focal length of the entire lens system.

5. A zoom lens according to claim 4, satisfying the following condition:

$$0.9 < m_1/m_2 < 1.9$$

where $m_1$ and $m_2$ are the amount of zooming movement of said first lens group and that of said second lens group respectively.

6. A zoom lens according to claim 5, satisfying the following condition:

$$0.6 < |\beta_{2T}/\sqrt{Z}| < 1.1$$

where $\beta_{2T}$ is the lateral magnification of said second lens group in the telephoto end, and Z is the zoom ratio of the entire lens system.

7. A zoom lens according to claim 6, satisfying the following condition:

$$0.9 < |f_2/f_W| < 1.35$$

$$0.18 < f_W/f_1 < 0.25$$

where $f_1$ and $f_2$ are the focal lengths of said first lens group and said second lens group respectively.

8. A zoom lens comprising:
from front to rear;
a first lens group having a positive refractive power;
a second lens group having a negative refractive power;
a third lens group having a positive refractive power; and
a fourth lens group having a positive refractive power,
wherein, when zooming from the wide-angle end to the telephoto end, an air separation between said first lens group and said second lens group is widened, an air separation between said second lens group and said third lens group is narrowed, and said fourth lens group is axially moved, and wherein focusing is performed by moving said fourth lens group, zooming from the wide-angle end to the telephoto end being performed by moving said first lens group toward the object side and said second lens group toward the image side while said third lens group remains stationary, said zoom lens satisfying the following condition:

$$1.4 < e_{3T}/f_w < 2.0$$

where $e_{3T}$ is the interval between principal points of said third lens group and said fourth lens group in the telephoto end when focused on an infinitely distant object, and $f_W$ is the shortest focal length of the entire lens system.

9. A zoom lens according to claim 8, wherein:

$$0.9 < m_1/m_2 21 1.9$$

where $m_1$ and $m_2$ are the amount of zooming movement of said first lens group and that of said second lens group respectively.

10. A zoom lens according to claim 9, wherein:

$$0.6 < |\beta_{2T}/\sqrt{Z}| < 1.1$$

where $\beta_{2T}$ is the lateral magnification of said second lens group in the telephoto end, and Z is the zoom ratio of the entire lens system.

11. A zoom lens according to claim 8 wherein:

$$0.9 < |f_2/f_W| < 1.35$$
ti $0.18 < f_W/f_1 < 0.25$
where $f_1$ and $f_2$ are the focal lengths of said first lens group and said second lens group respectively.

* * * * *

UNITED STATES PATENT AND TRADEMARK OFFICE
CERTIFICATE OF CORRECTION

PATENT NO. : 5,134,524

DATED : July 28, 1992

INVENTOR(S) : HAMANO ET AL.

It is certified that error appears in the above-identified patent and that said Letters Patent is hereby corrected as shown below:

On the title page, item

[30] Foreign Application Priority Data

Insert: --May 8, 1990 [JP] Japan...2-119461
              May 8, 1990 [JP] Japan...2-119462--.

COLUMN 3

Line 45, "AS" should read --$\Delta$S--.

COLUMN 5

Line 28, "tionably" should read --tionably.--.
    Line 36, "increase" should read --increase.--.
    Line 59, "zoom;" should read --zoom--.

COLUMN 6

Line 35, "under-corrected" should read --under-corrected.--.

COLUMN 10

Line 67, "ED" should read --$EH^{10}$--.

COLUMN 20

Line 8, "-1.088" should read --1.088--.

UNITED STATES PATENT AND TRADEMARK OFFICE
CERTIFICATE OF CORRECTION

PATENT NO. : 5,134,524
DATED : July 28, 1992
INVENTOR(S) : HAMANO ET AL.

It is certified that error appears in the above-identified patent and that said Letters Patent is hereby corrected as shown below:

COLUMN 25

Line 25, "-5.521" should read --5.521--.

COLUMN 27

Line 18, "moved," should read --moved, and--;
Line 20, "and wherein" should be deleted and "moves" should read --moving--.

COLUMN 28

Line 57, "ti" should be deleted.

Signed and Sealed this

Twenty-sixth Day of October, 1993

Attest:

BRUCE LEHMAN

Attesting Officer

Commissioner of Patents and Trademarks